(12) United States Patent
Hosomi

(10) Patent No.: US 6,408,365 B1
(45) Date of Patent: Jun. 18, 2002

(54) MULTIPROCESSOR SYSTEM HAVING MEANS FOR ARBITRATING BETWEEN MEMORY ACCESS REQUEST AND COHERENCY MAINTENANCE CONTROL

(75) Inventor: Takeo Hosomi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/241,069

(22) Filed: Feb. 1, 1999

(30) Foreign Application Priority Data

Feb. 2, 1998 (JP) .......................................... 10-021135

(51) Int. Cl.$^7$ ............................................... G06F 12/00
(52) U.S. Cl. ........................................ 711/144; 711/120
(58) Field of Search ................................ 711/141, 142, 711/143, 144, 145, 120

(56) References Cited

FOREIGN PATENT DOCUMENTS

| JP | 2-304666 | 12/1990 |
| JP | 3-253963 | 11/1991 |
| JP | 04-209053 | 7/1992 |
| JP | 5-35697 | 2/1993 |
| JP | 5-32776 | 5/1993 |
| JP | 9-62580 | 3/1997 |

OTHER PUBLICATIONS

Hideaki Amano, "Heiretsu Konpyutta<Parallel Computer>," First Edition, published by Shokodo K.K. pp. 1–8, (1996).

*Primary Examiner*—Matthew Kim
*Assistant Examiner*—Matthew D. Anderson
(74) *Attorney, Agent, or Firm*—Sughrue Mion, PLLC

(57) ABSTRACT

A multiprocessor system has a controller for arbitrating a memory access request and a coherency maintenance control process. A coherency maintenance controller for maintaining coherency of data stored in a main memory and data stored in a cache memory has a local access controller which arbitrates between a memory access from a processor in a local buffer and a message for coherency maintenance control in a request buffer according to reply messages accumulated in a reply buffer. A directory memory stores the state of data stored in the main memory, which includes a state representing that the coherency maintenance control process is being carried out. When the state stored in the directory memory indicates that the coherency maintenance control process is being carried out on data corresponding to an access request, a home access controller saves the access request in the main memory.

16 Claims, 19 Drawing Sheets

FIG. 4a

| destination node number (10bit) | message type (4bit) | address (40bit) | mid (2bit) | request originating node number (10bit) |
|---|---|---|---|---|

FIG. 4b

| destination node number (10bit) | message type (4bit) | address (40bit) | mid (2bit) | request originating node number (10bit) | block data (128byte) |
|---|---|---|---|---|---|

FIG. 12a

| destination node number (10bit) | message type (4bit) | address (40bit) | mid (3bit) | request originating node number (10bit) |

FIG. 12b

| destination node number (10bit) | message type (4bit) | address (40bit) | mid (3bit) | request originating node number (10bit) | block data (128byte) |

FIG. 17a

| destination node number (10bit) | message type (4bit) | address (40bit) | mid (2bit) | request originating node number (10bit) |
|---|---|---|---|---|

FIG. 17b

| destination node number (10bit) | message type (4bit) | address (40bit) | mid (2bit) | request originating node number (10bit) | block data (128byte) |
|---|---|---|---|---|---|

FIG. 17c

| destination node number (10bit) | message type (4bit) | address (40bit) | mid (2bit) | request originating node number (10bit) | block data (10bit) |
|---|---|---|---|---|---|

MULTIPROCESSOR SYSTEM HAVING MEANS FOR ARBITRATING BETWEEN MEMORY ACCESS REQUEST AND COHERENCY MAINTENANCE CONTROL

BACKGROUND OF THE INVENTION

1. Field of the Invention

The present invention relates to a loosely coupled multiprocessor system, and more particularly to the maintenance of coherency between the data stored in main and cache memories in such a multiprocessor system.

2. Description of the Related Art

One technology for maintaining coherency between the data stored in main and cache memories in a conventional loosely coupled multiprocessor system is disclosed in "The Directory-Based Cache Coherence Protocol for the DASH Multiprocessor" by Daniel Lenoski, James Laudon, Kourosh Gharachorloo, Anoop Gupta and John Hennessy, In Proceedings of 17th International Symposium on Computer Architecture, pages 148–159, 1990.

FIG. 1 of the accompanying drawings shows in block form an arrangement of such a conventional loosely coupled multiprocessor system.

As shown in FIG. 1, the conventional loosely coupled multiprocessor system comprises a plurality of nodes $Pe_0$–$Pe_{n-1}$ and two interconnection networks $10_1$, $10_2$ that interconnect the nodes.

Each of the nodes, denoted by $Pe_i$ in FIG. 1, comprises a processor 50 for performing processing and memory access, a main memory 51, a cache memory 52 that can be accessed at a higher speed than the main memory 51, and a coherency maintenance controller 53 for maintaining coherency between the data stored in the main memory 51 and the cache memory 52 (and those of the other nodes). The processor 50 temporarily stores data in the main memory 51.

The coherency maintenance controller 53 holds the state of data stored in the main memory 51 and information of nodes which hold a copy of data in the cache memory 52 (hereinafter referred to as "holding node information"). There are two states of data, i.e., states C and M. The state C is a state in which a copy of data is present in the cache memories 52 of a plurality of nodes. In this case, the value of the copy of data present in the cache memory 52 and the value of data stored in the main memory 51 are the same with each other. The state M is a state in which only the cache memory 52 of one node holds a copy of data. In this case, the value of the copy of data present in the cache memory 52 and the value of data stored in the main memory 51 are different from each other, and the value of the copy of data present in the cache memory 52 is the latest value.

The coherency maintenance controller 53 also holds the state of data stored in the cache memory 52 and a tag address of the data. There are three states of data, i.e., states I, S, and D. The state I is a state in which there is no effective copy of data with maintained coherency. The state S is a state in which there is a possibility that there is an effective copy of data and there is also an effective copy of data in the cache memory 52 of another node. The state D is a state in which there is an effective copy of data, there is no effective copy of data in the cache memory 52 of another node, and the value of the data is different from the value of the data stored in the main memory 51. The tag address indicates at which address the data stored in the cache memory 52 is located.

The interconnection network $10_1$ distributes request messages exchanged between the nodes, and the interconnection network $10_2$ distributes reply messages exchanged between the nodes. The interconnection network for distributing request messages and the interconnection network for distributing reply messages, which are separate from each other, are effective to avoid deadlock in maintaining coherency between the data stored in the main memory 51 and cache memory 52.

A process for maintaining coherency between the data stored in the main memory 51 and cache memory 52 in the multiprocessor system when the processor 50 performs a load or store access to data at a given address will be described below.

First, it is assumed that the processor 50 at the node $Pe_1$ performs a load access.

The coherency maintenance controller 53 checks if an effective copy of the data at the corresponding address is present in the cache memory 52 or not. If an effective copy of the data is present in the cache memory 52, i.e., if the data is in the state S or D, then the coherency maintenance controller 53 replies to the processor 50 by transferring the data read from the cache memory 52 to the processor 50, after which the process comes to an end.

If an effective copy of the data is not present in the cache memory 52, i.e., if the data is in the state I, then the coherency maintenance controller 53 at the node $Pe_1$ transmits a request message to read the data to a node which holds the data at the corresponding address, e.g., the node $Pe_h$, through the interconnection network $10_1$.

In response to the reading request message, the coherency maintenance controller 53 at the node $Pe_h$ checks if the latest value of the data at the corresponding address is present in the main memory 51 at the node $Pe_h$. If the latest value of the data at the corresponding address is present in the main memory 51, i.e., if the data is in the state C, then the coherency maintenance controller 53 at the node $Pe_h$ transmits the data stored in the main memory 51 to the node $Pe_1$ through the interconnection network $10_2$, and adds the node $Pe_1$ to the holding node information.

Upon reception of the data from the node $Pe_h$, the coherency maintenance controller 53 at the node $Pe_1$ transfers the received data to the processor 50, and copies the data to the cache memory 52. The coherency maintenance controller 53 at the node $Pe_1$ sets the state of the data to the state S.

At the node $Pe_h$ which has received the reading request message, if the latest value of the data at the corresponding address is not present in the main memory 51, i.e., if the data is in the state M, then the coherency maintenance controller 53 at the node $Pe_h$ refers to the holding node information, and transmits the reading request message to a node which holds the latest data, e.g., the node $Pe_r$, through the interconnection network $10_1$.

At the node $Pe_r$ which has received the reading request message, the coherency maintenance controller 53 checks if the data in the state D is present in the cache memory 52 or not. If the data in the state D is present in the cache memory 52, then the coherency maintenance controller 53 at the node $Pe_r$ transmits the data stored in the cache memory 52 to the node $Pe_1$ through the interconnection network $10_2$, and also transmits a writing request message with the data stored in the cache memory 52 being added thereto to the node $Pe_h$ through the interconnection network $10_1$. The coherency maintenance controller 53 at the node $Pe_r$ updates the state of the data present in the cache memory 52 to the state S.

In response to the writing request message, the coherency maintenance controller 53 at the node $Pe_h$ updates the data in the main memory 51 to the data added to the writing request message. The coherency maintenance controller 53 also updates the state of the data to the state C and adds the node $Pe_1$ to the holding node information.

At the node $Pe_r$ which has received the reading request message, if the data in the state D is not present in the cache memory 52, then the coherency maintenance controller 53 at the node $Pe_r$ transmits a Nak (negative acknowledge) message to the node $Pe_1$ through interconnection network $10_2$.

In response to the Nak message, the coherency maintenance controller 53 at the node $Pe_1$ transmits the reading request message again to the node $Pe_h$. Subsequently, the same process is repeated until data is transmitted to the node $Pe_1$ and transferred to the processor 50 at the node $Pe_1$.

Now, it is assumed that the processor 50 at the node $Pe_1$ performs a store access.

The coherency maintenance controller 53 checks if a copy of the data at the corresponding address, which is only one copy in the system, is present in the cache memory 52 or not. If an effective copy of the data is present in the cache memory 52, i.e., if the data is in the state D, then the coherency maintenance controller 53 updates the data in the cache memory 52, notifies the processor 50 of an access completion, after which the process comes to an end.

If only one copy of the data is not present in the cache memory 52, i.e., if the data is in the state I or S, then the coherency maintenance controller 53 at the node $Pe_1$ transmits an exclusive reading request message to the node which holds the data at the corresponding address, e.g., the node $Pe_h$, through the interconnection network $10_1$.

In response to the exclusive reading request message, the coherency maintenance controller 53 at the node $Pe_h$ checks if the latest value of the data at the corresponding address is present in the main memory 51 at the node $Pe_h$. If the latest value of the data at the corresponding address is present in the main memory 51, i.e., if the data is in the state C, then the coherency maintenance controller 53 at the node $Pe_h$ transmits the data stored in the main memory 51 to the node $Pe_1$ through the interconnection network $10_2$.

If a node other than the node $Pe_1$ holds a copy of the data in the cache memory 52 thereof, then the coherency maintenance controller 53 at the node $Pe_h$ transmits an invalidating request message through the interconnection network $10_1$ to all nodes (referred to as nodes $Pe_k$) other than the node $Pe_1$ where a copy of the data is present. The coherency maintenance controller 53 at the node $Pe_h$ also updates the state of the data in the main memory 51 to the state M, and sets the holding node information to the node $Pe_1$ only. To the data transmitted to the node $Pe_1$ is added the number of nodes $Pe_k$ to which the invalidating request message is transmitted.

At the nodes $Pe_k$ which have received the invalidating request message, the coherency maintenance controller 53 updates the state of the data in the cache memory 52 to the state I, and transmits an Ack (positive acknowledge) message to the node $Pe_1$ through interconnection network $10_2$.

At the node $Pe_1$ which have received the data from the node $Pe_h$, the coherency maintenance controller 53 waits for as many Ack messages as the number of nodes $Pe_k$ which has been added to the data. When the coherency maintenance controller 53 at the node $Pe_1$ has received as many Ack messages as the number of nodes $Pe_k$, the coherency maintenance controller 53 updates the data in the cache memory 52 to the data of the store access performed by the processor 50. The coherency maintenance controller 53 at the node $Pe_1$ updates the state of the data to the state D, notifies the processor 50 of an access completion, after which the process comes to an end.

At the node $Pe_h$ which has received the exclusive reading request message, if the latest value of the data at the corresponding address is not present in the main memory 51, i.e., if the data is in the state M, then the coherency maintenance controller 53 at the node $Pe_h$ refers to the holding node information, and transmits the exclusive reading request message to a node which holds the latest data, e.g., the node Per, through the interconnection network $10_1$.

At the node $Pe_r$ which has received the exclusive reading request message, the coherency maintenance controller 53 checks if data of the state D is present in the cache memory 52. If no data of the state D is present in the cache memory 52, then the coherency maintenance controller 53 at the node $Pe_r$ transmits a Nak message through the interconnection network $10_2$.

In response to the Nak message, the coherency maintenance controller 53 at the node $Pe_1$ transmits the exclusive reading request message again to the node $Pe_h$. Subsequently, the same process is repeated.

If data of the state D is present in the cache memory 52, then the coherency maintenance controller 53 at the node $Pe_r$ transmits the data stored in the cache memory 52 to the node $Pe_1$ through the interconnection network $10_2$. The coherency maintenance controller 53 at the node $Pe_r$ also transmits a holding node updating request message to the node $Pe_h$ through the interconnection network $10_1$ and updates the state of the data in the cache memory 52 to the state I.

At the node $Pe_h$ which has received the holding node updating request message, the coherency maintenance controller 53 updates the holding node information as representing that only the node $Pe_1$ holds the data of the main memory 51, and transmits an Ack message to the node $Pe_1$ through the interconnection network $10_2$.

At the node $Pe_1$ which has received the data from the node $Pe_r$, the coherency maintenance controller 53 waits for the reception of the Ack message from the node $Pe_h$. Upon the reception of the Ack message from the node $Pe_h$, the coherency maintenance controller 53 updates the data in the cache memory 52 to the data of the store access performed by the processor 50. The coherency maintenance controller 53 at the node $Pe_1$ updates the state of the data to the state D, notifies the processor 50 of an access completion, after which the process comes to an end.

The conventional multiprocessor system has a problem in that the processing for maintaining coherency may occasionally enter an infinite loop. For example, when the processor 50 of the node $Pe_1$ performs a data access, a Nak message from the node $Pe_r$ to the node $Pe_1$ is repeated. Therefore, the conventional multiprocessor system may encounter a situation where a reply cannot be sent to the processor 50 within a limited period of time.

In the conventional multiprocessor system, furthermore, deadlock has been avoided by separating employing the interconnection network $10_1$ which exchanges request messages and the interconnection network $10_2$ which exchanges reply messages. For this reason, the conventional multiprocessor system suffers a high hardware cost, a high failure rate, and a low system reliability level.

SUMMARY OF THE INVENTION

It is an object of the present invention to provide a multiprocessor system which can ensure the completion of data access by a processor while maintaining coherency between the data stored in a main memory and a cache memory.

Another object of the present invention is to provide a multiprocessor system which does not need an additional hardware arrangement for the avoidance of deadlock, and is low in cost and high in reliability.

A multiprocessor system according to the present invention has a plurality of nodes and an interconnection network interconnecting the nodes.

Each of the nodes has a main memory for storing data, a cache memory for storing part of the data stored in the main memory in any one of the nodes, the cache memory being accessible faster than the main memory, cache state storage means for storing a state of the data stored in the cache memory, and main memory state storage means for storing a state of coherency of the data stored in the main memory and the data stored in the cache memory.

Each of the nodes also has local access control means and home access control means.

If an access request from a processor is of predetermined contents and the state of the data stored in the cache state storage means is a predetermined state, the local access control means sends the access request from the processor to a node having the main memory which stores data corresponding to the access request.

If an access request from another one of the nodes is of predetermined contents and the state of the data stored in the main memory state storage means of the node is a predetermined state, the home access controlling means makes a coherency request to cause a node represented by the information stored in the main memory state storage means to effect a process to maintain coherency of the data.

The local access control means also effects a process to maintain coherency of the data in the cache memory according to a coherency request from another one of the nodes, and sends a first reply with respect to a completion of the process to maintain coherency to a node having the main memory whose stored data is subjected to the process to maintain coherency.

If the first reply sent from the local access controlling means in any one of the nodes is of predetermined contents and the state of the data stored in the main memory state storage means of the node is a predetermined state, then the home access control means effects a process to maintain coherency of the data in the main memory, and sends a second reply with respect to the completion of the process to maintain coherency to the node having the processor which has made the access request.

If a second reply sent from another one of the nodes is of predetermined contents and the state of the data stored in the cache state storage means is a predetermined state, then the local access control means effects a process to maintain coherency of the data in the cache memory, and sends a third reply with respect to a completion of the process to maintain coherency to the processor.

Each of the nodes further comprises first arbitrating means for arbitrating between the access request issued by the processor and the coherency request and the second reply sent by the home access controlling means according to contents thereof, and enabling the home access controlling means to execute the access request, the coherency request, and the second reply.

Each of the nodes further comprises second arbitrating means for arbitrating between the access request and the first reply sent by the local access controlling means according to contents thereof, and enabling the local access controlling means to execute the access request and the first reply.

The state of coherency of the data stored in the main memory state storage means includes a state representing that the process to maintain coherency is being effected. Each of the nodes further comprises first main memory state updating means, access request saving means, second main memory state updating means, and access request returning means.

The first main memory state updating means updates the state of the data stored in the main memory state storage means to the state representing that the process to maintain coherency is being effected if an access request from the local access controlling means in any one of the nodes is of predetermined contents and the state of the data stored in the main memory state storage means of the node is a predetermined state.

The access request saving means saves an access request if the access request is of predetermined contents and the state of the data stored in the main memory state storage means is the state representing that the process to maintain coherency is being effected.

The second main memory state updating means updates the state of the data stored in the main memory state storage means to a state which is not the state representing that the process to maintain coherency is being effected if a first reply sent from the local access controlling means in any one of the nodes is of predetermined contents and the state of the data stored in the main memory state storage means of the node is a predetermined state.

The access request returning means returns an access request saved by the access request saving means and enables the home access controlling means to process the returned access request if the second main memory state updating means has updated the state of the data stored in the main memory state storage means to the state which is not the state representing that the process to maintain coherency is being effected.

Each of the nodes further comprises access request holding means, conflict request storage means, and access request re-processing means.

The access request holding means holds an access request sent from the processor if the local access controlling means sends an access request to a node having the main memory which stores data corresponding to the access request according to the access request sent from the processor.

The conflict request storage means stores a request conflict if a coherency request is of predetermined contents, and an access request held by the access request holding means is of predetermined contents when the local access controlling means has effected a process to maintain coherency of the data in the cache memory according to the coherency request sent from the home access controlling means in another one of the nodes.

The access request re-processing means enables the local access controlling means to re-process the access request held by the access request holding means if the second reply is of predetermined contents, the state of the data stored in the cache state storage means is of predetermined contents, and the request conflict stored in the conflict request storage means is of predetermined contents, when the local access controlling means has. effected a process to maintain coherency of the data in the cache memory according to a second reply sent from the home access controlling means in another one of the nodes.

Each of the nodes further comprises reply accumulating means, coherency request accumulating means, and third accumulating means.

The reply accumulating means accumulates second replies sent from the home access controlling means in either one of the nodes to the local home access controlling means in the either one of the nodes.

The coherency request accumulating means accumulates coherency requests sent from the home access controlling means in either one of the nodes to the local home access controlling means in the either one of the nodes.

The third accumulating means accumulates either coherency requests or second replies sent from the home access control means through the interconnection network to another one of the nodes.

In the multiprocessor system, the local access control means arbitrates a memory access from the processor and a message for coherency maintenance control in the coherency request accumulating means according to reply messages accumulated in the reply accumulating means. The main memory state storage means stores the state of data stored in the main memory, which includes a state representing that the process of maintaining coherency is being carried out. When the state stored in the main memory state storage means indicates that the process of maintaining coherency is being carried out on data corresponding to an access request, the home access controlling means saves the access request in the main memory.

In the multiprocessor system according to the present invention, the process that is carried out for maintaining coherency of the data stored in the main memory and the data stored in the cache memory will not enter an infinite loop. The multiprocessor system ensures that the processor will obtain the result of a memory access within a finite period of time.

It is not necessary to add a hardware arrangement, particularly interconnection networks, to the multiprocessor system for the avoidance of deadlock. Consequently, the multiprocessor system according to the present invention is relatively highly reliable and low in cost.

The above and other objects, features, and advantages of the present invention will become apparent from the following description with reference to the accompanying drawings which illustrate examples of the present invention.

BRIEF DESCRIPTION OF THE DRAWINGS

FIG. 4a is a diagram showing a basic message exchanged between nodes through an interconnection network in the loosely coupled multiprocessor system according to the first embodiment of the present invention;

FIG. 4b is a diagram showing a message with block data exchanged between nodes through an interconnection network in the loosely coupled multiprocessor system according to the first embodiment of the present invention;

FIG. 12a is a diagram showing a basic message exchanged between nodes through an interconnection network in a loosely coupled multiprocessor system according to a second embodiment of the present invention;

FIG. 12b is a diagram showing a message with block data exchanged between nodes through an interconnection network in the loosely coupled multiprocessor system according to the second embodiment of the present invention;

FIG. 17a is a diagram showing a basic message exchanged between nodes through an interconnection network in a loosely coupled multiprocessor system according to a third embodiment of the present invention;

FIG. 17b is a diagram showing a message with block data exchanged between nodes through an interconnection network in the loosely coupled multiprocessor system according to the third embodiment of the present invention;

FIG. 17c is a diagram showing a message with the number of holding nodes exchanged between nodes through an interconnection network in the loosely coupled multiprocessor system according to the third embodiment of the present invention;

DETAILED DESCRIPTION OF THE PREFERRED EMBODIMENTS

1st Embodiment

Figure 1:
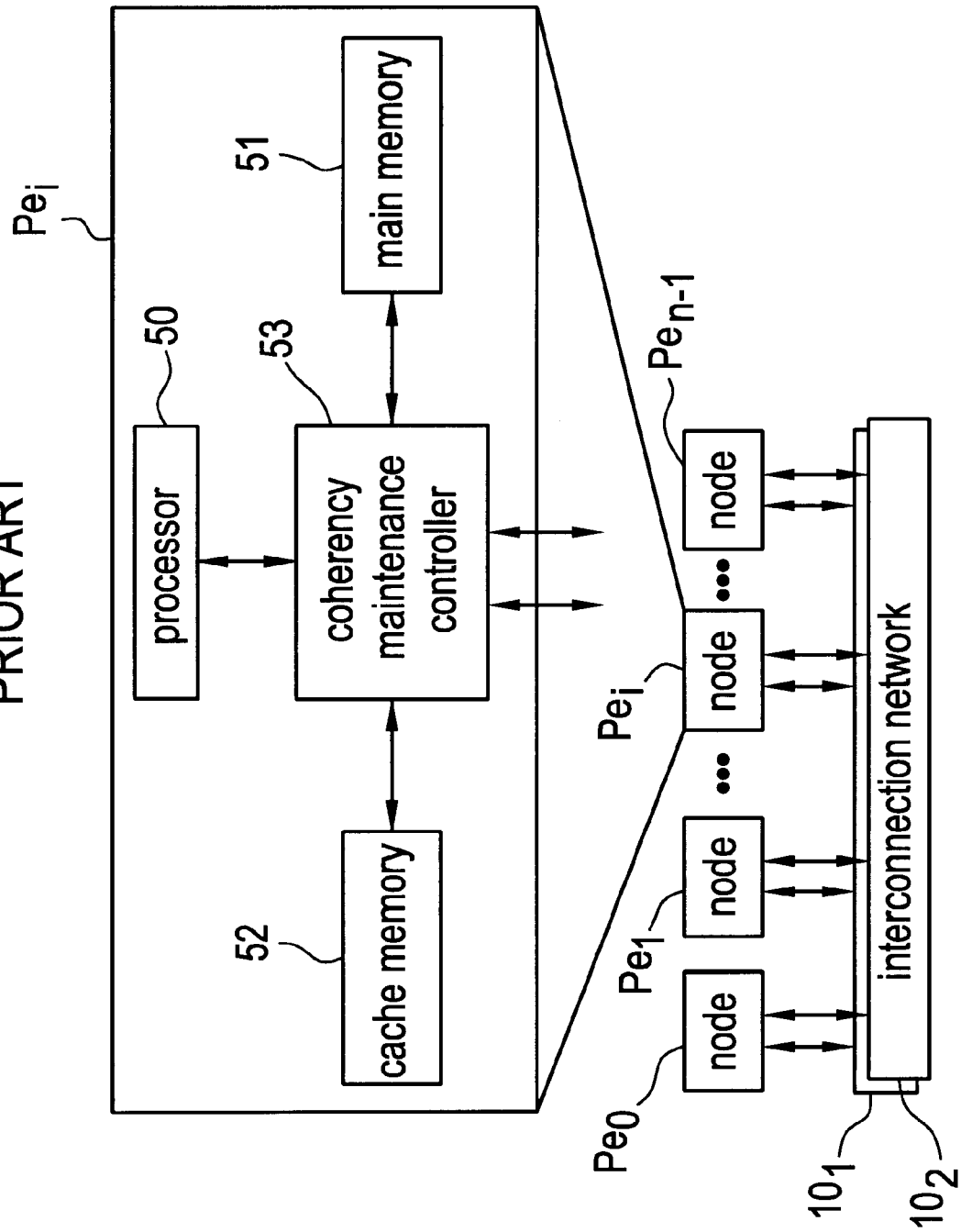
FIG. 1 is a block diagram of an arrangement of a conventional loosely coupled multiprocessor system and a functional arrangement of each of the nodes thereof.
Figure 2:
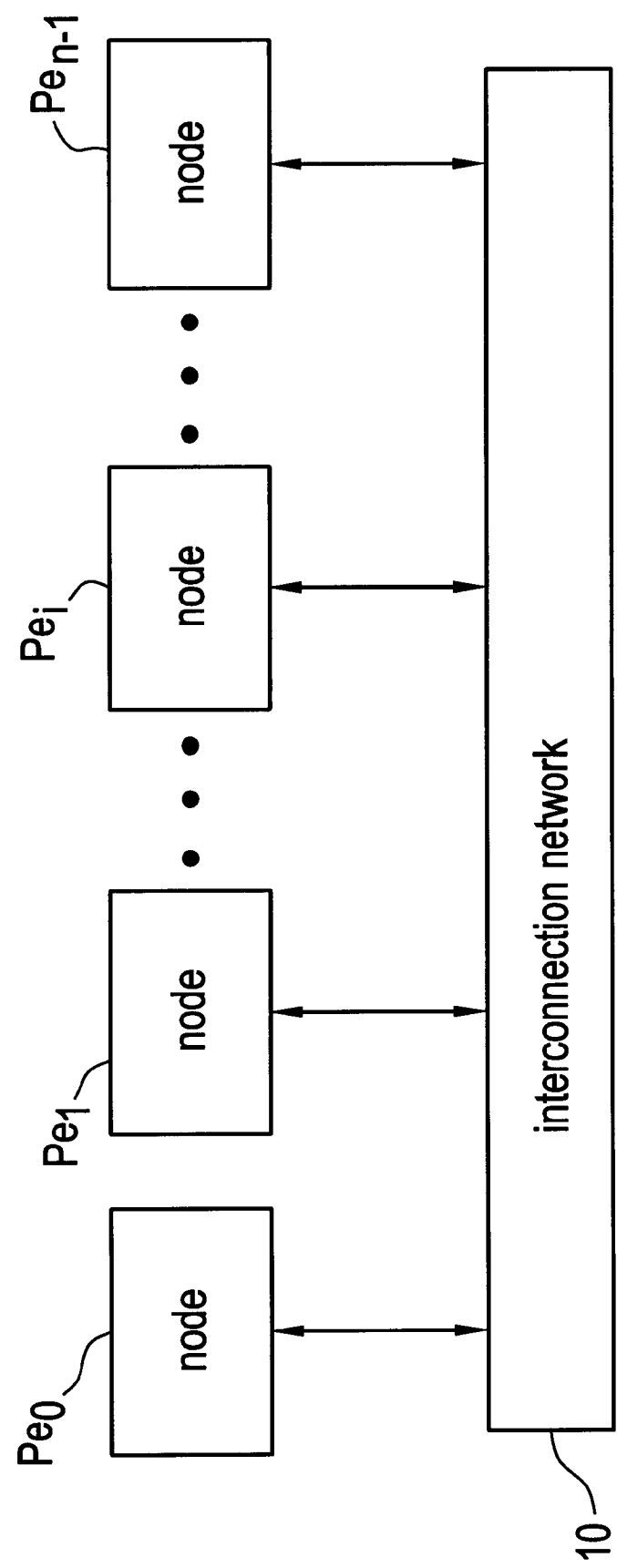
FIG. 2 is a block diagram of an arrangement of a loosely coupled multiprocessor system according to a first embodiment of the present invention.

As shown in FIG. 2, a loosely coupled multiprocessor system according to a first embodiment of the present invention comprises a plurality of nodes $PE_0$–$PE_{n-1}$ and an interconnection network 10 that interconnects the nodes for distributing request messages and reply messages exchanged between nodes. In this embodiment, n=1024.

Figure 3:
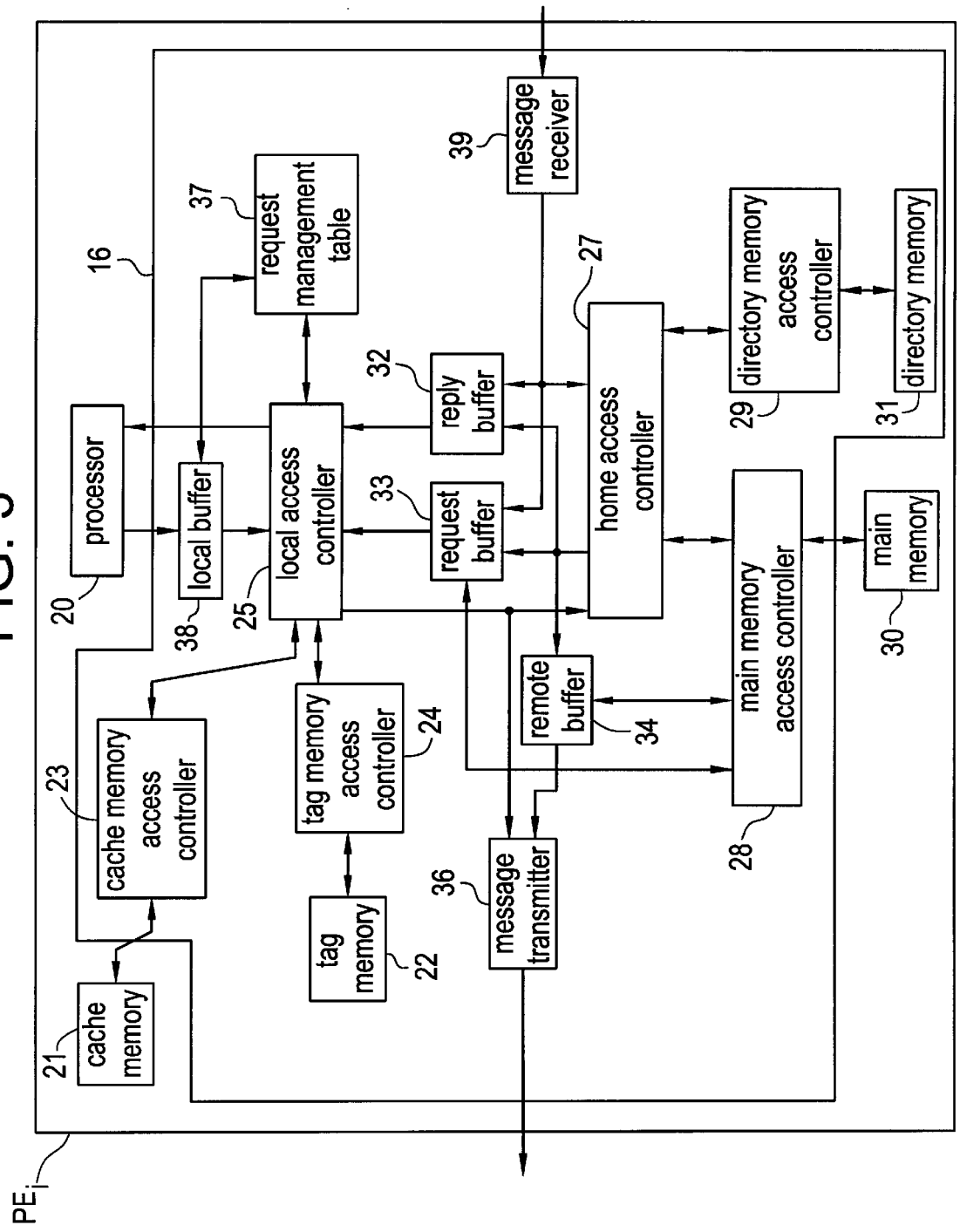
FIG. 3 is a block diagram of an arrangement of a node of the loosely coupled multiprocessor system according to the first embodiment of the present invention.

FIG. 3 shows in block form the node $PE_i$ (i=0~n-1) shown in FIG. 2.

As shown in FIG. 3, the node $PE_i$ (i=0~n-1) has a processor 20, a main memory 30, a cache memory 21, and a coherency maintenance controller 16.

To perform a memory access, the processor 20 outputs information relative to the memory access, i.e., the type of the memory access (load or store access), an address, and data, to a local buffer 38. If the memory access is a load access, then the processor 20 receives data, and if the memory access is a store access, then the processor 20 receives a completion signal, for thereby confirming that the memory access has been processed outside of the processor 20. Before confirming that a previous memory access has been processed outside of the processor 20, the processor 20 can request a next memory access. Therefore, each memory access is assigned an ID number, and the type of a memory access, an address, data, and an ID number are outputted to the local buffer 38. A reply to the processor 20 is also assigned an ID number, so that the processor 20 can identify which memory access the reply is made to.

The type of a memory access is represented by one bit, "0" representing a load access and "1" a store access. An address comprises 40 bits and data comprises 64 bits. The processor 20 can simultaneously request a maximum of four memory accesses, which are distinguished by 2 bits ID numbers. Hereafter, the least significant bit of an address is referred to as a 0th bit, and the most significant bit thereof as a 39th bit.

The main memory 30 has a storage capacity of 64 bits×2M entries=512 Mbytes (1 M=1024×1024).

High-order bits of an address outputted by the processor 20 represent the main memory 30 of a node $PE_i$ in which the data is stored, and low-order bits of the address represent an offset in the main memory 30. Specifically, high-order 10 bits, ranging from the 39th bit to the 30th bit, of the 40 bits of the address outputted by the processor 20 represent the main memory 30 of a node $PE_i$ in which the data is stored, and low-order 30 bits ranging from the 29th bit to the 0th bit represent an offset in the main memory 30.

The cache memory 21 comprises a memory which is of a smaller storage capacity, but a higher access speed than the main memory 30. Therefore, if data is present in the cache memory 21, then it can quickly reply to a memory access performed by the processor 20, resulting in a reduction in the time required by the memory access. The cache memory 21 has a storage capacity of 64 bits×128 K entries=1 Mbytes (1K=1024). Data is transferred between the cache memory 21 and the main memory 30 in blocks of a fixed size (which is hereinafter assumed to be 128 bytes). Generally, cache memories are grouped into instruction cache and data cache. In this embodiment, the cache memory 21 is constructed as a data cache.

In the loosely coupled multiprocessor system, a copy of the data stored in the main memory 30 may be present in a plurality of cache memories 21. Therefore, it is necessary to carry out a control process to maintain coherency among those copies and the data in the main memory 30. The coherency maintenance controller 16 serves to effect such a coherency maintenance control process, and manages the state of the data copy in the cache memory 21 and the state of the data in the main memory 30 in the system.

The coherency maintenance controller 16 has functions to exchange messages between nodes $PE_i$ depending on a memory access, change states of the messages, and transfer data. An arrangement of the coherency maintenance controller 16 will be described in detail later on.

The interconnection network 10 shown in FIG. 2 has a function to distribute a message from a certain node $PE_i$ to another certain node $PE_j$ based on routing information contained in the message. It is assumed here that the routing information comprises a destination node number as necessary and sufficient information, and that there is one path from a certain node to another certain node, with no outrunning occurring among messages along one path. If messages are transmitted from different nodes or received by different nodes, then no arriving order is guaranteed among those messages.

Messages exchanged between nodes $PE_i$ through the interconnection network 10 will be described below.

There are 12 types of messages represented respectively by BlkRdSh, BlkRdEx, Upgrade, BlkWr, Ack, AckData, IntvSh, IntvEx, Inv, CmpDatSh, CmpDatEx, and Cmp.

BlkRdSh, BlkRdEx, Upgrade and BlkWr are request messages transmitted from a node $PE_i$ where a memory access is performed to a node $PE_j$ where data is held in the main memory 30.

IntvSh, IntvEx and Inv are request messages transmitted from a node $PE_i$ where data is held in the main memory 30 to a node $PE_j$ where a copy of the data is held in the cache memory 21.

Ack and AckData are report messages transmitted from a node $PE_i$ where a copy of data is held in the cache memory 21 to a node $PE_j$ where data is held in the main memory 30.

CmpDatSh, CmpDatEx and Cmp are memory access completion messages transmitted from a node $PE_i$ where data is held in the main memory 30 to a node $PE_j$ where a memory access is performed.

The structures of the messages will be described below with reference to FIGS. 4a and 4b.

The messages are divided into two types, i.e., basic messages-and messages with block data. BlkRdSh, BlkRdEx, Upgrade, Ack, IntvSh, IntvEx, Inv and Cmp are basic messages, whereas BlkWr, AckData, CmpDatSh and CmpDatEx are messages with block data.

As shown in FIG. 4a, a basic message comprises a total of 66 bits representing a destination node number (10 bits), a code indicative of a message type (4 bits because there are 12 message types), a request originating node number (10 bits), mid (2 bits), and an address (40 bits).

As shown in FIG. 4b, a message with block data comprises a total of 66 bits+128 bytes, with 66 bits representing a destination node number (10 bits), a code indicative of a message type (4 bits), a request originating node number (10 bits), mid (2 bits), and an address (40 bits), and 128 bytes representing block-size data (128 bytes).

The coherency maintenance controller 16 shown in FIG. 3 will be described in detail below.

The coherency maintenance controller 16 comprises a tag memory 22, a cache memory access controller 23, a tag memory access controller 24, a local access controller 25, a home access controller 27, a main memory access controller 28, a directory memory access controller 29, a directory memory 31, a reply buffer 32, a request buffer 33, a remote buffer 34, a message transmitter 36, a message receiver 39, a request management table 37, and a local buffer 38.

The directory memory 31 stores information of each block stored in the main memory 30. The information includes top bits, block states, and information of nodes which hold a copy of data in the cache memory 21 (hereinafter referred to as "holding node information").

A top bit is represented by one bit and relates to operation of the home access controller 27. A block state is represented by either one of C, M, RSP, REP, UP, and is coded with three bits. For example, C is represented by "000", M by "001", RSP by "100", REP by "101",and UP by "110".

The block state C indicates that a copy of data is present in the cache memory 21 in a plurality of nodes $PE_i$ more than 0. At this time, the value of the copy in the cache memory 21 is the same as the value of the data in the main memory 30. The block state M indicates that the cache memory 21 in one node $PE_i$ holds only a copy of the data. At this time, the value of the copy in the cache memory 21 is different from the value of the data in the main memory 30, and may possibly be the latest value.

The block states RSP, REP, UP indicate that a request message for coherency maintenance processing derived from a certain memory access is received and outputted to a cache memory which holds a copy, and a reply is waited for.

There are three representation types of the holding node information depending on the block state. Those are holding node number type, the number of holding nodes type, and the coarse vector type. If the block state is represented by M and RSP, then the holding node number type is used which represents a node number (expressed by 10 bits) identifying a node $PE_i$. If the block state is represented by REP and UP, then the number of holding nodes type is used which represents the number of nodes (expressed by 10 bits) which hold copies in their cache memories. If the block state is represented by C, then the coarse vector type are used.

This coarse vector type divides the nodes $PE_i$ into several groups, and manages holders (nodes) with bits representing the number of the groups. Whether each bit is to be set to 1 or not is determined depending on whether there is even one node Pei which holds a copy in the group corresponding to the bit. In this embodiment, the bits representing the number of the groups are 8 bits. Of these 8 bits, a 0th bit is assigned to nodes $PE_0$ to $PE_{127}$, a 1st bit to $PE_{128}$ to $PE_{255}$, ..., and a 7th bit to $PE_{896}$ to PE1023. In this case, the directory memory is a memory for holding 14 bits×4M (main memory size/block size) entries. The information stored in the directory memory 31 initially represents a top bit of 0, a state C, and holding node information of 0x000 (0x is a hexadecimal representation).

The tag memory 22 stores information of each block stored in the cache memory 21. The information includes block states and tag addresses. A block state is represented by either one of I, S, E, D, and indicates what state the corresponding block is in. The block state is coded with two bits. For example, I is represented by "00", S by "01", E by "10", and D by "11".

The block state I indicates that there is no effective copy of data whose coherency is maintained. The block state S indicates that there is an effective copy of data and there is an effective copy in the cache memory 21 at another node. The block state E indicates that there is an effective copy of data, there is no effective copy in the cache memory 21 at another node, and the value of the copy of data is the same as the value of data in the main memory 30. The block state D indicates there is an effective copy of data, there is no effective copy in the cache memory 21 at another node, and the value of the copy of data is different from the value of data in the main memory 30.

A tag address indicates an address of the data. In this embodiment, the cache memory 21 is controlled by a direct mapping process that uniquely determines which block of the cache memory 21 the data of a certain address is to be stored in. In this case, since the storage capacity of the cache memory 21 is 1 Mbytes, high-order 20 bits, ranging from the 39th bit to the 20th bit, of the 40 address bits serve as a tag address. Thus, the tag memory 22 is a memory for holding 22 bits×8K (cache memory size/block size) entries. The information stored in the tag memory 22 initially represents a state I and a tag address which is of any arbitrary value.

The cache memory access controller 23 has functions to perform access to the cache memory 21 according to access requests from the local access controller 25. These requests are to read and write 128 bytes block data and to read and write 64 bits data.

The tag memory access controller 24 has functions to perform access to the tag memory 22 according to access requests from the local access controller 25. These requests are to read and write one entry of data which comprises 22 bits.

The main memory access controller 28 has a function to arbitrate between access requests from the request buffer 33, the remote buffer 34, and the home access controller 27, and perform access to the main memory 30 according to a received access request. Access requests from the request buffer 33 are to read and write a message, and from the remote buffer 34 are to read and write a message source (described in detail later on). Access requests from the home access controller 27 are to read and write block data (described in detail later on) and to read and write a message.

The directory memory access controller 29 has a function to perform access to the directory memory 31 according to an access request from the home access controller 27. This request is to read and write one entry of data which comprises 14 bits of data.

The message transmitter 36 and the message receiver 39 are connected to the interconnection network 10 for transmitting messages from the node $PE_i$ to the interconnection network 10 and receiving messages from the interconnection network 10.

The message transmitter 36 is connected to two modules of the local access controller 25 and the remote buffer 34, for arbitrating between and reading messages outputted by those modules.

If the message receiver 39 receives a message whose type is either BlkRdSh, BlkRdEx, Upgrade, BlkWr, Ack, or AckData, then the message receiver 39 outputs the message to the home access controller 27. If the message receiver 39 receives a message whose type is either IntvSh, IntvEx, or Inv, then the message receiver 39 outputs the message to the request buffer 33. If the message receiver 39 receives a message whose type is either CmpDatSh, CmpDatEx, or Cmp, then the message receiver 39 outputs the message to the reply buffer 32.

The local buffer 38 is a buffer for receiving a memory access requested by the processor 20. The local buffer 38 has four entries because the processor 20 can simultaneously request a maximum of four memory accesses, each entry being capable of holding a total of 107 bits of information including an access type (1 bit), an address (40 bits), data (64 bits), and an ID number (2 bits).

Memory accesses stored in the local buffer 38 are successively outputted to the local access controller 25. When the local access controller 25 receives a memory access outputted from the local buffer 38, the local buffer 38 discards the memory access, and outputs a next memory access. If the address of a memory access to be outputted is in accord with the address of an entry registered in the request management table 37 (described later on) by way of a block address (13 bits ranging from the 19th bit to the 7th bit), then the outputting of the memory access from the local buffer 38 is prohibited. The request management table 37 receives the address of a leading entry of the local buffer 38 and make a pending signal using it. If the signal is "1", the local buffer 38 prohibits the outputting of the memory access to the local access controller 25.

The request management table 37 is a table comprising four entries because of the maximum number (4) of memory accesses that can simultaneously be requested by the processor 20. Each of the entries is capable of holding a total of 107 bits of information including an effective bit (1) indicative of whether the entry is effective or not, an access type (1 bit), an address (40 bits), data (64 bits), and a check bit (1 bit).

The request management table 37 has the following functions:

1) To write the above set data (107 bits) outputted from the local access controller 25 into the entry indicated by the local access controller 25 according to an instruction of the local access controller 25;
2) To output the contents of the entry indicated by the local access controller 25 to the local access controller 25;
3) To output a pending signal representative of whether an address signal (40 bits) outputted by the local access controller 25 and an address (40 bits) in the set data in the entry are in accord with each other with respect to 13 bits ranging from the 19th bit to the 7th bit, and whether there is an entry with an effective bit of "1" (the pending signal is "1" if there is such an entry); and
4) To set the check bit of the entry to "1" if an address signal (40 bits) outputted by the local buffer 38 and an address (40 bits) in the entry are in accord with each other with respect to high-order 33 bits ranging from the 39th bit to the 7th bit, and also if an effective bit is "1", according to an instruction of the local access controller 25.

The reply buffer 32 comprises a buffer for reading and storing messages outputted by the home access controller 27 and the message receiver 39. The type of messages that can be written in the reply buffer 32 are limited to Cmp, CmpDatSh and CmpDatEx. These messages are written in the reply buffer 32 as a reply of a memory access requested by the processor 20, and will not be written more than one message per memory access.

The reply buffer 32 has four entries because the processor 20 can simultaneously request a maximum of four memory accesses, each entry being capable of holding a message with block data represented by 66 bits+128 bytes. Therefore, even if the local access controller 25 to which messages are outputted does not process even a single message stored in the reply buffer 32, the reply buffer 32 can read all the messages that are outputted.

The reply buffer 32 outputs received messages successively to the local access controller 25. When an outputted message is received by the local access controller 25, the reply buffer 32 discards the outputted message, and starts processing a next message.

The request buffer 33 is a buffer for storing messages outputted by the home access controller 27 and the message receiver 39. The type of messages that can be written in the request buffer 33 are limited to IntvSh, IntvEx and Inv.

In order to avoid deadlock, the request buffer 33 has a function to sweep off messages to a request save queue in the main memory 30 when the request buffer 33 is full of messages. The request buffer 33 also has a function to read a message from this queue, as necessary. Each entry of the request save queue is capable of holding 66 bits. The request save queue comprises 4096 entries represented by the maximum number (4) of memory accesses that can be requested by the processor 20, multiplied by the number of nodes (1024). When the request buffer 33 saves messages to the request save queue, the request buffer 33 can read all the outputted messages even if the local access controller 25 to which messages are outputted does not process even a single message stored in the request buffer 33.

The request buffer 33 outputs received messages successively to the local access controller 25. When an outputted message is received by the local access controller 25, the request buffer 33 discards the outputted message, and, starts processing a next message.

Figure 5:
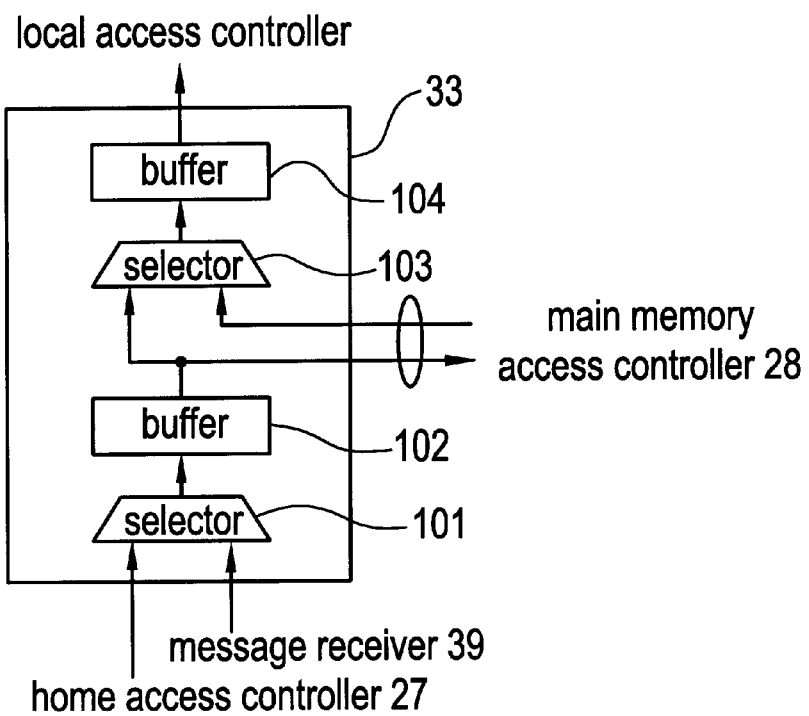
FIG. 5 is a block diagram of an arrangement of a request buffer of the loosely coupled multiprocessor system according to the first embodiment of the present invention.

An arrangement of the request buffer 33 is shown in FIG. 5.

As shown in FIG. 5, the request buffer 33 comprises a selector 101, a buffer 102, a selector 103, and a buffer 104.

The selector 101 arbitrates between and selects messages outputted by the home access controller 27 and the message receiver 39, and writes the selected message in the buffer 102. If there is an effective message in the buffer 104 or there are messages in the request save queue at the time, then the message written in the buffer 102 is written in the queue. If there is no effective message in the buffer 104 or there is no message in the request save queue, then the message written in the buffer 102 is selected by the selector 103, and outputted to and written in the buffer 104.

If there is no effective message in the buffer 104, then the selector 103 selects a message outputted by the buffer 102 or a message from the queue, and the buffer 104 reads the selected message. If there is a message in the queue, then the buffer 104 reads the message from the request save queue. If there is no message in the queue and there is a message in the buffer 102, then the buffer 104 reads the message outputted from the buffer 102. When a message written in the queue is read, it is deleted from the queue. The buffer 104 outputs the written message to the local access controller 25.

The remote buffer 34 is a buffer for storing message sources outputted by the home access controller 27. The information written in the remote buffer 34 comprises a total of 66 bits representing a message type (4 bits), an address (40 bits), a request originating node number (10 bits), mid (2 bits), and holding node information (10 bits) held in the directory memory 31 which are necessary to generate messages.

In order to avoid deadlock, the remote buffer 34 has a function to sweep off message sources to a remote save queue in the main memory 30 when the remote buffer 34 is full of messages. The remote buffer 34 also has a function to read message sources from this queue as necessary. Each entry of the remote save queue is capable of holding 66 bits. The remote save queue comprises 4096 entries represented by the maximum number (4) of memory accesses that can be requested by the processor 20, multiplied by the number of nodes (1024). When the remote buffer 34 saves message sources to the remote save queue, the remote buffer 34 can read message sources outputted thereto even if it cannot output even a single message to the message transmitter 36.

The remote buffer 34 also has a function to generate messages from a message source written therein. If necessary upon generation of messages, the remote buffer 34 reads block data from the main memory 31 through the main memory access controller 28. The remote buffer 34 generates messages from the received message sources successively, and outputs the generated message to the message transmitter 36. When the outputted message is received by the message transmitter 36, the remote buffer 34 discards the outputted message, and starts processing the next message source.

Figure 6:
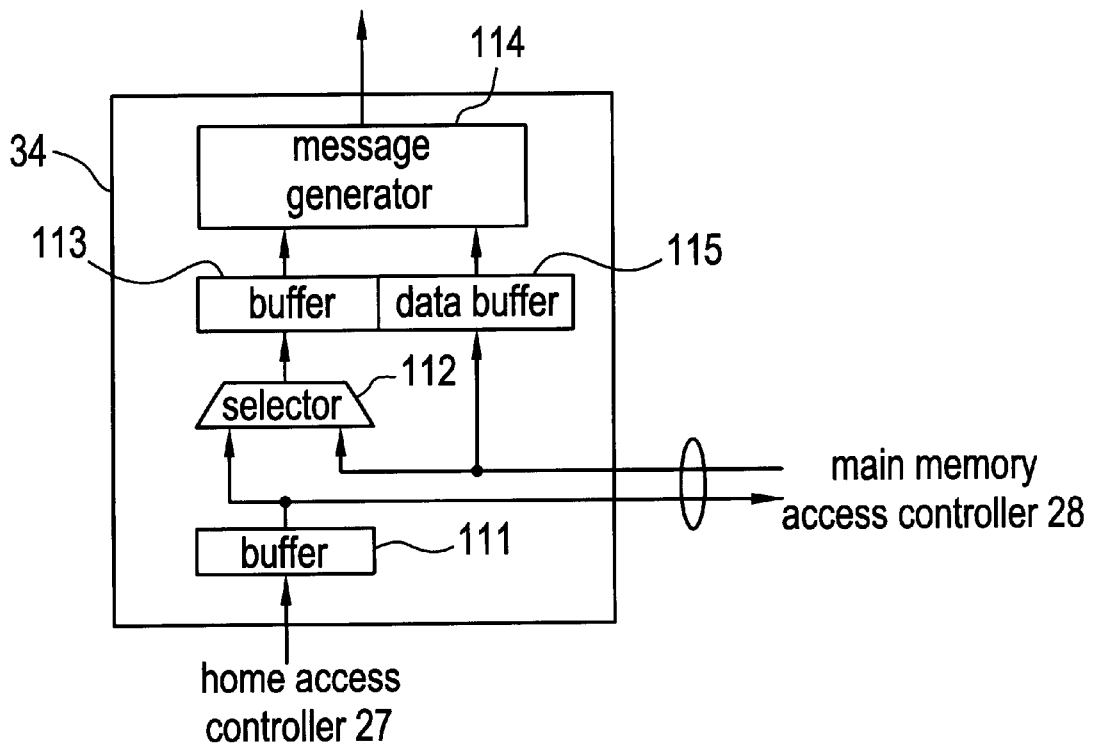
FIG. 6 is a block diagram of an arrangement of a remote buffer of the loosely coupled multiprocessor system according to the first embodiment of the present invention.

FIG. 6 shows an arrangement of the remote buffer 34. As shown in FIG. 6, the remote buffer 34 comprises a buffer 111, a selector 112, a buffer 113, a data buffer 115, and a message generator 114.

A message source outputted by the home access controller 27 is written in the buffer 111. This source is written in a queue if there is an effective one in the buffer 113 or there are some sources in the remote save queue. If there are none in the buffer 113 and the queue, then the source is outputted to the buffer 113, selected by the selector 112, and written.

If there is no effective message source in the buffer 113, then the buffer 113 reads a message source outputted from the buffer 111 or the queue and selected by the selector 112. If there are message sources in the queue, the buffer 113 reads a message source from the queue. If there is no message source in the queue and there is a message source in the buffer 111, then the buffer 113 reads the message source outputted by the buffer 111. When the message source written in the queue is read, it is deleted from the queue. When the message source is written in the buffer 113, the message generator 114 generates a message and outputs the generated message to the message transmitter 36.

The message generator 114 effects the following process depending on a code (4 bits) which represents a message type, of the message source;

There are six message types, i.e., IntvSh, IntvEx, Inv, CmpDatSh, CmpDatEx and Cmp. For all messages to be generated, a message type (4 bits), a request originating node number (10 bits), an address (40 bits), and mid (2 bits) which a message source stored in the buffer 113 includes are used as those are.

If the type of a message is IntvSh or IntvEx, then any information lacking is only a destination node number. In this case, the holding node information is used as it is. At this time, only this message is generated.

If the type of a message is Inv, then any information lacking is only a destination node number. In this case, a plurality of messages having different destination node numbers are generated. The destination node numbers are generated according to the holding node information. The holding node information is of a Coarse Vector format, and the same message with different destinations is generated and outputted to a plurality of nodes $PE_i$ (except for the request originating node) which are expressed by the Coarse Vector format.

For example, if the holding node information is "00110100" and the request originating node is "0010010110", then there are a total of 384 destination nodes $PE_{256}$–$PE_{383}$, $PE_{512}$–$PE_{767}$, and Inv messages are transmitted to these 384 nodes. If the holding node information is "11001011" and the request originating node is "0010010110", then there are a total of 679 destination nodes $PE_0$–$PE_{149}$, $PE_{151}$–$PE_{255}$, $PE_{384}$–$PE_{511}$, $PE_{768}$–$PE_{1023}$, and inv messages are transmitted to these 679 nodes.

If the type of a message is CmpDatSh or CmpDatEx, then any information which lacks is a destination node number and block data. In this case, the request originating node number is used as the destination node number. A block of data corresponding to the address which is outputted from the buffer 113 is read from the main memory 30 through the main memory access controller 28 and is stored in the data buffer 115. The message generator 114 generates a message using the block data, and outputs the generated message. At this time, only this message is generated.

If the type of a message is Cmp, then any information which lacks is only a destination node number. In this case, the request originating node number is used as the destination node number. At this time, only this message is generated.

The local access controller 25 has a function to arbitrate between and select a memory access outputted by the local buffer 38, a message outputted by the reply buffer 32, and a message outputted by the request buffer 33, for carrying out a process to maintain data coherency. The process carried out by the local access controller 25 to maintain data coherency includes access to the tag memory 22 through the tag memory access controller 24, access to the cache memory 21 through the cache memory access controller 23, access to the request management table 37, a reply to the processor 20, and outputting a message to the message transmitter 36 or the home access controller 27.

The home access controller 27 has a function to receive a message outputted by the local access controller 25 and a message outputted by the message receiver 39, for carrying out a process to maintain data coherency. The process carried out by the home access controller 27 includes access to the directory memory 31 through the directory memory access controller 29, access to the main memory 30 through the main memory access controller 28, outputting a message to the reply buffer 32 or the request buffer 33, and outputting a message source to the remote buffer 34.

The home access controller 27 also manages a conflict queue for storing messages in the main memory 30. The conflict queue has as many entries as the number of total processors which is multiplied by the number of memory accesses that can simultaneously be performed by the processor 20. In this embodiment, the conflict queue has 1024×4=4096 entries. Each entry is capable of holding a basic message (66 bits). The types of messages that can be queued in the conflict queue are limited to three types, i.e., BlkRdSh, BlkRdEx, and Upgrade.

Operation of the local access controller 25 will be described below with reference to FIGS. 7 through 9 and Tables 1 through 3.

In the following description, when the local access controller 25 accesses the cache memory 21 or the tag memory 22, the function of the cache memory access controller 23 or the tag memory access controller 24 is actually performed.

Figure 7:
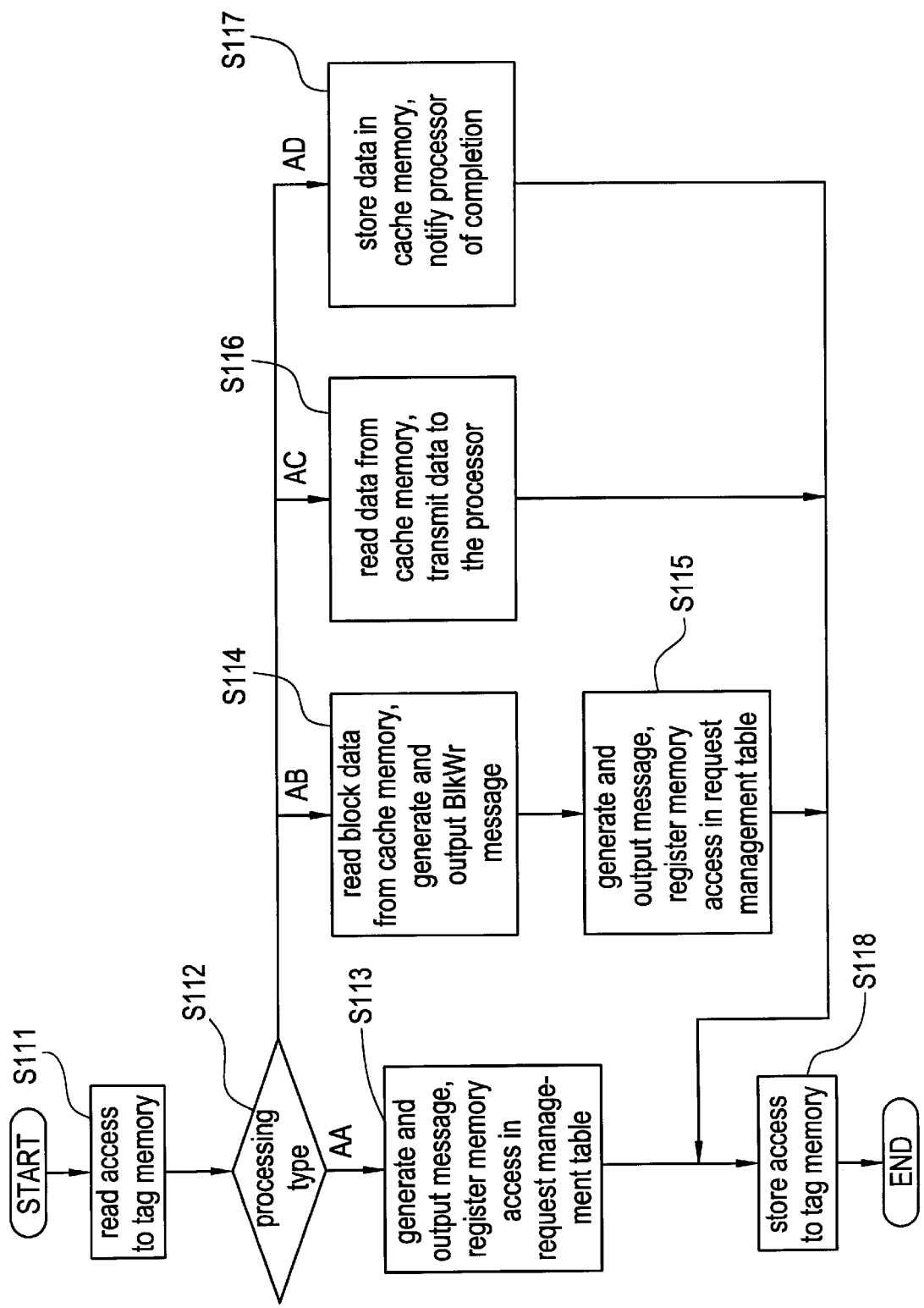
FIG. 7 is a flowchart of a processing operation, which is carried out by a local access controller of the loosely coupled multiprocessor system according to the first embodiment of the present invention, when the local access control has received a memory access outputted by a local buffer.

FIG. 7 shows a processing operation which is carried out by the local access controller 25 when the local access controller 25 has received a memory access outputted by the local buffer 38.

The local access controller 25 receives information including an access type (1 bit), an address (40 bits), an ID number (2 bits), and data (64 bits) from the local buffer 38.

In step S111, the local access controller 25 accesses the tag memory 22 to read corresponding block information which is a state and a tag address. Specifically, the local access controller 25 reads data from the 8 K entries (1 K=1024) that are indicated by 13 bits, ranging from the 19th bit to the 7th bit, of the address. obtained from the local buffer 38.

In step S112, the local access controller 25 determines one of processing types AA–AD (described later on) from three items of information, i.e., the access type, the state, and whether high-order 20 bits, ranging from the 39th bit to the 20th bit, of the address are in accord with the tag address (20 bits).

From the above three items of information, the types of messages that are outputted in steps S113, S115 if the processing type is AA or AB, and the state of a block updated in step S118 (the tag address is necessarily updated to the high-order 20 bits of the address) are also determined.

The three items of information, the processing types, the message types, and the next states are related to each other as shown in Table 1 below. The local access controller 25 has a table representing the above relationship.
(Table 1)

If the processing type is AA in step S112, then control proceeds to step S113. In step S113, the local access controller 25 generates and outputs a message according to Table 1. High-order 10 bits, ranging from the 39th bit to the 30th bit, of the address are used as the destination node number (10 bits) for the message, and its own node number (10 bits) is used as the request originating node number (10 bits). An ID number and an address obtained from the local buffer 38 are used respectively as mid and the address.

At this time, the local access controller 25 decides whether the generated message is to be outputted to the message transmitter 36 or the home access controller 27, as follows: The local access controller 25 compares the destination node number and the node number of the node $PE_i$ with each other. If the destination node number and its own node number are not in accord with each other, then the generated message is outputted to the message transmitter 36. If the destination node number and its own node number are in accord with each other, then the generated message is outputted to the home access controller 27.

In step S113, the local access controller 25 registers information about the memory access in the request management table 37. The local access controller 25 outputs an effective bit "1", a check bit "0", the access type, the address, and the data attached to the received memory access, as set data to the request management table 37, and sets the data in entries (0–3) indicated by the ID number attached to the received memory access. After step S113, control goes to step S118.

If the processing type is AB in step S112, then control proceeds to step S114. In step S114, the local access controller 25 reads 128 bytes of block data in a total of 16 entries indicated by 17 bits including 13 bits, ranging from the 19th bit to the 7th bit, of the address obtained from the local buffer 38, and 4 bits varying from 0 x 0 to 0 x f and added as low-order bits to the 13 bits, from the cache memory 21 (128 K entries×64 bits), and generates a BlkWr message with the read block data added thereto.

High-order 10 bits, ranging from the 19th bit to the 10th bit, of the tag address are used as the destination node number of the BlkWr message, and its own node number (10 bits) is used as the request originating node number. The tag address (20 bits) is used as high-order 20 bits of the address, and low-order 20 bits, ranging from the 19th bit to the 0th bit, of the address obtained from the local buffer 38 are used as low-order 20 bits of the address. The mid may be of any value.

The local access controller 25 decides whether the generated message is to be outputted to the message transmitter 36 or the home access controller 27, based on the result of comparison between the destination node number and its own node number, as with step S113.

After step S114, control goes to step S115. The processing in step S115 which is carried out by the local access controller 25 is the same as the processing in step S113, and hence will not be described in detail below. After step S114, control goes to step S118.

If the processing type is AC in step S112, then control proceeds to step S116. In step S116, the local access controller 25 reads 64 bits of data from the cache memory 21 corresponding to an entry indicated by 17 bits, ranging from the 19th bit to the 3rd bit, of the address obtained from the local buffer 38, and transmits the read data to the processor 20.

At this time, the local access controller 25 also transmits the ID number obtained from the local buffer 38 to the processor 20. It instructs the processor 20 that the transmission of the data is a reply to the memory access of the ID number. After step S116, control goes to step S118.

If the processing type is AD in step S112, then control proceeds to step S117. In step S117, the local access controller 25 writes 64 bits of data obtained from the local buffer 38 into an entry of the cache memory 21. The entry of the cache memory 21 which is accessed is indicated by 17 bits, ranging from the 19th bit to the 3rd bit, of the address obtained from the local buffer 28. The local access controller 25 also outputs the ID number to the processor 20 to instruct the completion of the memory access. Thus, the processor 20 is notified of the completion of the processing of the memory access of the ID number. After step S117, control goes to step S118.

In step S118, the local access controller 25 carries out a process for updating the tag memory 22 at the entry that has been indicated in step S111. The state is updated to a next state shown in Table 1, and the tag address is updated to high-order 20 bits, ranging from the 39th bit to the 20th bit, of the address obtained from the local buffer 38. After step S118, the processing with respect to the memory access is finished.

Figure 8:
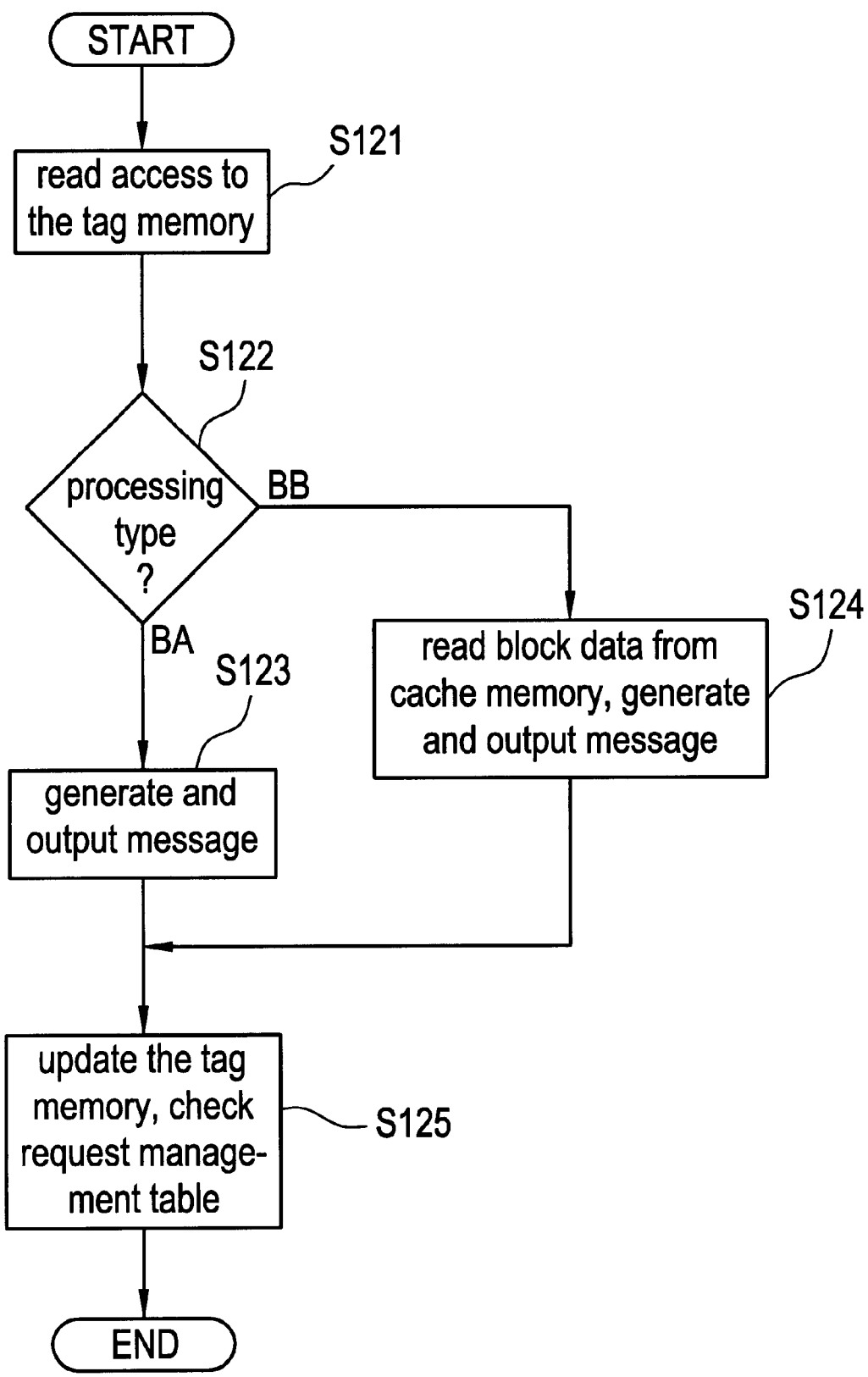
FIG. 8 is a flowchart of a processing operation which is carried out by the local access controller of the loosely coupled multiprocessor system according to the first embodiment of the present invention when the local access controller has received a message outputted by the request buffer.

FIG. 8 shows a processing operation which is carried out by the local access controller 25 receiving a message outputted by the request buffer 33.

In step S121, the local access controller 25 performs a read access to the tag memory 22 using the address contained in the message. The entry of the tag memory 22 which is accessed is indicated by 13 bits, ranging from the 19th bit to the 7th bit, of the address. The local access controller 25 now reads the state of the corresponding block and the tag address from the tag memory 22.

In step S122, the local access controller 25 determines one of the processing types BA, BB from three items of information, i.e., the access type, the state, and whether high-order 20 bits, ranging from the 39th bit to the 20th bit, of the address added to the message are in accord with the tag address. From the above three items of information, the type of a message to be outputted in step S123 and the state of the block to be updated in step S125 (the value of the tag address is not changed) are also determined.

The three items of information, the processing types, the message types, and the next states are related to each other as shown in Table 2 below. The local access controller 25 has a table representing the above relationship.
(Table 2)

If the processing type is BA in step S122, then control proceeds to step S123. In step S123, the local access controller 25 generates a message according to Table 2. The received message is used to generate the output message as it is for the request originating number, the address, and the mid. High-order 10 bits, ranging from the 39th bit to the 30th bit, of the address of the received message are used as the destination node number. The local access controller 25 decides whether the generated message is to be outputted to the message transmitter 36 or the home access controller 27, based on the result of comparison between the destination node number and its own node number, as with step S113. After step S123, control goes to step S125.

If the processing type is BB in step S122, then control proceeds to step S124. In step S124, the local access controller 25 reads 128 bytes of block data in a total of 16 entries indicated by 17 bits including 13 bits, ranging from the 19th bit to the 7th bit, of the address of the received message, and 4 bits varying from 0x0 to 0xf and added as low-order bits to the 13 bits. The local access controller 25 generates a message according to Table 2, adds the read block data to the generated message, and transmits the message through the message transmitter 36. The received message is used to generate the output message as it is for the request originating number, the address, and the mid. High-order 10 bits, ranging from the 39th bit to the 30th bit, of the address of the received message are used as the destination node number. The local access controller 25 decides whether the generated message is to be outputted to the message transmitter 36 or the home access controller 27, based on the result of comparison between the destination node number and its own node number, as with step S113. After step S124, control goes to step S125.

In step S125, the local access controller 25 updates the tag memory 22 at the entry that has been indicated in step S121. The state is updated to a next state shown in Table 2, and the tag address is updated to the address read in step S121.

The local access controller 25 also inspects the request management table 37. The local access controller 25 outputs the address attached to the received message to the request management table 37. If a memory access to the same block (bits ranging from the 39th bit to the 7th bit are the same) is registered, then the local access controller 25 sets the check bit of the corresponding entry to "1". After step S125, the processing with respect to the message is finished.

Figure 9:
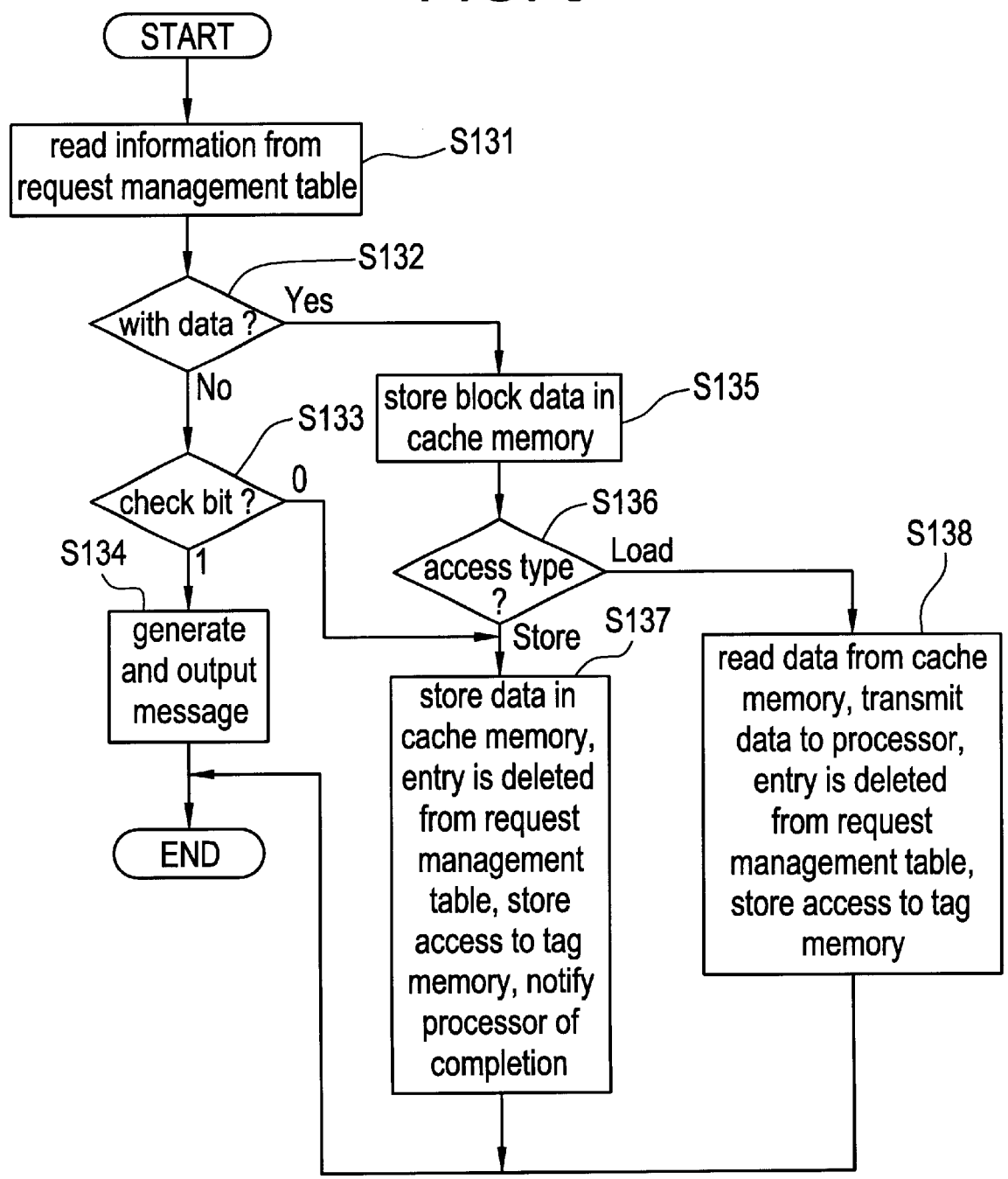
FIG. 9 is a flowchart of a processing operation which is carried out by the local access controller of the loosely coupled multiprocessor system according to the first embodiment of the present invention when the local access controller has received a message outputted by a reply buffer.

FIG. 9 shows a processing operation which is carried out by the local access controller 25 when the local access controller 25 has received a message outputted by the reply buffer 32.

The messages that are outputted from the reply buffer 32 are limited to three types of messages CmpDatSh, CmpDatEx and Cmp.

In step S131, the local access controller 25 receives the message from the reply buffer 32, outputs the mid contained in the message to the request management table 37, and reads information of the mid-th entry. In this manner, the local access controller 25 obtains information with respect to an effective bit, an access type, an address, data (64 bits), and a check bit from the request management table 37. After step S131, control goes to step S132.

In step S132, the local access controller 25 decides whether the received message is a CmpDatSh or a CmpDatEx message with block data, or a Cmp message with no data.

If the received message is not a message with data, then control proceeds to step S133. If the received message is a message with data, then control goes to step S135.

In step S133, the local access controller 25 inspects the value of the check bit obtained from the request management table 37. If the value of the inspected check bit is "1", then control proceeds to step S134. If the value of the inspected check bit is "0", then control goes to step S137.

In step S134, the local access controller 25 generates and outputs a BlkRdEx message. At this time, high-order 10 bits, ranging from the 39th bit to the 30th bit, of the address obtained from the request management table 37 are used as the request node number, its own node number is used as the request originating node number, the mid of the received message is used as the mid, and the address obtained from the request management table 37 are used as the address. The local access controller 25 decides whether the generated message is to be outputted to the message transmitter 36 or the home access controller 27, based on the result of comparison between the destination node number and its own node number, as with step S113. After step S134, the processing with respect to the received message is finished.

In step S135, the local access controller 25 writes block data (128 bytes) accompanying the message into a corresponding block in the cache memory 21. The entries are indicated by an index signal of 17 bits which include 13 bits, ranging from the 19th bit to the 7th bit, of the address obtained from the request management table 37, and 4 bits varying from 0x0 to 0xf and added as low-order bits to the 13 bits. After step S135, control goes to step S136.

In step S136, the local access controller 25 inspects the access type obtained from the request management table 37.

If the inspected access type is a store access, then control proceeds to step S137. If the inspected access type is a load access, then control goes to step S138.

In step S137, the local access controller 25 writes data (64 bits) obtained from the request management table 37 into corresponding entries in the cache memory 21. The entry is indicated by 17 bits, ranging from the 19th bit to the 3rd bit, of the address obtained from the request management table 37.

The local access controller 25 also outputs data with an effective bit set to "0" to the request management table 37, and writes its value into an entry indicated by the mid of the received message. Thus, the entry is deleted from the request management table 37.

The local access controller 25 also carries out a process for updating the tag memory 22. The entry to be updated is indicated by 13 bits, ranging from the 19th bit to the 7th bit, of the address obtained from the request management table 37. The data to be updated includes the state of the block and the tag address. The state of the block is determined by the access type (store access) and the type of the received message.

The access types, the types of the received messages, and the next states are related to each other as shown in Table 3 below. The local access controller 25 has a table representing the above relationship. The state of the block is updated according to Table 3. High-order 10 bits, ranging from the 39th bit to the 30th bit, of the address read from the request management table 37 are used as the tag address.
(Table 3)

The local access controller 25 also indicates a memory access completion to the processor 20. At this time, the mid attached to the received message is outputted to the processor 20 as the ID number. It instruct the processor 20 that the memory access of the ID number is completed. After step S137, the processing with respect to the message is finished.

In step S138, the local access controller 25 reads 64 bits data from the cache memory 21. The entry is indicated by 17 bits, ranging from the 19th bit to the 3rd bit, of the address obtained from the request management table 37. The 64 bits data thus read and the mid are transmitted to the processor 20.

The local access controller 25 also updates the contents of the request management table 37 and the contents of the tag memory 22. The process for updating the contents of the request management table 37 and the contents of the tag memory 22 is the same as the process carried out in step S137, and will not be described below. After step S138, the processing with respect to the message is finished.

Operation of the home access controller 27 will be described below with reference to FIG. 10 and Tables 4 through 7.

Figure 10:
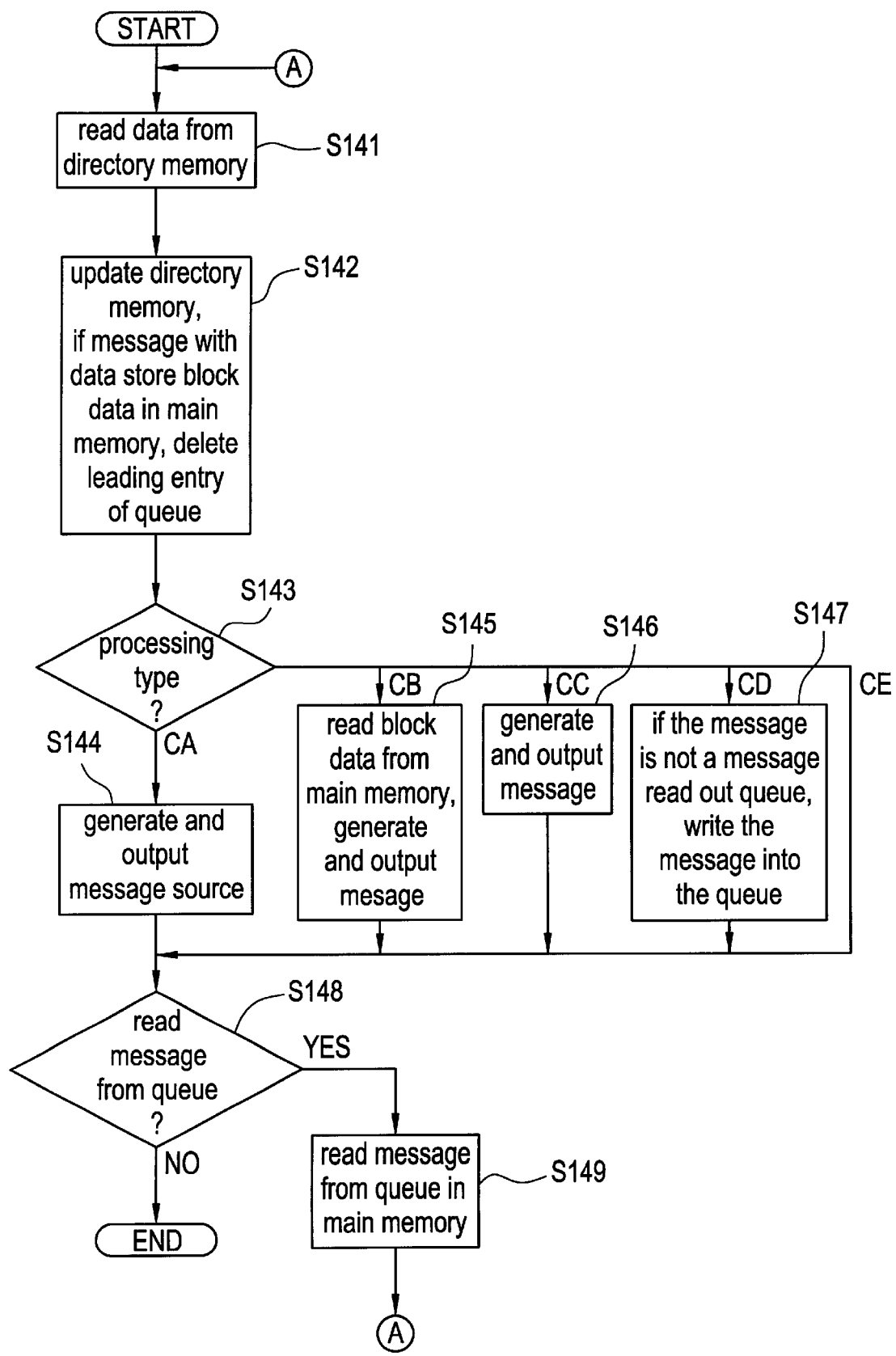
FIG. 10 is a flowchart of a processing operation which is carried out by a home access controller of the loosely coupled multiprocessor system according to the first embodiment of the present invention.

FIG. 10 shows a processing operation which is carried out by the home access controller 27.

In the following description, when the home access controller 27 accesses the main memory 30 or the directory memory 31, the function of the main memory access controller 28 or the directory memory access controller 29 is actually performed.

In the processing operation shown in FIG. 10, the home access controller 27 manipulates a state of a block and holding node information to be stored in the directory memory 31 in step S142, determines a processing type in step S143, and determines a message type and a destination buffer with respect to a message or a message source to be outputted in step S144, step S145, step 147, based on five items of information. These five items of information include the type of a received message, the state of a block read from the directory memory 31, uncached information determined from the holding node information, whether the request node number and its own node number are in accord with each other, and whether the holding node information and its own node number are in accord with each other.

Table 4 shown below represents the relationship between the five items of information used in the processing operation shown in FIG. 10, the states of blocks stored in the directory memory 31, manipulations of the holding node information, processing types, message types, and destination buffers. Table 5 shown below represents the relationship between the five items of information used in the processing operation shown in FIG. 10, the states of blocks stored in the directory memory 31, manipulations of the holding node information, processing types, message types, and destination buffers.

(Table 4)
(Table 5)

The home access controller 27 has tables representing the relationships shown in Tables 4 and 5. In Tables 4 and 5, the symbol "--" indicates either "Yes" or "No".

The home access controller 27 also determines the value of a top bit stored in the directory memory 31 in step S142 and whether a leading entry of the conflict queue is to be deleted or not in step S142, based on three items of information, i.e., whether a processing message is read from the conflict queue in step S149 or is received from other modules, whether the conflict queue is empty or not, and whether the processing type determined from Tables 4 and 5 is CD or not.

Table 6 shown below represents the relationship between various items of information, the values of the top bit, and whether a leading entry of the conflict queue is to be deleted or not. The home access controller 27 has a table representing the relationship shown in Table 6.

(Table 6)

The uncached information shown in Tables 4 and 5 is determined in different ways depending on the form of the holding node information. Specifically, when the holding node information is of a form for the block states M, RSP, the uncached information represents "Yes" if the holding node information is in accord with the request originating node number of the received message, and "No" if the holding node information is not in accord with the request originating node number of the received message.

When the holding node information is of a form for the block states REP, UP, the uncached information represents "Yes" if the value produced by subtracting "1" from the holding node information is "0", and "No" if the value produced by subtracting "1" from the holding node information is not "0". When the holding node information is of a Coarse Vector form for the block state C, the uncached information represents "Yes" if all 8 bits of the Coarse Vector are "0", and "No" if even one of 8 bits of the Coarse Vector is "1". This information serves to determine whether other nodes $PE_i$ than the request originating node $PE_i$ are holding a copy or not.

Manipulations of the holding node information shown in Tables 4 and 5 ("HOLDING NODE MANIPULATIONS" indicated in Tables 4 and 5) will be described below. There are six manipulations of the holding node information, i.e., "set", "add", "count", "dec", "clean", and "none" The manipulation "set" turns the holding node information into the holding node number type and set it to the request originating node number of the received message. The manipulation "add" is effected on the holding node number type and the Coarse Vector type. If the holding node information is of the holding node number type, then it turns into the coarse vector type and is set to a value by ANDing 8 bits produced by decoding high-order 3 bits of 10 bits which is read and 8 bits produced by decoding high-order 3 bits of the request originating node number. If the holding node information is of the Coarse Vector type, then it is set to a value produced by ANDing 8 bits which is read and 8 bits produced by decoding high-order 3 bits of the request originating node number.

The manipulation "count" is effected on the holding node number type or the Coarse Vector type, and turns it into the number of holding nodes type. According to the manipulation "count", if the holding node information is of the holding node number type, then it is set to "1". If the holding node information is of the Coarse Vector type, then it is determined by multiplying the number of bits which are of "1" among the 8 bits by the number 128 of nodes $PE_i$ expressed by one bit. However, if the bit corresponding to the request originating number is "1", the holding node information is set to a value produced by subtracting "1" from the number determined as described above.

The manipulation "dec" is effected on the number of holding nodes type, and sets the holding node information to a value produced by subtracting "1" from the value which is read. The manipulation "clean" serves to set all 10 bits to "0". The manipulation "none" serves to set the holding node information to the read value without manipulating it at all.

The processing operation shown in FIG. 10 will be described below.

In step S141, the home access controller 27 reads data (a top bit, a state, and a holding node information) from an entry in the corresponding directory memory 31, which is indexed by 22 bits, ranging from the 28th bit to the 7th bit, of the address of the received message.

In step S142, the home access controller 27 updates the value of the entry in the directory memory 31 from which the data has been read in step S141. The state is determined according to Tables 4 and 5. The holding node information is determined by a manipulation shown in Tables 4 and 5 which is effected on the holding node information that has been read in step S141. The top bit is determined according to Table 6. The entry updated in step S142 is the same as the entry accessed in step S141.

In step S142, the home access controller 27 also writes block data into the main memory 30 if the received message is a message with data. The block data is written into the main memory 30 at a total of 16 entries (128 bytes) indicated by 26 bits including 22 bits, ranging from the 28th bit to the 7th bit, of the address of the received message, and 4 bits varying from 0 x 0 to 0 x f and added as low-order bits to the 22 bits. After step S142, control proceeds to step S143.

In step S143, the home access controller 27 determines one of processing types CA–CE from the five items of information, including the type of the received message, the state of the block read from the directory memory 31, the uncached information determined from the holding node information, whether the request node number and its own node number are in accord with each other, and whether the holding node information and its own node number are in accord with each other.

If the processing type is CA in step S143, then control proceeds to step S144. If the processing type is CB, then control goes to step S145. If the processing type is CC, then control goes to step S146. If the processing is CD, then control goes to step S147. If the processing type is CE, then control goes to step S148.

In step S144, the home access controller 27 generates a message source, and outputs this source to the remote buffer 34. The source (a message type, an address, mid, a request originating node number, and holding node information) is generated as follows: The message type is determined according to Tables 4 and 5. The address, the mid, and the request originating node number are the address, the mid, and the request originating node number, respectively, of the received message. The holding node information (for the message source) is of the value read in step S141. After step S144, control proceeds to step S148.

In step S145, the home access controller 27 reads corresponding block data (128 bytes) from the main memory 30 (64 M entries×64 bits). The block data which is read is of 128 bytes in a total of 16 entries indicated by 26 bits including 22 bits, ranging from the 28th bit to the 7th bit, of the address of the received message, and 4 bits varying from 0 x 0 to 0 x f and added as low-order bits to the 22 bits. The block data is added to a generated message, and outputted to the reply buffer 32. The destination node number is the request originating node number. The message type is determined from Tables 4 and 5. The address, the mid, and the request originating node number attached to the received message are used as the address, the mid, and the request originating node number, respectively. After step S145, control proceeds to step S148.

In step S147, the home access controller 27 writes the received message into the last of the queue in the main memory 30. However, if the message which is being processed is a message read from the conflict queue in step S149, then nothing is carried out in step S147, and control goes to step S148. The messages that can be written are limited to BlkRdSh, BlkRdEx, and Upgrade messages. The information written in the queue comprises a total of 56 bits including the message type (4 bits), the address (40 bits), the mid (2 bits), and the request originating node number (10 bits). After step S147, control proceeds to step S148.

In step S148, the home access controller 27 decides whether there is a need to read a message from the queue in the main memory 30, based on five items of information, i.e., whether a message read in step S149 is processed or not, the type of the processed message, whether the conflict queue is empty or not, what is the processing type for the processed message, and what is the value of the top bit read in step S141.

The above five items of information and the determined reading of the queue are related to each other as shown in Table 7. The home access controller 27 has a table representing the above relationship.
(Table 7)

If a message needs to be read from the queue in the main memory 30 in step S148, then control goes to step S149. If a message does not need to be read from the queue in the main memory 30 in step S148, then the processing operation shown in FIG. 10 is finished.

In step S149, the home access controller 27 reads a leading message from the conflict queue in the main message 30. At this time, only the read action is taken and no deletion is made from the conflict queue. After step S149, control returns to step S141, and a message read from the queue is processed in the same manner as when a message received from the local access controller 25 or the message receiver 39 is processed. The leading message is deleted from the queue in step S142.

Specific examples of operation of the loosely coupled multiprocessor system will be described in detail below.

In these examples, memory access is performed in nodes $PE_i$ (i=0–1023) as follows:

First, a load access is performed with an ID number=0 to an address 0x0040030000 at the node $PE_1$. Then, a store access is performed with an ID number=1 to an address 0x0040030000 at the node $PE_2$. Then, a load access is performed with an ID number=2 to an address 0x0040030000 at the node $PE_2$. Thereafter, a store access is performed with an ID number=3 to an address 0x0040030008 at the node $PE_5$. Then, a load access is performed with an ID number=0 to an address 0x0040030020 at the node $PE_{128}$. Then, a store access is performed with an ID number=1 to an address 0x0040030010 at the node $PE_2$.
(Phase 1)

It is assumed that the processor 20 at the node $PE_1$ performs a load access with an ID number=0 to an address 0x0040030000.

The memory access performed by the processor 20 is outputted to the local buffer 38. In response to the memory access, the local buffer 38 outputs an address (40 bits) to the request management table 37, and checks if there is a request to the same cache block or not. The request management table 37 outputs a checked result as a pending signal. If the pending signal is "1", then it indicates that there is a request to the same cache block. If the pending signal is "1", then the local buffer 38 does not output the memory access to the local access controller 25. Having waited until the pending signal becomes "0", the local buffer 38 outputs the memory access to the local access controller 25.

In response to the memory access (the access type is a load access, the address is 0x0040030000, and the ID number=0), the local access controller 25 operates as follows: In step S111, the local access controller 25 reads data from an address 0x0600 (13 bits, ranging from the 19th bit to the 7th bit, of the address 0x0040030000 obtained from the local buffer 38) in the tag memory 22. Since the initial state is I, the processing type, the requested message, and the next state are determined respectively as AA, BlkRdSh, and I from Table 1.

Since the processing type is AA in step S112, the local access controller 25 generates and outputs a message and registers the memory access in the request management table 37 in step S113. In the generated and outputted message, the destination node number is 0x001 (10 bits, ranging from the 39th bit to the 30th bit, of the address 0x0040030000), the message type is BlkRdSh, the address is 0x0040030000, the mid is "0", and the request originating node number is 0x001. Since both the destination node number and its own node number are 0xO0l, the destination to which the message is to be outputted is the home access controller 27 at the node $PE_1$. The local access controller 25 writes data indicating that an effective bit is "1", a check bit is "0", an access type is a load access, and an address is 0x0040030000, into the 0th (=ID number) entry in the request management table 37.

In step S118, the local access controller 25 updates the state of the data in the entry of the address 0x600 in the tag memory 22 to I and the tag address thereof to 0x00400 (20 bits, ranging from the 39th bit to the 20th bit, of the address 0x0040030000). The local access controller 25 now finishes the processing of the load access.

In response to the BlkRdSh message (the destination node number is 0x001, the message type is BlkRdSh, the address is 0x0040030000, the mid is "0", and the request originating node number is 0x001), the home access controller 27 operates as follows: In step S141, the home access controller 27 accesses an address 0x000600 (22 bits, ranging from the 28th bit to the 7th bit, of the address 0x0040030000 added to the message) in the directory memory 31, and reads data such as a state. The top bit, the state, and the holding node information of the read data are "0", C, 0x000, respectively, which are initial values. Because the type of the received message is BlkRdSh, the read state is C, the holding node information is 0x000, indicating uncached information, and the request originating node number is in accord with its own node number, the processing type, the next state, the holding node manipulation, the type of a message to be outputted, and the destination are determined respectively as CB, M, "set", CmpDatEx, and the reply buffer 32 (see Table 4). Furthermore, since the home access controller 27 does not process a message read from the conflict queue, the queue is empty, and the processing type is not CD, the top bit remains to be the read value "0", and it is determined that the leading entry of the conflict queue will not be deleted (see Table 6).

In step S142, based on the above information, the home access controller 27 updates the top bit, the state, and the holding node information of the data at the address 0x000600 in the directory memory 31 respectively to "0", M, and 0x001. The home access controller 27 does not write data into the main memory 30 since the received message is BlkRdSh and not a message with data, and does not delete the leading entry of the conflict queue.

Since the processing type is CB in step S143, the home access controller 27 reads 64 bits×16 entries=128 bytes of block data ranging from the address 0x0006000 to the address 0x000600f in the main memory 30, adds the block data to a generated message, and outputs the generated message with the block data to the reply buffer 32 in step S145. The generated message is a message in which the destination node number is 0x001, the message type is CmpDatEx, the address is 0x0040030000, the mid is "0", the request originating node number is 0x001, and the block data read in step S145 is attached.

After the message is generated and outputted, the home access controller 27 checks if a message needs to be read from the conflict queue or not in step S148 according to Table 7. Since the home access controller 27 does not process a message read from the conflict queue and the message type is BlkRdSh, the home access controller 27 does not read a message from the conflict queue in step S149. The home access controller 27 now finishes the processing of the BlkRdSh message.

When the CmpDatEx message (the destination node number is 0x001, the message type is CmpDatEx, the address is 0x0040030000, the mid is "0", the request originating node number is 0x001) outputted by the home access controller 27 is received, the reply buffer 32 outputs the received information as it is to the local access controller 25.

In response to the CmpDatEx message (the destination ode number is 0x001, the message type is CmpDatEx, the address is 0x0040030000, the mid is "0", the request originating node number is 0x001), the local access controller 25 reads information from the 0th (=mid) entry in the request management table 37 in step S131, obtaining information indicating that the access type is a load access, the address is 0x0040030000, and the check bit is "0".

Since the CmpDatEx message includes a block data in step S132, then the local access controller 25 writes the block data attached to the message into the cache memory 21 at the address 0x06000 to the address 0x0600f in step S135.

Since the access type obtained from the request management table 37 is load in step S136, then the local access controller 25 reads 64 bits data from the address 0x06000 in the cache memory 21, and transmits the read data as data in reply to the memory access with the ID number=0 to the processor 20 in step S138. The local access controller 25 writes data indicating that the effective bit is "0" into the 0th entry in the request management table 37, and deletes the entry. The local access controller 25 updates the state and tag address of the data at the address 0x0600 in the tag memory 22 respectively to E and 0x00400. The local access controller 25 now finishes the processing of the CmpDatEx message.

At this stage, the latest data from the address 0x0040030000 to the address 0x004003007f is present in the main memory 30 at the node $PE_1$ and the cache memory 21 at the node $PE_1$.

(Phase 2)

It is assumed that the processor 20 at the node $PE_1$ performs a store access with an ID number=1 to an address 0x0040030000.

The memory access performed by the processor 20 is outputted to the local buffer 38. In response to the memory access, the local buffer 38 outputs an address (40 bits) to the request management table 37, and checks if there is a request to the same cache block or not. The request management table 37 outputs a checked result as a pending signal. If the pending signal is "1",then it indicates that there is a request to the same cache block.

If the load address processed in the phase 1 has not yet been finished, then the pending signal "1", and the local buffer 38 does not output the received memory access to the local request controller 25. When the processing of the phase 1 is completed and the entry of the load access is deleted from the request management table 37, the local buffer 38 starts to output the received memory access to the local request controller 25.

When the processing of the load access in the phase 1 is finished, and in response to the store access (the access type is a store access, the address is 0x0040030000, the ID number=1), the local request controller 25 operates as follows: In step S111, the local access controller 25 reads data from an address 0x0600 (13 bits, ranging from the 19th bit to the 7th bit, of the address 0x0040030000 obtained from the local buffer 38) in the tag memory 22. Since the state and the tag address have been updated respectively to E and 0x00400 in the phase 1, their values are read. Because the access type is a store access, the tag addresses are in accord with each other, and the state is E, it is determined that the processing type is AD and the next state is D.

Since the processing type is AD in step S112, the local request controller 25 updates 64 bits data at the address 0x06000 in the cache memory 21 to the data of the received store access in step S117. At the same time, the local request controller 25 outputs the ID number of the processor 20, and indicates a completion of the memory access with the ID number=1 to the processor 20.

In step S118, the local request controller 25 updates the state of the data at the address 0x0600 in the tag memory 22 to D and the tag address thereof to 0x00400. The local request controller 25 now finishes the processing of the store access.

At this stage, the latest data from the address 0x0040030000 to the address 0x004003007f is present only in the cache memory 21 at the node PE1.
Phase 3)

It is assumed that the processor 20 at the node $PE_2$ performs a load access with an ID number=2 to an address 0x0040030000.

The memory access performed by the processor 20 is outputted to the local buffer 38. In response to the memory access, the local buffer 38 outputs an address (40 bits) to the request management table 37, and checks if there is a request to the same cache block or not. If there is no request to the same cache block, then the local buffer 38 outputs the memory access to the local access controller 25.

In response to the memory access (the access type is a load access, the address is 0x0040030000, and the ID number=2), the local access controller 25 operates as follows: In step S111, the local access controller 25 reads data from an address 0x0600 in the tag memory 22. Since the initial state is I, the processing type, the requested message, and the next state are determined respectively as AA, BlkRdSh, and I from Table 1.

Since the processing type is AA in step S112, the local access controller 25 generates and outputs a message and registers the memory access in the request management table 37 in step S113. In the generated and outputted message, the destination node number is 0x001 (10 bits, ranging from the 39th bit to the 30th bit, of the address 0x0040030000), the message type is BlkRdSh, the address is 0x0040030000, the mid is "2", and the request originating node number is 0x002. Since the destination node number and its own node number are different from each other, the destination to which the message is to be outputted is the message transmitter 36. The local access controller 25 writes data indicating that an effective bit is "1", a check bit is "0", an access type is a load access, and an address is 0x0040030000, into the 2nd (=ID number) entry in the request management table 37.

In step S118, the local access controller 25 updates the state of the data in the entry of the address 0x600 in the tag memory 22 to I and the tag address thereof to 0x00400 (20 bits, ranging from the 39th bit to the 20th bit, of the address 0x0040030000). The local access controller 25 now finishes the processing of the load access.

The BlkRdSh message is sent through the message transmitter 36 at the node $PE_2$, the interconnection network 10, and the message receiver 39 at the node $PE_1$ to the home access controller 27 at the node $PE_1$.

In response to the BlkRdSh message (the destination node number is 0x001, the message type is BlkRdSh, the address is 0x0040030000, the mid is "2", and the request originating node number is 0x002), the home access controller 27 operates as follows:

In step S141, the home access controller 27 accesses an address 0x000600 (22 bits, ranging from the 28th bit to the 7th bit, of the address 0x0040030000 attached to the message) in the directory memory 31, and reads data such as a state. The top bit, the state, and the holding node information of the read data have been updated to "0", M, 0x001, respectively, in the phase 1, and these values are read. Because the type of the received message is BlkRdSh, the read state is M, the holding node information is 0x001, indicating no uncached information, and the holding node information 0x001 and its own node number 0x001 are in accord with each other, the processing type, the next state, the holding node manipulation, the type of a message to be outputted, and the destination are determined respectively as CC, RSP, "none", IntvSh, and the request buffer 33. Furthermore, since the home access controller 27 does not process a message read from the conflict queue, the queue is empty, and the processing type is not CD, the top bit remains to be the read value "0", and it is determined that the leading entry of the conflict queue will not be deleted (see Table 6).

In step S142, based on the above information, the home access controller 27 updates the top bit, the state, and the holding node information of the data at the address 0x000600 in the directory memory 31 respectively to "0", RSP, and 0x001. The home access controller 27 does not write data into the main memory 30 since the received message is BlkRdSh and not a message with data, and does not delete the leading entry of the conflict queue.

Since the processing type is CC in step S143, the home access controller 27 generates a message where the destination node number is 0x001, the message type is IntvSh, the address is 0x0040030000, the mid is "2", and the request originating node number is 0x002, and outputs the generated message to the request buffer 33 in step S146.

After the message is generated and outputted, the home access controller 27 checks if a message needs to be read from the conflict queue or not in step S148 according to Table 7. Since the home access controller 27 does not process a message read from the conflict queue and the message type is BlkRdSh, the home access controller 27 does not read a message from the conflict queue in step S149. The home access controller 27 now finishes the processing of the BlkRdSh message.

The IntvSh message is outputted through the request buffer 33 to the local access controller 25.

In response to the IntvSh message (the destination node number is 0x001, the message type is IntvSh, the address is 0x0040030000, the mid is "2" and the request originating node number is 0x002), the local access controller 25 reads data at the address 0x600 in the tag memory 22. Since the state and the tag address have been updated to D and 0x00400 in the phase 2, their values are read. Because the received message is an IntvSh message, the tag addresses are in accord with each other, and the state is D, it is determined that the processing type is BB, the type of a message to be outputted is AckData, and the next state is S in step S122.

Since the processing type is BB in step S122, control goes to step S124. In step S124, the local access controller 25 reads 64 bits×16 entries=128 bytes of block data ranging from the address 0x06000 to the address 0x0600f in the cache memory 21, and attaches the block data to an AckData message which is generated. In the AckData message, the destination node number is 0x001, the message type is AckData, the address is 0x0040030000, the request originating number is 0x002, the mid is "2", and the block data is the data read from the cache memory 21. Since the destination node number 0x001 and the node number 0x001 of the node $PE_1$ are in accord with each other, the destination to which the AckData message is to be outputted is the home access controller 27.

In step S125, the local access controller 25 updates the state and tag address of the data at the address 0x0600 in the tag memory 22 respectively to S and 0x00400. The local access controller 25 outputs the address (0x0040030000) of the received message to the request management table 37. The request management table 37 checks if the address of each entry and the address outputted by the local access controller 25 are in accord with each other with respect to the bits ranging from the 39th bit to the 7th bit. The request management table 37 updates the check bit of those entries whose bits are in accord with those of the address outputted by the local access controller 25, to "1". The local access controller 25 now finishes the processing of the IntvSh message.

At this stage, the latest data from the address 0x0040030000 to the address 0x004003007f is present in the cache memory 21 at the node $PE_1$, and the AckData message with the latest data attached thereto is outputted to the home access controller 27 at the node $PE_1$.

(Phase 4)

It is assumed that the processor 20 at the node $PE_5$ performs a store access with an ID number=3 to an address 0x0040030008.

The memory access performed by the processor 20 is outputted to the local buffer 38. In response to the memory access, the local buffer 38 outputs an address (40 bits) to the request management table 37, and checks if there is a request to the same cache block or not. If there is no request to the same cache block, then the local buffer 38 outputs the memory access to the local access controller 25.

In response to the memory access (the access type is a store access, the address is 0x0040030008, and the ID number=3), the local access controller 25 operates as follows: In step S111, the local access controller 25 reads data from an address 0x0600 in the tag memory 22. Since the initial state is I, the processing type, the requested message, and the next state are determined respectively as AA, BlkRdEx, and I from Table 1.

Since the processing type is AA in step S112, the local access controller 25 generates and outputs a message and registers the memory access in the request management table 37 in step S113. In the generated and outputted message, the destination node number is 0x001 (10 bits, ranging from the 39th bit to the 30th bit, of the address 0x0040030008), the message type is BlkRdEx, the address is 0x0040030008, the mid is "3", and the request originating node number is 0x005. Since the destination node number and the node number of the node $PE_5$ are different from each other, the destination to which the message is to be outputted is the message transmitter 36. The local access controller 25 writes data indicating that an effective bit is "1", a check bit is "0", an access type is a store access, and an address is 0x0040030008, into the 3rd (=ID number) entry in the request management table 37.

In step S118, the local access controller 25 updates the state of the data in the entry of the address 0x600 in the tag memory 22 to I and the tag address thereof to 0x00400 (20 bits, ranging from the 39th bit to the 20th bit, of the address 0x0040030008). The local access controller 25 now finishes the processing of the store access.

The BlkRdSh message is sent through the message transmitter 36 at the node $PE_5$, the interconnection network 10, and the message receiver 39 at the node $PE_1$ to the home access controller 27 at the node $PE_1$. It is assumed that the home access controller 27 processes the BlkRdSh message earlier than the AckData message outputted from the local access controller 25 at the node $PE_1$ to the home access controller 27 at the final stage of the phase 3.

In response to the BlkRdEx message (the destination node number is 0x001, the message type is BlkRdEx, the address is 0x0040030008, the mid is "3", and the request originating node number is 0x005), the home access controller 27 operates as follows:

In step S141, the home access controller 27 accesses an address 0x000600 (22 bits, ranging from the 28th bit to the 7th bit, of the address 0x0040030000 added to the message) in the directory memory 31, and reads data such as a state. The top bit, the state, and the holding node information of the read data have been updated to "0", RSP, 0x001, respectively, in the phase 3, and these values are read. Because the type of the received message is BlkRdEx and the read state is RSP, the processing type, the next state, and the holding node manipulation are determined respectively as CD, RSP, "none" . Furthermore, since the home access controller 27 does not process a message read from the conflict queue, the queue is empty, and the processing type is CD, the top bit is updated to "1", and it is determined that the leading entry of the conflict queue will not be deleted (see Table 6).

In step S142, based on the above information, the home access controller 27 updates the top bit, the state, and the holding node information of the data at the address 0x000600 in the directory memory 31 respectively to "1", RSP, and 0x001. The home access controller 27 does not write data into the main memory 30 since the received message is BlkRdEx and not a message with data, and does not delete the leading entry of the conflict queue.

Since the processing type is CD in step S143, control goes to step S147. In step S147, since the home access controller 27 does not process a message read from the conflict queue in step S149, the home access controller 27 writes message (the message type is BlkRdEx, the address is 0x004030008, the request originating node number is 0x005, and the mid is "3") into the conflict queue. Since the queue is empty, this message is placed as a leading message in the queue.

In step S148, the home access controller 27 checks if there is a need to read a message from the conflict queue or not according to Table 7. Since the home access controller 27 does not process a message read from the conflict queue and the message type is BlkRdEx, no message is read from the queue in step S149. The home access controller 27 now finishes the processing of the BlkRdEx message.

At this stage, the latest data from the address 0x0040030000 to the address 0x004003007f is present in the cache memory 21 at the node $PE_1$ and the AckData message with the latest data thereto is outputted to the home access controller 27 at the node $PE_1$.

(Phase 5)

Thereafter, the home access controller 27 receives the AckData message (the destination node number is 0x001, the message type is AckData, the address is 0x0040030000, the mid is "2", the request originating node number is 0x002, and the block data is the latest data) from the local access controller 25, and operates as follows:

In step S141, the home access controller 27 accesses an address 0x000600 (22 bits, ranging from the 28th bit to the 7th bit, of the address 0x0040030000 added to the message) in the directory memory 31, and reads data such as a state. The top bit, the state, and the holding node information of the read data have been updated to "1", RSP, 0x001, respectively, in the phase 4, and these values are read. Because the type of the received message is AckData, the read state is RSP, and the request originating node information 0x002 and the node information 0x001 are not in accord with each other, the processing type, the next state, the holding node manipulation, the type of a message to be outputted, and the destination are determined respectively as CA, C, "add", CmpDatSh, and the remote buffer 34 (see Table 5). Furthermore, since the home access controller 27 does not process a message read from the conflict queue and the queue is empty, the top bit remains to be the read value "1", and it is determined that the leading entry of the conflict queue will not be deleted (see Table 6).

In step S142, based on the above information, the home access controller 27 updates the top bit, the state, and the holding node information of the data at the address 0x000600 in the directory memory 31 respectively to "1", C, and 0x001. Since the received message is an AckData message with block data, the home access controller 27 writes the added block data into the main memory 30 at the address 0x0006000 to the address 0x000600f. Thus, the latest data is present in the main memory 30. The home access controller 27 does not delete the leading entry of the conflict queue.

Since the processing type is CA in step S143, control goes to step S144. In step S144, the home access controller 27 generates the CmpDatSh message source, and outputs the CmpDatSh message source to the remote buffer 34. In the CmpDatSh message source, the message type is CmpDatSh, the address is 0x0040030000, the mid is "2", the request originating node number is 0x002, and the holding node information is 0x001.

After the message source has been outputted, the home access controller 27 checks if a message needs to be read from the conflict queue in step S148 according to Table 7. Since the home access controller 27 does not process a message read from the conflict queue, the message type is AckData, and the top bit read in step S141 is "1", the home access controller 27 reads a message from the conflict queue in step S149.

The read message is a BlkRdEx message (the message type is BlkRdEx, the address is 0x0040030008, the request originating node number is 0x005, and the mid is "3") written in the conflict queue in the phase 4. The home access controller 27 now finishes the processing of the AckData message, and starts processing the BlkRdEx message read from the conflict queue.

The processing of the BlkRdEx message which is read by the home access controller 27 in step S149 will be described later in next phase 6. The CmpDatSh message source outputted to the remote buffer 34 in step S144 will be described below.

In response to the CmpDatSh message source (the message type is CmpDatSh, the address is 0x004030000, the mid is "2", the request originating node number is 0x002, and the holding node information is 0x001), the remote buffer 34 reads 128 bytes of data from the main memory 30 from the address 0x0006000 to the address 0x000600f, generates a message where the destination node number is 0x002, the message type is CmpDatSh, the address is 0x0040030000, the mid is "2", the request originating node number is 0x002, and the block data read from the main memory 30 is attached, and outputs the generated message to the message transmitter 36. The block data is the latest data.

The CmpDatSh message is sent through the message transmitter 36 at the node $PE_1$, the interconnection network 10, the message receiver 39 at the node $PE_2$, and the reply buffer 32 at the node $PE_2$ to the local access controller 25 at the node $PE_2$.

In response to the CmpDatSh message (the destination node number is 0x002, the message type is CmpDatSh, the address is 0x0040030000, the mid is "2", the request originating node number is 0x002, and the block data is the latest data), the local access controller 25 reads information from the 2nd (=mid) entry in the request management table 37 in step S131, obtaining information indicating that the access type is a load access, the address is 0x0040030000, and the check bit is "0".

Since the CmpDatSh message include a block data, control goes to step S135. In step S135, the local access controller 25 writes the block data attached to the message into the cache memory 21 from the address 0x06000 to the address 0x0600f.

Since the access type obtained from the request management table 37 is load in step S136, control goes to step S138. In step S138, the local access controller 25 reads 64 bits data from the address 0x06000 in the cache memory 21, and transmits the read data as data in reply to the memory access with the ID number=2 to the processor 20. The local access controller 25 writes data indicating that the effective bit is "0" into the 2nd entry in the request management table 37, and deletes the entry. The local access controller 25 updates the state and tag address of the data at the address 0x0600 in the tag memory 22 respectively to S and 0x00400. The local access controller 25 now finishes the processing of the CmpDatSh message.

At this stage, the latest data from the address 0x0040030000 to the address 0x004003007f is present in the cache memory 21 at the node $PE_1$, the main memory 30 at the node $PE_1$, and the cache memory 21 at the node $PE_2$.

(Phase 6)

In the phase 5, the home access controller 27 at the node $PE_1$ has received and processed the AckData message outputted by the local access controller 25 at the same node. In step S148, it has been determined that message needs to be read from the conflict queue. In step S149, the home access controller 27 has accessed the main memory 30 and read the BlkRdEx message (the message type is BlkRdEx, the address is 0x0040030008, the request originating node number is 0x005, and the mid is "3"). Operation of the home access controller 27 which has read the BlkRdEx message will be described below.

In step S141, the home access controller 27 accesses an address 0x000600 (22 bits, ranging from the 28th bit to the 7th bit, of the address 0x0040030008 attached to the message) in the directory memory 31, and reads data such as a state. The top bit, the state, and the holding node information of the read data have been updated to "1", C, 0x001, respectively, in the phase 5, and these values are read. Because the type of the received message is BlkRdEx, the read state is C, and the node information is 0x001 and not uncached, the processing type, the next state, the holding node manipulation, the type of a message to be outputted, and the destination are determined respectively as CA, REP, "count", Inv, and the remote buffer 34 (see Table 4). Furthermore, since the home access controller 27 processes a message read from the conflict queue and the processing type is not CD, the top bit is updated to "0", and it is determined that the leading entry of the. conflict queue will be deleted (see Table 6).

In step S142, based on the above information, the home access controller 27 updates the top bit, the state, and the holding node information of the data at the address 0x000600 in the directory memory 31 respectively to "0", REP, and 0x07f. Since the message being processed is not a message with data, the home access controller 27 does not write data into the main memory 30. The home access controller 27 deletes the leading entry of the conflict queue, deleting the entry of the read BlkRdEx message. The conflict queue is thus made empty.

Since the processing type is CA in step S143, control goes to step S144. In step S144, the home access controller 27 generates a message source, and outputs the message source to the remote buffer 34. In the message source, the message type is Inv, the address is 0x0040030008, the mid is "3", the request originating node number is 0x005, and the holding node information is 0x001.

In step S148, the home access controller 27 checks if a message needs to be read from the conflict queue according to Table 7. Since the home access controller 27 processes a message read from the conflict queue and the conflict queue is empty, the home access controller 27 does not read a message from the conflict queue in step S149. The home access controller 27 now finishes the processing of the BlkRdEx message read from the conflict queue.

In response to the Inv message source (the message type is Inv, the address is 0x0040030008, the mid is "3", the request originating node number is 0x005, and the holding node information is 0x001), the remote buffer 34 successively generates 127 messages where the message type is Inv, the address is 0x0040030008, the mid is "3", the request originating node number is 0x005, and the destination node numbers range from 0x000 to 0x07f except 0x005, and outputs the generated messages to the message transmitter 36.

These Inv messages are outputted through the message transmitter 36 at the node $PE_1$, the interconnection network 10, the message receivers 39 and the request buffers 33 at the nodes $PE_0$–$PE_{127}$ (except the node $PE_5$) to the local access controllers 25 thereof.

At this stage, the latest data from the address 0x0040030000 to the address 0x004003007f is present in the cache memory 21 at the node $PE_1$, the main memory 30 at the node $PE_1$, and the cache memory 21 at the node $PE_2$. (Phase 7)

It is assumed that the processor 20 at the node $PE_{128}$ performs a load access with an ID number=0 to an address 0x0040030020.

The memory access performed by the processor 20 is outputted to the local buffer 38. In response to the memory access, the local buffer 38 outputs an address (40 bits) to the request management table 37, and checks if there is a request to the same cache block or not. If there is no request to the same cache block, then the local buffer 38 outputs the memory access to the local access controller 25.

In response to the memory access (the access type is a load access, the address is 0x0040030020, and the ID number=0), the local access controller 25 operates as follows: In step S111, the local access controller 25 reads data from an address 0x0600 in the tag memory 22. Since the initial state is I, the processing type, the requested message, and the next state are determined respectively as AA, BlkRdSh, and I from Table 1.

In step S112, the processing type is determined as AA. Then, control goes to step S113. In step S113, the local access controller 25 generates and outputs a message and registers it in the request management table 37. In the generated and outputted message, the destination node number is 0x001 (10 bits, ranging from the 39th bit to the 30th bit, of the address 0x0040030000), the message type is BlkRdSh, the address is 0x0040030020, the mid is "0", and the request originating node number is 0x080. Since the destination node number and the node number of the node $PE_{128}$ are different from each other, the destination to which the message is to be outputted is the message transmitter 36. The local access controller 25 writes data indicating that an effective bit is "1", a check bit is "0", an access type is a load access, and an address is 0x0040030020, into the 0th (=ID number) entry in the request management table 37.

In step S118, the local access controller 25 updates the state of the data in the entry of the address 0x600 in the tag memory 22 to I and the tag address thereof to 0x00400 (20 bits, ranging from the 39th bit to the 20th bit, of the address 0x0040030000). The local access controller 25 now finishes the processing of the load access.

The BlkRdSh message is sent through the message transmitter 36 at the node $PE_{128}$, the interconnection network 10, and the message receiver 39 at the node $PE_1$ to the home access controller 27 at the node $PE_1$.

In response to the BlkRdSh message (the destination node number is 0x001, the message type is BlkRdSh, the address is 0x0040030020, the mid is "0", and the request originating node number is 0x080), the home access controller 27 operates as follows:

The home access controller 27 accesses an address 0x000600 (22 bits, ranging from the 28th bit to the 7th bit, of the address 0x00400030020 added to the message) in the directory memory 31, and reads data such as a state. The top bit, the state, and the holding node information of the read data have been updated to "0", REP, 0x07f, respectively, in the phase 6, and these values are read. Because the type of the received message is BlkRdSh and the read state is REP, the processing type, the next state, and the holding node manipulation are determined respectively as CD, REP, "none" (see Table 4).

Furthermore, since the home access controller 27 does not process a message read from the conflict queue, the queue is empty, and the processing type is CD, the top bit is updated to "1" in step S141, and it is determined that the leading entry of the conflict queue will not be deleted (see Table 6).

In step S142, based on the above information, the home access controller 27 updates the top bit, the state, and the holding node information of the data at the address 0x000600 in the directory memory 31 respectively to "1", REP, and 0x07f. The home access controller 27 does not write data into the main memory 30 since the received message is BlkRdSh and not a message with data, and does not delete the leading entry of the conflict queue.

Since the processing type is CD in step S143, control goes to step S147. In step S147, since the home access controller 27 does not process a message read from the conflict queue in step S149, the home access controller 27 writes the message (the message type is BlkRdSh, the address is 0x004030020, the request originating node number is 0x080, and the mid is "0") into the conflict queue in the main memory 30. Since the queue is empty, this message is placed as a leading message in the queue.

In step S148, the home access controller 27 checks if there is a need to read a message from the conflict queue or not according to Table 7. Since the home access controller 27 does not process a message read from the conflict queue and the message type is BlkRdSh, no message is read from the conflict queue in step S149. The home access controller 27 now finishes the processing of the BlkRdSh message.

At this stage, the latest data from the address 0x0040030000 to the address 0x004003007f is present in the cache memory 21 at the node $PE_1$, the main memory 30 at the node $PE_1$, and the cache memory 21 at the node $PE_2$. (Phase 8)

It is assumed that the processor 20 at the node $PE_2$ performs a store access with an ID number=1 to an address 0x0040030010.

The memory access performed by the processor 20 is outputted to the local buffer 38. In response to the memory access, the local buffer 38 outputs an address (40 bits) to the request management table 37, and checks if there is a request to the same cache block or not. If there is no request to the same cache block, then the local buffer 38 outputs the memory access to the local access controller 25.

In response to the memory access (the access type is a store access, the address is 0x0040030010, and the ID number=1), the local access controller 25 operates as follows: In step S111, the local access controller 25 reads data from an address 0x0600 in the tag memory 22. The state and tag address of the read data have been updated to S and 0x00400, respectively, in the phase 5, and these values are read. Because the access type is a store access, the tag addresses are the same 0x00400, and the state is S, the processing type, the type of the message to be outputted, and the next state are determined respectively as AA, Upgrade, S (see Table 1).

Since the processing type is AA in step S112, control goes to step S113. In step S113, the local access controller 25 generates and outputs a message and registers the memory access in the request management table 37. In the generated and outputted message, the destination node number is OxOOl (10 bits, ranging from the 39th bit to the 30th bit, of the address 0x0040030010), the message type is Upgrade, the address is 0x0040030010, the mid is "1", and the request originating node number is 0x002. Since the destination node number and the node number of the node $PE_2$ are different from each other, the destination to which the message is to be outputted is the message transmitter 36. The local access controller 25 writes data indicating that an effective bit is "1", a check bit is "0", an access type is store, and an address is 0x0040030010, and stored data into the 1st (=ID number) entry in the request management table 37.

In step S118, the local access controller 25 updates the state of the data in the entry of the address 0x600 in the tag memory 22 to S and the tag address thereof to 0x00400 (20 bits, ranging from the 39th bit to the 20th bit, of the address 0x0040030010).

The Upgrade message is sent through the message transmitter 36 at the node $PE_2$, the interconnection network 10, and the message receiver 39 at the node $PE_1$ to the home access controller 27 at the node $PE_1$.

In response to the Upgrade message (the destination node number is 0x001, the message type is Upgrade, the address is 0x0040030010, the mid is "1", and the request originating node number is 0x002), the home access controller 27 operates as follows:

In step S141, the home access controller 27 accesses an address 0x000600 (22 bits, ranging from the 28th bit to the 7th bit, of the address 0x00400030010 added to the message) in the directory memory 31, and reads data such as a state. The top bit, the state, and the holding node information of the read data have been updated to "1", REP, 0x07f, respectively, in the phase 7, and these values are read. Because the type of the received message is Upgrade and the read state is REP, the processing type, the next state, and the holding node manipulation are determined respectively as CD, REP, "none" (see Table 4). Furthermore, since the home access controller 27 does not process a message read from the conflict queue and the queue is not empty, the top bit remains to be the read value of "1", and it is determined that the leading entry of the conflict queue will not be deleted (see Table 6).

In step S142, based on the above information, the home access controller 27 updates the top bit, the state, and the holding node information of the data at the address 0x000600 in the directory memory 31 respectively to "1", REP, and 0x07f. The home access controller 27 does not write data into the main memory 30 since the received message is Upgrade and not a message with data, and does not delete the leading entry of the conflict queue.

Since the processing type is CD in step S143, control goes to step S147. In step S147, since the home access controller 27 does not process a message read from the conflict queue in step S149, the home access controller 27 writes message (the message type is Upgrade, the address is 0x004030010, the request originating node number is 0x002, and the mid is "1") into the conflict queue.

In step S148, the home access controller 27 checks if there is a need to read a message from the conflict queue or not according to Table 7. Since the home access controller 27 does not process a message read from the conflict queue and the message type is Upgrade, no message is read from the conflict queue. The home access controller 27 now finishes the processing of the Upgrade message.

At this stage, the latest data from the address 0x0040030000 to the address 0x004003007f is present in the cache memory 21 at the node $PE_1$, the main memory 30 at the node $PE_1$, and the cache memory 21 at the node $PE_2$. (Phase 9)

The 127 Inv messages (the destination node numbers range from 0x000 to 0x07f except 0x005, the message type is Inv, the address is 0x0040030008, the mid is "3", the request originating node number is 0x005) transmitted from the nodes $PE_1$ in the phase 6 are outputted through the interconnection network 10, the message receivers 39 and the request buffers 33 at the destination nodes to the local access controllers 25 thereof.

In step S121, the local access controller 25 which has received the Inv message reads data from an address 0x0600 in the tag memory 22. Depending on whether the read tag address is in accord with 0x00400 and what is the state, the processing type, the type of a message to be outputted, and the next state of the tag memory 22 are determined (see Table 2).

Since the processing type is necessarily BA in step S122, an Ack message is generated in step S123. In the Ack message, the destination node number is 0x001, the message type is Ack, the address is 0x0040030008, the mid is "3", and the request originating number is 0x005. The local access controller 25 determines the destination to which the message is to be outputted depending on the result of comparison between the destination node number 0x001 and the node number. At the node $PE_1$, the destination node number and its own node number are in accord with each other, the local access controller 25 outputs the Ack message to the home access controller 27. At another node, the destination node number and its own node number are not in accord with each other, the local access controller 25 outputs the Ack message to the message transmitter 36.

The local access controller 25 updates the tag memory at the entry of the address 0x0600 from which the data has previously been read. The local access controller 25 writes the state determined from Table 2 and the tag address previously read from the tag memory 22 into the tag memory. The local access controller 25 outputs the address (0x0040030008) of the received message to the request management table 37. The request management table 37 checks if the address of each entry and the address outputted by the local access controller are in accord with each other with respect to the bits ranging from the 39th bit to the 7th bit. The request management table 37 updates the check bit of those entries whose bits are in accord with those of the address outputted by the local access controller 25, to "1".

For example, at the node $PE_2$, the store access to the address 0x0040030010 has been processed in the phase 8, and the memory access has been registered in the 1st entry in the request management table 37. Since the 39th bit to the 7th bit of the address 0x0040030010 in the first entry in the request management table 37 agree with those of the address 0x0040030008 outputted by the local access controller 25 to the request management table 37, the request management table 37 updates the check bit in the 1st entry to "1". The local access controller 25 now finishes the processing of the Inv message.

The node $PE_0$, the nodes $PE_2$–$PE_4$, the nodes $PE_6$–$PE_{127}$ transmit respective Ack messages (the destination node is 0x001, the message type is Ack, the address is 0x0040030008, the mid is "3", and the request originating number is 0x005) to the node $PE_1$. These Ack messages are sent through the message transmitters 36 at the respective nodes, the interconnection network 10, and the message receiver 39 at the node $PE_1$ to the home access controller 27 at the node $PE_1$.

At the node $PE_1$, the local access controller 25 outputs Ack messages (the destination node is 0x001, the message type is Ack, the address is 0x0040030008, the mid is "3", and the request originating number is 0x005) to the home access controller 27. The home access controller 27 at the node $PE_1$ receives and processes a total of 127 Ack messages which are identical to each other. When the home access controller 27 at the node $PE_1$ receives the first one of these Ack messages, the home access controller 27 operates as follows:

In step S141, the home access controller 27 accesses an address 0x000600 (22 bits, ranging from the 28th bit to the 7th bit, of the address 0x00400030008 added to the message) in the directory memory 31, and reads data such as a state. The top bit, the state, and the holding node information of the read data have been updated to "1", REP, 0x07f, respectively, in the phase 8, and these values are read. Because the type of the received message is Ack, the read state is REP, and the holding node information is 0x07f and not uncached, the processing type, the next state, the holding node manipulation, and a message to be outputted are determined respectively as CE, REP, "dec", nil (see Table 5). Furthermore, since the home access controller 27 does not process a message read from the conflict queue and the queue is not empty, the top bit remains to be the read value of "1", and it is determined that the leading entry of the conflict queue will not be deleted (see Table 6).

In step S142, based on the above information, the home access controller 27 updates the top bit, the state, and the holding node information of the data at the address 0x000600 in the directory memory 31 respectively to "1", REP, and 0x07e. Since the message being processed is not a message with data, the home access controller 27 does not write data into the main memory 30, and does not delete the leading entry of the conflict queue.

Since the processing type is CE in step S143, the home access controller 27 checks if a message needs to be read from the conflict queue in step S148. Since the home access controller 27 does not process a message read from the conflict queue, the message type is Ack, and the processing type is CE, the home access controller 27 does not read a message from the conflict queue in step S149 according to the Table 7. The home access controller 27 now finishes the processing of the Ack message.

The home access controller 27 processes Ack messages from the respective nodes $PE_i$ in the manner described above, reads the value in the directory memory 31, and updates the holding node information to a value which is decreased by "1" each time the home access controller 27 processes an Ack message. This process is continued insofar as the decreased value is not 0x000, i.e., the holding node information is not uncached. When the holding node information is uncached, i.e., when the final 127th Ack message is received, the home access controller 27 operates as follows:

In step S141, the home access controller 27 which has received the final 127th Ack message accesses an address 0x000600 (22 bits, ranging from the 28th bit to the 7th bit, of the address 0x00400030008 added to the message) in the directory memory 31, and reads data such as a state. The top bit, the state, and the holding node information of the read data have been updated to "1", REP, 0x001, respectively, and these values are read. Because the type of the received message is Ack, the read state is REP, the holding node information is 0x001 and uncached, and the request originating node number 0x005 is different from the node number 0x001 at the node $PE_1$, the processing type, the next state, the holding node manipulation, the type of a message to be outputted, and the destination are determined respectively as CA, M, "set", CmpDatEx, the remote buffer 34 (see Table 5). Furthermore, since the home access controller 27 does not process a message read from the conflict queue and the queue is not empty, the top bit remains to be the read value of "1", and it is determined that the leading entry of the conflict queue will not be deleted (see Table 6).

In step S142, based on the above information, the home access controller 27 updates the top bit, the state, and the holding node information of the data at the address 0x000600 in the directory memory 31 respectively to "1", M, and 0x005. Since the message being processed is not a message with data, the home access controller 27 does not write data into the main memory 30, and does not delete the leading entry of the conflict queue.

The processing type is determined as CA in step S143. Then, control goes to step S144. In step S144, the home access controller 27 generates the CmpDatEx message source, and outputs the CmpDatEx message source to the remote buffer 34. In the CmpDatEx message source, the message type is CmpDatEx, the address is 0x0040030008, the mid is "3", the request originating node number is 0x005, and the holding node information is 0x001.

In step S148, the home access controller 27 checks if message needs to be read from the conflict queue according to Table 7. Since the home access controller 27 does not process a message read from the conflict queue, the message type is Ack, the processing type is CA, and the top bit is "1", the home access controller 27 reads a message from the conflict queue.

The BlkRdSh message has been written in the conflict queue in the phase 7, and the Upgrade message has been written in the conflict queue in the phase 8. In step S149, the home access controller 27 reads the former BlkRdSh message (the message type is BlkRdSh, the address is 0x0040030020, the request originating node number is 0x080, and the mid is "0"). The home access controller 27 now finishes the processing of the Ack message, and starts processing the BlkRdSh message read from the conflict queue.

The processing of the BlkRdSh message which is read by the home access controller 27 in step S149 will be described later in next phase 10. The CmpDatEx message source outputted to the remote buffer 34 in step S144 will be described below.

In response to the CmpDatEx message source (the message type is CmpDatEx, the address is 0x004030008, the mid is "3", the request originating node number is 0x005, and the holding node information is 0x001), the remote buffer 34 reads 128 bytes of data from the main memory 30 from the address 0x0006000 to the address 0x000600f, generates a message where the destination node number is 0x005, the message type is CmpDatEx, the address is 0x0040030008, the mid is "3", the request originating node number is 0x005, and the block data read from the main memory 30 is attached, and outputs the generated message to the message transmitter 36. The block data is the latest data.

The CmpDatEx message is sent through the message transmitter 36 at the node $PE_1$, the interconnection network 10, the message receiver 39 at the node $PE_5$, and the reply buffer 32 at the node $PE_5$ to the local buffer 38 at the node $PE_5$.

In response to the CmpDatEx message (the destination node number is 0x005, the message type is CmpDatEx, the address is 0x0040030008, the mid is "3", the request originating node number is 0x005, and the block data is the latest data), the local access controller 25 reads information from the 3rd (=mid) entry in the request management table 37 in step S131, obtaining information indicating that the access type is store, the address is 0x0040030008, and the check bit is "0".

Since the CmpDatEx message includes the block data in step S132, in step S135, the local access controller 25 writes the block data attached to the message into the cache memory 21 from the address 0x06000 to the address 0x0600f.

Since the access type is store in step S136, in step S137, the local access controller 25 updates 64 bits data at the address 0x06000 in the cache memory 21 to stored data obtained from the request management table 37. The local access controller 25 writes data indicating that the effective bit is "0" into the 3rd (=mid) entry in the request management table 37, and deletes the entry. The local access controller 25 updates the state and tag address of the data at the address 0x0600 in the tag memory 22 respectively to D and 0x00400 (20 bits, ranging from the 39th bit to the 20th bit, of the address 0x0040030008 obtained from the request management table 37). The local access controller 25 outputs the mid to the processor 20, indicating that the memory access with the ID number=3 is completed. The local access controller 25 now finishes the processing of the CmpDatEx message.

At this stage, the latest data from the address 0x0040030000 to the address 0x004003007f is present only in the cache memory 21 at the node $PE_5$.

(Phase 10)

In the phase 9, the home access controller 27 at the node $PE_1$ has processed the 127 Ack messages in step S149. In processing the 127th Ack message in step S148, the home access controller 27 has determined that message needs to be read from the conflict queue, accessed the main memory 30, and read the BlkRdSh message (the message type is BlkRdSh, the address is 0x004030020, the request originating node number is 0x080, and the mid is "0") from the main memory 30. Operation of the home access controller 27 which has read the BlkRdSh message will be described below.

In step S141, the home access controller 27 accesses an address 0x000600 (22 bits, ranging from the 28th bit to the 7th bit, of the address 0x00400030020 of the message read from the conflict queue) in the directory memory 31, and reads data such as a state. The top bit, the state, and the holding node information of the read data have been updated to "1", M, 0x005, respectively, in the phase 9, and these values are read. Because the type of the message read from the queue is BlkRdSh, the read state is M, the holding node information is 0x005 and not uncached, and the holding node information 0x005 is different from the node number 0x001, the processing type, the next state, the holding node manipulation, the type of a message to be outputted, and the destination are determined respectively as CA, RSP, "none", IntvSh, the remote buffer 34 (see Table 4). Furthermore, since the home access controller 27 processes a message read from the conflict queue and the processing type is not CD, the top bit is updated to "0", and it is determined that the leading entry of the conflict queue will be deleted (see Table 6).

In step S142, based on the above information, the home access controller 27 updates the top bit, the state, and the holding node information of the data at the address 0x000600 in the directory memory 31 respectively to "0", RSP, and 0x005. Since the message being processed is not a message with data, the home access controller 27 does not write data into the main memory 30. The home access controller 27 deletes the leading entry of the conflict queue, deleting the entry of the BlkRdSh message which is read. Thus, only the Upgrade message written in the phase 8 is present in the conflict queue.

Since the processing type is CA in step S143, control goes to step S144. In step S144, the home access controller 27 generates and outputs the message source to the remote buffer 34. In the message source, the message type is IntvSh, the address is 0x0040030020, the mid is "0", the request originating node number is 0x080, and the holding node information is 0x005.

In step S148, the home access controller 27 checks if message needs to be read from the conflict queue according to Table 7. Since the home access controller 27 processes a message read from the conflict queue in step S149, the queue is not empty, and the processing type is CA, the home access controller 27 reads a message from the conflict queue.

In step S149, the home access controller 27 reads the information of the Upgrade message (the message type is Upgrade, the address is 0x0040030010, the request originating node number is 0x002, and the mid is "1") written in the phase 8. The home access controller 27 now finishes the processing of the BlkRdSh message read from the conflict queue, and starts processing the Upgrade message read from the conflict queue.

The IntvSh message source outputted by the home access controller 27 to the remote buffer 34 in step S144 will be described later in next phase 11. The processing of the Upgrade message read from the conflict queue will be described below. The home access controller 27 which has read the Upgrade message operates as follows:

In step S141, the home access controller 27 accesses an address 0x000600 (22 bits, ranging from the 28th bit to the 7th bit, of the address 0x00400030010 added to the message) in the directory memory 31, and reads data such as a state. The top bit, the state, and the holding node information of the read data have been updated to "0", RSP, 0x005, respectively, in the phase 10, and these values are read. Because the type of the message being processed is Upgrade and the read state is RSP, the processing type, the next state, and the holding node manipulation are determined respectively as CE, RSP, "none" (see Table 4). Furthermore, since the home access controller 27 processes a message read from the conflict queue and the processing type is CD, the top bit is updated to "1", and it is determined that the leading entry of the conflict queue will not be deleted (see Table 6).

In step S142, based on the above information, the home access controller 27 updates the top bit, the state, and the holding node information of the data at the address 0x000600 in the directory memory 31 respectively to "1", RSP, and 0x005. Since the message being processed is not a message with data, the home access controller 27 does not write data into the main memory 30. The home access controller 27 does not delete the leading entry of the conflict queue.

Since the processing type is CD in step S143, control goes to step S148. In step S148, since a message read from the conflict queue is to be processed, the home access controller 27 does not write message into the conflict queue, and checks if message is to be read from the conflict queue.

According to Table 7, since a message read from the conflict queue is to be processed, the queue is not empty, and the processing type is CD, the home access controller 27 does not read a message from the conflict queue. The home access controller 27 now finishes the processing of the Upgrade message read from the conflict queue.

At this stage, the latest data from the address 0x0040030000 to the address 0x004003007f is present only in the cache memory 21 at the node PE$_5$.

(Phase 11)

In the phase 10, the home access controller 27 at the node PE$_1$ has processed the BlkRdSh message read from the conflict queue. In the processing of the BlkRdSh message, the home access controller 27 has outputted the IntvSh message source to the remote buffer 34. The IntvSh message source will be described below.

In response to the IntvSh message source (the message type is IntvSh, the address is 0x0040030020, the mid is "Q", the request originating node number is 0x080, and the holding node information is 0x005), the remote buffer 34 generates the IntvSh message where the destination node number is 0x005, the message type is IntvSh, the address is 0x0040030020, the mid is "0", and the request originating node number is 0x080, and outputs the generated message to the message transmitter 36.

The IntvSh message is outputted through the message transmitter 36 at the node PE$_1$, the interconnection network 10, the message receiver 39 at the node PE$_5$, and the request buffer 33 at the node PE$_5$ to the local access controller 25 at the node PE$_5$.

In step S121, the local access controller 25 which has received the IntvSh message (the destination node number is 0x005, the message type is IntvSh, the address is 0x0040030020, the mid is "0", and the request originating node number is 0x080) reads data from an address 0x0600 in the tag memory 22. The state and the tag address which have been updated respectively to D and 0x00400 in the phase 9 are read. Since the received message is IntvSh, the tag addresses are in accord with each other, and the state is D, the processing type, the type of a message to be outputted, and the next state are determined respectively as BB, AckData, S.

Since the processing type is BB in step S122, control goes to step S124. In step S124, the local access controller 25 reads 64 bits×16 entries=128 bytes of block data ranging. from the address 0x06000 to the address 0x0600f in the cache memory 21, and attaches the block data to an AckData message to be generated. In the AckData message to be generated, the destination node number is 0x001, the message type is AckData, the address is 0x0040030020, the request originating node number is 0x080, the mid is "0", and the block data read from the cache memory 21 is attached. Since the destination node number 0x001 and the node number 0x005 are not in accord with each other, the destination to which the message is to be outputted is the message transmitter 36.

In step S125, the local access controller 25 updates the state and tag address of data at the address 0x0600 in the tag memory 22 respectively to S (see Table 2) and 0x00400 (the tag address read from the tag memory 22). The local access controller 25 outputs the address (0x0040030000) of the received message to the request management table 37. The request management table 37 checks if the address of each entry and the address outputted by the local access controller 25 are in accord with each other with respect to the bits ranging from the 39th bit to the 7th bit. The request management table 37 updates the check bit of those entries whose bits are in accord with those of the address outputted by the local access controller 25, to "1". The local access controller 25 now finishes the processing of the IntvSh message.

The AckData message is outputted through the message transmitter 36 at the node PE$_5$, the interconnection network 10, and the message receiver 39 at the node PE$_1$ to the home access controller 27 at the node PE$_1$.

In response to the AckData message (the destination node number is 0x001, the message type is AckData, the address is 0x0040030020, the mid is "0", the request originating node number is 0x080, and the block data is the latest data), the home access controller 27 operates as follows:

In step S141, the home access controller 27 accesses an address 0x000600 (22 bits, ranging from the 28th bit to the 7th bit, of the address 0x00400030010 added to the message) in the directory memory 31, and reads data such as a state. The top bit, the state, and the holding node information of the read data have been updated to "1", RSP, 0x005, respectively, in the phase 10, and these values are read. Because the type of the received message is AckData, the read state is RSP, and the request originating node number 0x080 is not in accord with the node number 0x001, the processing type, the next state, the holding node manipulation, the type of a message to be outputted, and the destination are determined respectively as CA, C, "add", CmpDatSh, and the remote buffer 34 (see Table 5). Furthermore, since the home access controller 27 does not process a message read. from the conflict queue and the queue is not empty, the top bit remains to be the read value of "1", and it is determined that the leading entry of the conflict queue will not be deleted (see Table 6).

In step S142, based on the above information, the home access controller 27 updates the top bit, the state, and the holding node information of the data at the address 0x000600 in the directory memory 31 respectively to "1", C, and 0x003. Since the message being processed is an AckData message with block data, the home access controller 27 writes the attached block data into the main memory 30 at the address 0x0006000 to the address 0x000600f. Thus, the latest data is present in the main memory 30. The home access controller 27 does not delete the leading entry of the conflict queue.

Since the processing type is CA in step S143, control goes to step S144. In step S144, the home access controller 27 generates the CmpDatSh message source, and outputs the CmpDatSh message source to the remote buffer 34. In the CmpDatSh message source, the message type is CmpDatSh, the address is 0x0040030020, the mid is "0", the request originating node number is 0x080, and the holding node information is 0x005.

After the message source has been outputted, the home access controller 27 checks if a message needs to be read from the conflict queue in step S148 according to Table 7. Since the home access controller 27 does not process a message read from the conflict queue, the message type is AckData, the processing type is CA, and the top bit read in step S141 is "1", the home access controller 27 reads a message from the conflict queue in step S149.

The message read in step S149 is an Upgrade message (the message type is Upgrade, the address is 0x0040030010, the request originating node number is 0x002, and the mid is "1") written in the conflict queue in the phase 8. The home access controller 27 now finishes the processing of the AckData message, and starts processing the Upgrade message read from the conflict queue.

The Upgrade message read by the home access controller 27 in step S149 will be described later in next phase 12. The CmpDatSh message outputted to the remote buffer 34 in step S144 will be described below.

In response to the CmpDatSh message source (the message type is CmpDatSh, the address is 0x004030020, the mid is "0", the request originating node number is 0x080, and the holding node information is 0x005), the remote buffer 34 reads 128 bytes of data from the main memory 30 from the address 0x0006000 to the address 0x000600f, generates a message where the destination node number is 0x080, the message type is CmpDatSh, the address is 0x0040030020, the mid is "0", the request originating node number is 0x080, and the block data read from the main memory 30 is attached, and outputs the generated message to the message transmitter 36. The block data is the latest data.

The CmpDatSh message is sent through the message transmitter 36 at the node $PE_1$, the interconnection network 10, the message receiver 39 at the node $PE_{80}$, and the reply buffer 32 at the node $PE_{80}$ to the local buffer 38 at the node $PE_{80}$.

In response to the CmpDatSh message (the destination node number is 0x080, the message type is CmpDatSh, the address is 0x0040030020, the mid is "0", the request originating node number is 0x080, and the block data is the latest data), the local access controller 25 reads information from the 0th (=mid) entry in the request management table 37 in step S131, obtaining information indicating that the access type is load, the address is 0x0040030020, and the check bit is "0".

Since the CmpDatSh message includes the block data in step S132, the local access controller 25 writes the block data attached to the message into the cache memory 21 from the address 0x06000 to the address 0x0600f in step S135.

Since the access type is load in step S136, control goes to step S138. In step S138, the local access controller 25 reads 64 bits data at the address 0x06004 in the cache memory 21, and transmits the read data as data in reply to the memory access with the ID number=0 to the processor 20. The local access controller 25 writes data indicating that the effective bit is "0" into the 0th entry in the request management table 37, and deletes the entry. The local access controller 25 updates the state and tag address of the data at the address 0x0600 in the tag memory 22 respectively to S (see Table 3). and 0x00400 (20 bits, ranging from the 39th bit to the 20th bit, of the address 0x0040030020 added to the request management table 37). The local access controller 25 now finishes the processing of the CmpDatSh message.

At this stage, the latest data from the address 0x0040030000 to the address 0x004003007f is present in the cache memory 21 at the node $PE_5$, the main memory 30 at the node $PE_1$, and the cache memory 21 at the node $PE_{80}$.
(Phase 12)

In the phase 11, the home access controller 27 at the node $PE_1$ has processed the AckData message. In the processing in step S149, because it has been determined that message needs to be read from the conflict queue, the home access controller 27 has accessed the main memory 30 and read the Upgrade message (the message type is Upgrade, the address is 0x0040030010, the request originating node number is 0x002, and the mid is "1"). Operation of the home access controller 27 after it has read the Upgrade message will be described below.

In step S141, the home access controller 27 accesses an address 0x000600 (22 bits, ranging from the 28th bit to the 7th bit, of the address 0x00400030010 added to the message) in the directory memory 31, and reads data such as a state. The top bit, the state, and the holding node information of the read data have been updated to "1", C, 0x003, respectively, in the phase 11, and these values are read. Because the type of the received message is Upgrade, the read state is C, and the request originating node number is 0x003 and not uncached, the processing type, the next state, the holding node manipulation, the type of a message to be outputted, and the destination are determined respectively as CA, UP, "count", Inv, and the remote buffer 34 (see Table 4). Furthermore, since the home access controller 27 processes a message read from the conflict queue and the processing type is not CD, the top bit is updated to "0", and it is determined that the leading entry of the conflict queue will be deleted (see Table 6).

In step S142, based on the above information, the home access controller 27 updates the top bit, the state, and the holding node information of the data at the address 0x000600 in the directory memory 31 respectively to "0", UP, and 0x0ff. Since the message being processed is not a message with block data, the home access controller 27 does not write block data into the main memory 30. The home access controller 27 deletes the leading entry of the conflict queue, deleting the entry of the read Upgrade message. The conflict queue is thus made empty.

Since the processing type is CA in step S143, control goes to step S144. In step S144, the home access controller 27 generates and outputs the message source to the remote buffer 34. In the message source, the message type is Inv, the address is 0x0040030010, the mid is "1", the request originating node number is 0x002, and the holding node information is 0x003.

In step S148, the home access controller 27 checks if a message needs to be read from the conflict queue according to Table 7. Since the home access controller 27 processes a message read from the conflict queue and the conflict queue is empty, the home access controller 27 does not read a message from the conflict queue in step S149. The home access controller 27 now finishes the processing of the Upgrade message read from the conflict queue.

In response to the Inv message source (the message type is Inv, the address is 0x0040030010, the mid is "1", the request originating node number is 0x002, and the holding node information is 0x003), the remote buffer 34 successively generates 255 messages where the message type is Inv, the address is 0x0040030010, the mid is "1", the request originating node number is 0x002, and the destination node numbers range from 0x000 to 0x0ff except 0x002, and outputs the generated messages to the message transmitter 36.

These Inv messages are outputted through the message transmitter 36 at the node $PE_1$, the interconnection network 10, the message receivers 39 and the request buffers 33 at the nodes $PE_0$–$PE_{255}$ (except the node $PE_2$) to the local access controllers 25 thereof.

At this stage, the latest data at the address 0x0040030000 to the address 0x004003007f is present in the cache memory 21 at the node $PE_5$, the main memory 30 at the node $PE_1$, and the cache memory 21 at the node $PE_{80}$.

(Phase 13)

In response to the Inv message, the local access controller 25 at each of the node $PE_i$ (i=0, 1, 3, . . . , 255) operates as follows:

In step S121, the local access controller 25 which has received the Inv message (the destination node number is the number of the node which has received the Inv message, the message type is Inv, the address is 0x0040030010, the mid is "1", and the request originating node number is 0x002) reads data from an address 0x0600 in the tag memory 22. Depending on whether the read tag address is in accord with 0x00400 and what is the state, the processing type, the type of a message to be outputted, and the next state of the tag memory 22 are determined (see Table 2).

Since the processing type is BA in step S122, control goes to step S123. In step S123, the local access controller 25 generates an Ack message. In the Ack message, the destination node number is 0x001, the message type is Ack, the address is 0x0040030010, the mid is "1", and the request originating node number is 0x002. The destination to which the Ack message is to be outputted is determined, based on the result of comparison between the destination node number 0x001 and the node number. At the node node $PE_1$, since the destination node number and the node number are in accord with each other, the local access controller 25 outputs the Ack message to the home access controller 27. At the another node, since the destination node number and the node number are not in accord with each other, the local access controller 25 outputs the Ack message to the message transmitter 36.

In step S125, the local access controller 25 updates the tag memory 22 at the entry which is the entry of the address 0x0600 from which the data has previously been read. Specifically, the state and tag address of the data at the address 0x0600 in the tag memory are updated respectively to the next state according to Table 2 and the value that has previously been read from the tag memory 22. The local access controller 25 outputs the address (0x0040030008) of the received message to the request management table 37. The request management table 37 checks if the address of each entry and the address outputted by the local access controller 25 are in accord with each other with respect to the bits ranging from the 39th bit to the 7th bit. The request management table 37 updates the check bit of those entries whose bits are in accord with those of the address outputted by the local access controller 25, to "1". The local access controller 25 now finishes the processing of the IntvSh message.

The node $PE_0$ and the nodes $PE_3$–$PE_{255}$ transmit respective Ack messages (the destination node is 0x001, the message type is Ack, the address is 0x0040030010, the mid is "1", and the request originating number is 0x002) to the node $PE_1$. These Ack messages are sent through the message transmitters 36 at the respective nodes, the interconnection network 10, and the message receiver 39 at the node $PE_1$ to the home access controller 27 at the node $PE_1$.

At the node $PE_1$, the local access controller 25 outputs Ack messages (the destination node is 0x001, the message type is Ack, the address is 0x0040030010, the mid is "1", and the request originating number is 0x002) to the home access controller 27. The home access controller 27 at the node $PE_1$ receives and processes a total of 255 Ack messages which are identical to each other. When the home access controller 27 at the node $PE_1$ receives the first one of these Ack messages, the home access controller 27 operates as follows:

In step S141, the home access controller 27 accesses an address 0x000600 (22 bits, ranging from the 28th bit to the 7th bit, of the address 0x00400030010 added to the message) in the directory memory 31, and reads data such as a state. The top bit, the state, and the holding node information of the read data have been updated to "0", UP, 0x0ff, respectively, in the phase 12, and these values are read. Because the type of the received message is Ack, the read state is UP, and the holding node information is 0x0ff and not uncached, the processing type, the next state, the holding node manipulation, and a message to be outputted are determined respectively as CE, UP, "dec" nil (see Table 5). Furthermore, since the home access controller 27 does not process a message read from the conflict queue, the queue is empty, and the processing type is not CD, the top bit remains to be the read value of "0", and it is determined that the leading entry of the conflict queue will not be deleted (see Table 6).

In step S142, based on the above information, the home access controller 27 updates the top bit, the state, and the holding node information of the data at the address 0x000600 in the directory memory 31 respectively to "0", UP, and 0x0fe. Since the message being processed is not a message with block data, the home access controller 27 does not write block data into the main memory 30, and does not delete the leading entry of the conflict queue.

Since the processing type is CE in step S143, control goes to step S148. In step S148, the home access controller 27 checks if a message needs to be read from the conflict queue according to Table 7. Since the home access controller 27 does not process a message read from the conflict queue, the message type is Ack, and the processing type is CE, the home access controller 27 does not read a message from the conflict queue in step S149. The home access controller 27 now finishes the processing of the Ack message.

The home access controller 27 processes Ack messages from the respective nodes $PE_i$ in the manner described above, reads the value in the directory memory 31, and updates the holding node information to a value which is decreased by "1" each time the home access controller 27 processes an Ack message. This process is continued insofar as the decreased value is not 0x000, i.e., the holding node information is not uncached. When the holding node information is uncached, i.e., when the final 255th Ack message is received, the home access controller 27 operates as follows:

In step S141, the home access controller 27 accesses an address 0x000600 (22 bits, ranging from the 28th bit to the 7th bit, of the address 0x00400030010 added to the message) in the directory memory 31, and reads data such as a state. The top bit, the state, and the holding node information of the read data have been updated to "1", UP, 0x001, respectively, and these values are read. Because the type of the received message is Ack, the read state is UP, the holding node information is 0x001 and uncached, and the request originating node number 0x002 is different from the node number 0x001 at the node $PE_1$, the processing type, the next state, the holding node manipulation, the type of a message to be outputted, and the destination are determined respectively as CA, M, "set", Cmp, the remote buffer 34 (see Table 5). Furthermore, since the home access controller 27 does not process a message read from the conflict queue, the queue is empty, and the processing type is not CD, the top bit remains to be the read value of "0", and it is determined that the leading entry of the conflict queue will not be deleted (see Table 6).

In step S142, based on the above information, the home access controller 27 updates the top bit, the state, and the holding node information of the data at the address 0x000600 ill the directory memory 31 respectively to "0", M, and 0x002. The home access controller 27 does not write data into the main memory 30 since the received message is Ack, and does not delete the leading entry of the conflict queue.

Since the processing type is CA in step S143, control goes to step S144. In step S144, the home access controller 27 generates and outputs the Cmp message source to the remote buffer 34. In the Cmp message source, the message type is Cmp, the address is 0x0040030010, the mid is "1", the request originating node number is 0x002, and the holding node information is 0x001.

In step S148, the home access controller 27 checks if message needs to be read from the conflict queue according to Table 7. Since the home access controller 27 does not process a message read from the conflict queue, the message type is Ack, the processing type is CA, and the top bit is "0", the home access controller 27 does not read a message from the conflict queue in step S149. The home access controller 27 now finishes the processing of the Ack message.

In response to the Cmp message source (the message type is Cmp, the address is 0x004030010, the mid is "1", the request originating node number is 0x002, and the holding node information is 0x001), the remote buffer 34 generates a message where the destination node number is 0x002, the message type is Cmp, the address is 0x0040030010, the mid is "1", and the request originating node number is 0x002, and outputs the generated message to the message transmitter 36.

The Cmp message is outputted through the message transmitter 36 at the node $PE_1$, the interconnection network 10, the message receiver 39 at the node $PE_2$, and the request buffer 33 at the node $PE_2$ to the local access controller 25 at the node $PE_2$.

In response to the Cmp message (the destination node number is 0x002, the message type is Cmp, the address is 0x0040030010, the mid is "1", and the request originating node number is 0x002), the local access controller 25 reads information from the 1st (=mid) entry in the request management table 37 in step S131. The information registered in the request management table 37 represents a value which has been established in the phase 8 with the check bit changed to "1", a store access, an address 0x0040030010, a check bit "1", and store data.

In step S132, since the message includes no block data, control goes to step S133. In step S133, the check bit is checked. Since the check bit obtained from the request management table 37 is "1", the local access controller 25 generates and outputs a BlkRdEx message. The BlkRdEx message is a message where the destination node number is 0x001 (10 bits, ranging from the 39th bit to the 30th bit of the address 0x0040030010), the message type is BlkRdEx, the address is 0x0040030010, the mid is "1", and the request originating node number is 0x002. The local access controller 25 now finishes the processing of the Cmp message.

Operation with respect to the BlkRdEx message will be described later in next phase 14.

At this stage, the latest data from the address 0x0040030000 to the address 0x004003007f is present only in the main memory 30 at the node $PE_1$. The cache memory 21 at the node $PE_5$ and the cache memory 21 at the node $PE_{80}$ in which the latest data was present in the previous phase 12 are rendered invalid by the Inv message.

(Phase 14)

The BlkRdEx message (the destination node number is 0x001, the message type is BlkRdEx, the address is 0x0040030010, the mid is "1", and the request originating node number is 0x002) which has been generated by the local access controller 25 at the node $PE_2$ and outputted to the message transmitter 36 at the node $PE_2$ is transmitted through the interconnection network 10 and the message receiver 39 at the node $PE_1$ to the home access controller 27 at the node $PE_1$. The home access controller 27 which has received the BlkRdEx message operates as follows:

In step S141, the home access controller 27 accesses an address 0x000600 (22 bits, ranging from the 28th bit to the 7th bit, of the address 0x00400030010 added to the message) in the directory memory 31, and reads data such as a state. The top bit, the state, and the holding node information of the read data have been updated to "0", M, 0x002, respectively, and these values are read. Because the type of the received message is BlkRdEx, the read state is M, the holding node information is 0x002 and uncached, and the request originating node number 0x002 is different from the node number 0x001 at the node $PE_1$, the processing type, the next state, the holding node manipulation, the type of a message to be outputted, and the destination are determined respectively as CA, M, "set", CmpDatEx, the reply buffer 32 (see Table 4). Furthermore, since the home access controller 27 does not process a message read from the conflict queue, the queue is empty, and the processing type is not CD, the top bit remains to be the read value of "0", and it is determined that the leading entry of the conflict queue will not be deleted (see Table 6).

In step S142, based on the above information, the home access controller 27 updates the top bit, the state, and the holding node information of the data at the address 0x000600 in the directory memory 31 respectively to "0", M, and 0x002. Since the message being processed is not a message with block data, the home access controller 27 does not write block data into the main memory 30, and does not delete the leading entry of the conflict queue.

Since the processing type is CA in step S143, control goes to step S144. In step S144, the home access controller 27 generates and outputs the CmpDatEx message source to the remote buffer 34. In the CmpDatEx message source, the message type is CmpDatEx, the address is 0x0040030010, the mid is "1", the request originating node number is 0x002, and the holding node information is 0x002.

After the message source has been outputted, the home access controller 27 checks if a message needs to be read from the conflict queue in step S148 according to Table 7. Since the home access controller 27 does not process a message read from the conflict queue and the processed message type is BlkRdEx, the home access controller 27 does not read a message from the conflict queue. The home access controller 27 now finishes the processing of the BlkRdEx message.

In response to the CmpDatEx message source (the message type is CmpDatEx, the address is 0x0040030010, the mid is "1", the request originating node number is 0x002, and the holding node information is 0x002), the remote buffer 34 reads 128 bytes of data from the main memory 30 from the address 0x0006000 to the address 0x000600f, generates a message where the destination node number is 0x002, the message type is CmpDatEx, the address is 0x0040030010, the mid is "1", the request originating node number is 0x002, and the block data read from the main memory 30 is attached, and outputs the generated message to the message transmitter 36. The block data is the latest data.

The CmpDatEx message is outputted through the message transmitter 36 at the node $PE_1$, the interconnection network 10, the message receiver 39 at the node $PE_2$, and the reply buffer 32 at the node $PE_2$ to the local buffer 38 at the node $PE_2$.

In response to the CmpDatEx message (the destination node number is 0x002, the message type is CmpDatEx, the address is 0x0040030010, the mid is "1", the request originating node number is 0x002, and the block data is the latest data), the local access controller 25 reads information from the 1st (=mid) entry in the request management table 37 in step S131, obtaining information indicating that the access type is a load access, the address is 0x0040030010, and the check bit is "1", and also store data.

In step S132, since the message includes a block data, control goes to step S135. In step S135, the block data attached to the message is written into the cache memory 21 from the address 0x06000 to the address 0x0600f.

Since the access type is store in step S136, control goes to step S137. In step S137, the local access controller 25 updates 64 bits data at the address 0x06002 in the cache memory 21 to the store data obtained from the request management table 37. The local request controller 25 also writes data indicating that the effective bit is "0" into the 1st (=mid) entry in the request management table 37, and deletes the entry. The local access controller 25 updates the state and tag address of the data at the address 0x0600 in the tag memory 22 respectively to D (see Table 3) and 0x00400 (20 bits, ranging from the 39th bit to the 20th bit, of the address 0x0040030010 obtained from the request management table 37). The local access controller 25 also outputs the mid to the processor 20, indicating the completion of the memory access with the ID number=1. The local access controller 25 now finishes the processing of the CmpDatEx message.

At this stage, the latest data from the address 0x0040030000 to the address 0x004003007f is present only in the cache memory 21 at the node $PE_2$. The data in the main memory 30 at the node $PE_1$ is no longer the latest data at the time the store data is written into the cache memory 21 at the node $PE_2$.

Figure 11:
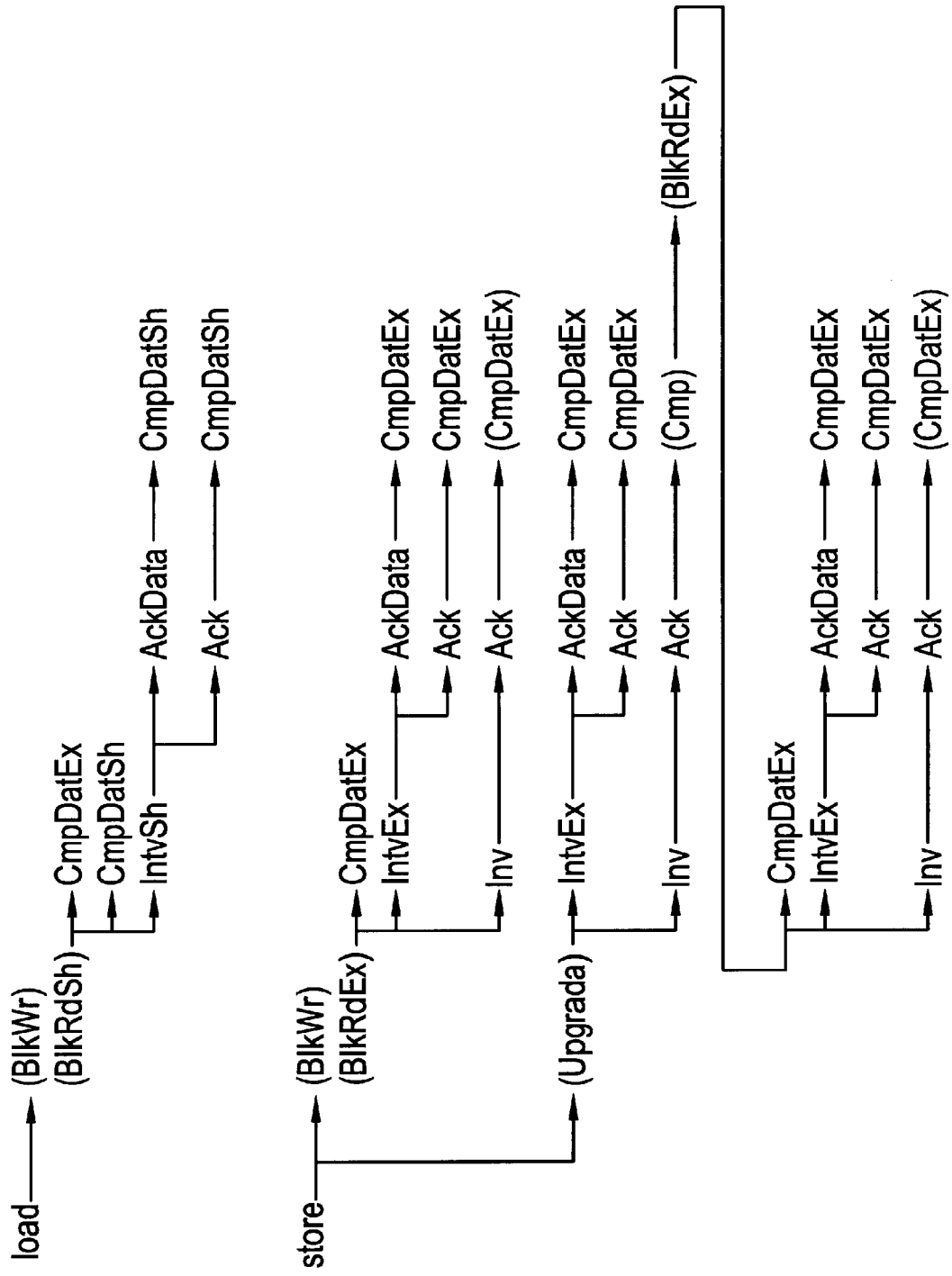
FIG. 11 is a diagram showing a sequence of messages exchanged between nodes, starting with a memory access performed by a processor in the loosely coupled multiprocessor system according to the first embodiment of the present invention.

FIG. 11 shows a sequence of messages exchanged among the nodes $PE_i$, starting with a memory access performed by the processor 20, in the loosely coupled multiprocessor system according to the first embodiment of the present invention.

In FIG. 11, the messages in parentheses are messages which may not necessarily be generated, and the messages not in parentheses are messages which are necessarily generated. Branched arrows indicate that either one of the messages pointed by those branched arrows is outputted.

As shown in FIG. 11, no loop exists in the sequence of messages exchanged among the nodes $PE_i$.

In the loosely coupled multiprocessor system according to the first embodiment, therefore, the processing that occurs after the processor 20 has performed a memory access until the result of the memory access is obtained will not enter an infinite loop. The loosely coupled multiprocessor system according to the first embodiment ensures that the processor 20 will obtain the result of a memory access within a finite period of time.

The relationship between message originating modules and message destination modules in the loosely coupled multiprocessor system according to the first embodiment is shown in Table 8.
(Table 8)

If a message destination module is not in a state capable of receiving a message, a message originating module cannot output a message, resulting in a shutdown of the processing. Deadlock may possibly occur when this dependency between the message destination module and the message originating module enters a loop.

In the loosely coupled multiprocessor system according to the first embodiment, the reply buffer 32, the request buffer 33, and the remote buffer 34 are arranged to be able to receive all messages that can be outputted. Specifically, the reply buffer 32 comprises as many entries as the maximum number of messages to be received. The request buffer 33 and the remote buffer 34 have means for temporarily saving messages in an area in the main memory 30 which comprises as many entries as the maximum number of messages to be received.

As long as deadlock is concerned, the three buffers 32, 33, 34 can be excluded from the message destination modules. Therefore, the loosely coupled multiprocessor system according to the first embodiment is effective to prevent the dependency between the message destination module and the message originating module from suffering a loop, thus avoiding deadlock.

2nd Embodiment

A loosely coupled multiprocessor system according to a second embodiment of the present invention is basically the same as the loosely coupled multiprocessor system according to the first embodiment of the present invention which is illustrated in FIG. 2, except for details described as follows:

The loosely coupled multiprocessor system according to the second embodiment differs from the loosely coupled multiprocessor system according to the first embodiment with respect to the types and structures of messages exchanged between the nodes $PE_i$ through the interconnection network 10 and the arrangement of the nodes $PE_i$ (i=0~1023).

Messages exchanged between the nodes $PE_i$ through the interconnection network 10 in the loosely coupled multiprocessor system according to the second embodiment will be described below.

In the second embodiment, the messages comprise 14 messages which include the 12 messages described in the first embodiment that are represented respectively by BlkRdSh, BlkRdEx, Upgrade, BlkWr, Ack, AckData, IntvSh, IntvEx, Inv, CmpDatSh, CmpDatEx, and Cmp, and two other messages represented respectively by PrcDatEx and PrcAck.

In the second embodiment, memory access completion messages which have also been described in the first embodiment include those that can be separated into reply messages to be sent to the processor and a processing completion message. The CmpDatSh and CmpDatEx messages are memory access completion messages which are not separated. The PrcDatEx and PrcAck messages are reply messages to be sent to the processor, and the Cmp message is a processing completion message. The BlkRdSh, BlkRdEx, Upgrade, BlkWr, Ack, AckData, IntvSh, IntvEx, Inv messages are identical to those in the first embodiment.

In the second embodiment, as with the first embodiment, the messages are divided into two types, i.e., a basic message and a message with block data. The nine messages BlkRdSh, BlkRdEx, Upgrade, Ack, IntvSh, IntvEx, Inv, Cmp, PrcAck are basic messages, whereas the five messages BlkWr, AckData, CmpDatSh, CmpDatEx, PrcDatEx are a message with block data.

As shown in FIG. 12a, the basic message comprises a total of 67 bits representing a destination node number (10 bits), a code indicative of a message type (4 bits because there are 14 message types), a request originating node number (10 bits), mid (3 bits), and an address (40 bits).

As shown in FIG. 12b, the message with block data comprises a total of 67 bits+128 bytes, with 67 bits representing a destination node number (10 bits), a code indicative of a message type (4 bits), a request originating node number (10 bits), mid (3 bits), and an address (40 bits), and 128 bytes representing block-size data (128 bytes).

The message component mid is composed of 3 bits according to the second embodiment while it is composed of 2 bits according to the first embodiment. In the second embodiment, the ID number (2 bits) added to a memory access by the processor 20 is not used as the mid of a message, but the mid (3 bits) used by the local access controller 25 to identify each memory access is added separately from the ID number.

An arrangement of each of the nodes $PE_i$ in the loosely coupled multiprocessor system according to the second embodiment will be described below.

Figure 13:
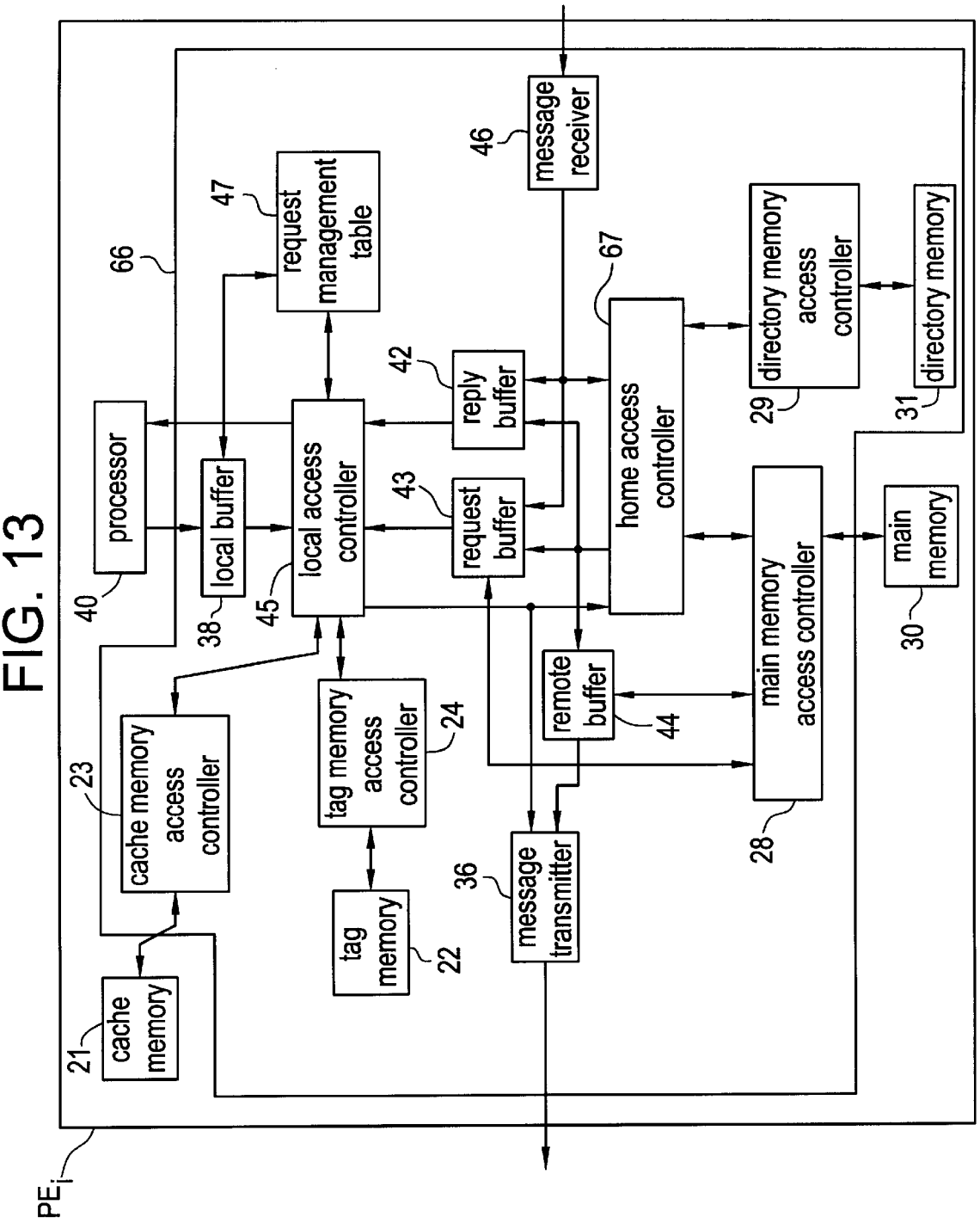
FIG. 13 is a block diagram of an arrangement of a node of the loosely coupled multiprocessor system according to the second embodiment of the present invention.

FIG. 13 shows in block form a functional arrangement of each of the nodes $PE_i$ according to the second embodiment. Each of the nodes $PE_i$ shown in FIG. 13 is different from each of the nodes $PE_i$ shown in FIG. 3 according to the first embodiment in that it has a processor 40 instead of the processor 20 and a coherency maintenance controller 66 instead of the coherency maintenance controller 16.

The coherency maintenance controller 66 differs from the coherency maintenance controller 16 according to the first embodiment in that it comprises a request management table 47 instead of the request management table 37, a local access controller 45 instead of the local access controller 25, a reply buffer 42 instead of the reply buffer 32, a request buffer 43 instead of the request buffer 33, a message receiver 49 instead of the message receiver 39, a home access controller 67 instead of the home access controller 27, and a remote buffer 44 instead of the remote buffer 34. Those parts of each of the nodes $PE_i$ shown in FIG. 13 which are different from those of each of the nodes $PE_i$ shown in FIG. 3 will be described below.

The processor 40 has a memory block command. The memory block command prevents the processor 40 from executing a memory access subsequent to the memory block command if there is a previously requested memory access that has not yet been completed or if a system completion signal outputted by the request management table 47 is "0".

The message receiver 49 is substantially the same as the message receiver 39 according to the first embodiment. However, the message receiver 49 additionally has a function to output PrcDatEx and PrcAck messages to the reply buffer 42 when the message receiver 49 receive these PrcDatEx and PrcAck messages.

The request management table 47 may be composed of as many entries as desired. In the description which follows, the request management table 47 is composed of 8 entries. The mid (3 bits) added to a message is based on the fact that the request management table 47 is composed of 8 entries. Therefore, the number of bits of the mid varies if the number of entries of the request management table 47 varies.

Each of the entries of the request management table 47 comprises a total of 111 bits including a Prc bit (1 bit), a Sys counter (2 bits), an access type (1 bit), an address (40 bits), an ID number (2 bits), data (64 bits), and a check bit (1 bit).

The request management table 47 has the following functions:

1) To output the number (3 bits) of an empty entry to the local access controller 45, and write the above set data (111 bits) outputted by the local access controller 45 into the empty entry according to an instruction of the local access controller 45 (the empty entry is an entry where both the Prc bit and the Sys counter are "0");

2) To output the contents of the entry indicated by the local access controller 45 to the local access controller 25;

3) To update the Prc bit of the entry indicated by the local access controller 45 to "0" according to an instruction of the local access controller 45, and set the 2 bits of the Sys counter to a value indicated by the local access controller 45;

4) To set a pending signal to "1" and output the pending signal if there is an entry whose address(40 bits) in the set data and an address signal (40 bits) outputted by the local buffer 38 are in accord with each other with respect to 13 bits ranging from the 19th bit to the 7th bit and whose Prc bit or Sys Counter is not "0" (there is a memory access to the same cache block), or if either the Prc bit or the Sys counter is not "0" in all entries (all entries are in use);

5) To set the check bit of the entry to "1" if an address signal (40 bits) outputted by the local access controller 45 and an address (40 bits) in the entry are in accord with each other with respect to high-order 33 bits ranging from the 39th bit to the 7th bit, according to an instruction of the local access controller 45; and 6) To set the system completion signal to "1" and output the system completion signal to the processor 40 if the Prc bit and the Sys counter are "0" in all entries.

The reply buffer 42 comprises a buffer of 20 entries. The reply buffer 42 can receive and hold four memory access completion messages or four reply messages (PrcAck, PrcDatEx, CmpDatSh, CmpDatEx messages) for the processor 20, and 16 processing completion messages (Cmp message). The four entries of the reply buffer 42 can hold a message with block data (67 bits+128 bytes), and the remaining 16 entries thereof can hold a basic message (67 bits).

The request buffer 43 is of substantially the same structure as the request buffer 23 according to the first embodiment. However, the number of entries of the request save queue in the main memory 30 which are managed by the request buffer 43 is 8192 that is produced by multiplying the number 8 of the entries of the request management table 47 by the number 1024 of the nodes. Each of the entries of the request buffer 43 is capable of holding a basic message (67 bits).

The remote buffer 44 is of substantially the same structure as the remote buffer 34 according to the first embodiment. However, the number of entries of the remote save queue in the main memory 30 which are managed by the remote buffer 44 is 16384 that is produced by multiplying the number 8 of the entries of the request management table 47 by the number 1024 of the nodes and 2. Each of the entries of the remote buffer 44 is capable of holding a total of 67 bits representing message source outputted by the home access controller 67, which comprises a message type (4 bits), an address (40 bits), a request originating node number (10 bits), mid (3 bits), and holding node information (10 bits) held in the directory memory 31.

The remote buffer 44 has a function to generate two types of messages, i.e., PrcDatEx and PrcAck messages, from a message source, in addition to the functions described in the first embodiment.

If the type of a message to be generated is PrcDatEx, then as with CmpDatSh and CmpDatEx messages, any information which is lacking is a destination node number and block data. In this case, request originating node information is used as it is as the destination node number. Block data indicated by an address added to the message source read from the main memory 30 is used as the block data. At this time, only this message is generated.

If the type of a message to be generated is PrcAck, then as with a Cmp message, any information which is lacking is a destination node number. In this case, request originating node information is used as the destination node number. At this time, only this message is generated.

The local access controller 45 and the home access controller 67 have substantially the same functions as the local access controller 25 and the home access controller 27 according to the first embodiment, but are partly different in function and operation therefrom. Those details of the local access controller 45 and the home access controller 67 which are different from the local access controller 25 and the home access controller 27 according to the first embodiment will be described in detail later on.

Operation of the local access controller 45 in the second embodiment will be described below.

In the following description, as with the first embodiment, when the local access controller 45 accesses the cache memory 21 or the tag memory 22, the function of the cache memory access controller 23 or the tag memory access controller 24 is actually performed.

The processing which is carried out by the local access controller 45 in response to a memory access is essentially the same as the processing in the first embodiment, and is effected according to the processing operation shown in FIG. 7 and Table 1. In the second embodiment, however, the process of registering data in the request management table 47 in step S113 and step S115 and the process of generating a message in step S113, step S114, step S115 are different from those in the first embodiment.

In registering data in the request management table 47 in step S113, data to be established and an entry number to be registered are different from those in the first embodiment. In the data registered in the request management table 47, the Prc bit is "1", the Sys counter is "1", the check bit is "0", and the access type, the address, the ID number, and the data are those added to the memory access. The entry number registered in the request management table 47 is the number (3 bits) of an empty entry which is outputted by the request management table 47.

In the process of generating a message in step S113 and step S115, the number (3 bits) of an empty entry which is outputted by the request management table 47 is used as the mid (3 bits) added to each message.

Those details of the process that is carried out by the local access controller 45 in response to a message outputted by the reply buffer 42, which are different from the first embodiment will be described below with reference to FIG. 14 and Table 9 shown below. Table 9 indicates the relationship between received message types, access types, values of a check bit, next states, and table manipulations used in the processing operation shown in FIG. 14.

(Table 9)

Figure 14:
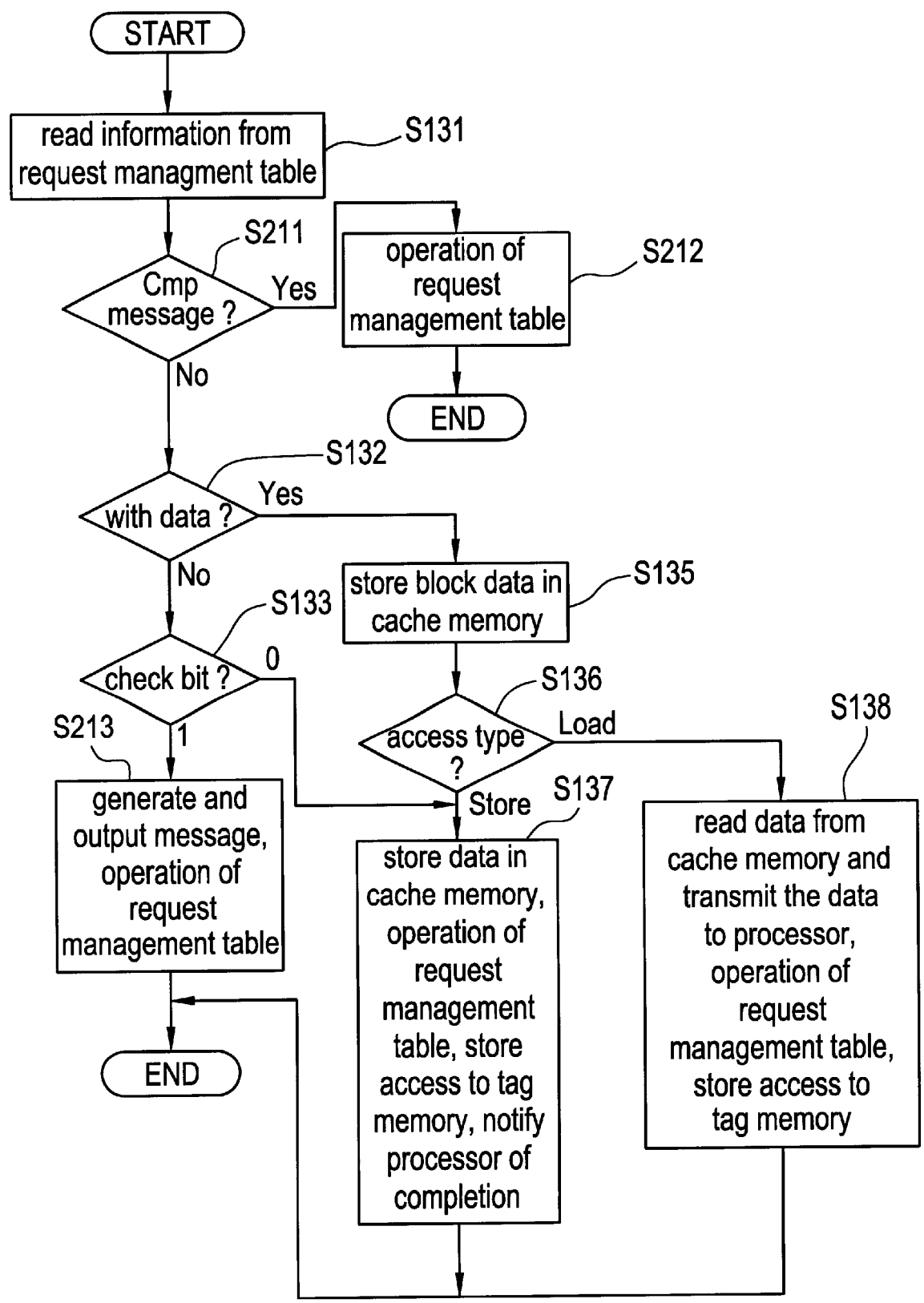
FIG. 14 is a flowchart of a processing operation which is carried out by a local access controller of the loosely coupled multiprocessor system according to the second embodiment of the present invention when the local access controller has received a message outputted by a reply buffer.

In the second embodiment, the processing operation shown in FIG. 14 has step S211 and step S212 added to the processing operation according to the first embodiment (see FIG. 9), and step S213 instead of step S134 (see FIG. 9) for manipulating the request management table 47. The request management table 47 which is manipulated by the processing in step S212, step S213, step S137, and step S138 is changed as shown Table 9. The local access controller 45 according to the second embodiment is capable of processing the newly added messages PrcAck, PrcDatEx.

The messages that are outputted from the reply buffer 42 are limited to five messages CmpDatSh, CmpDatEx, Cmp, PrcDatEx, PrcAck.

In step S131, the local access controller 45 receives a message from the reply buffer 42, outputs the mid (3 bits) contained in the message to the request management table 47, and obtains information with respect to a Sys counter, an access type, an address, data (64 bits), an ID number (2 bits), and a check bit.

In step S211, the local access controller 45 checks if the received message is a Cmp message or not. If the received message is a Cmp message, then control goes to step S212. If the received message is not a Cmp message, then control goes to step S132.

In step S212, the local access controller 45 updates the value of the Sys counter in the entry in the request management table 47 which is indicated by the mid added to the message, to a value produced by decreasing the value of the Sys counter read in step S131 by "1" (dec operation). When step S212 is finished, the processing with respect to the received message comes to an end.

In step S132, the local access controller 45 decides whether the received message is a message with data, i.e., a CmpDatSh, CmpDatEx, or PrcDatEx message, or a PrcAck message with no data.

If the received message is not a message with data, then control proceeds to step S133. If the received message is a message with data, then control goes to step S135.

In step S133, the local access controller 45 inspects the value of the check bit obtained from the request management table 47. If the value of the inspected check bit is "1", then control proceeds to step S213. If the value of the inspected check bit is "0", then control goes to step S137.

In step S213, the local access controller 45 generates and outputs a BlkRdEx message. In the BlkRdEx message, high-order 10 bits, ranging from the 39th bit to the 30th bit, of the address obtained from the request management table 47 are used as the request node number, the node number of the node $PE_i$ as the request originating number, the mid of the received message as the mid, and the address obtained from the request management table 47 as the address.

The local access controller 45 decides whether the generated message is to be outputted to the message transmitter 36 or the home access controller 67, based on the result of comparison between the destination node number and the node number of the node $PE_i$, as with step S113. The local access controller 45 also updates the value of the Sys counter in the entry in the request management table 47 which is indicated by the mid added to the message, to a value produced by incrementing the value of the Sys counter read in step S131 by "1" (inc operation). When step S213 is finished, the processing with respect to the received message comes to an end.

In step S135, the local access controller 45 writes block data (128 bytes) accompanying the message into a corresponding block in the cache memory 21 at a total of 16 entries (128 bytes) indicated by an index signal of 17 bits which include 13 bits, ranging from the 19th bit to the 7th bit, of the address obtained from the request management table 47, and 4 bits varying from 0 x 0 to 0 x f and added as low-order bits to the 13 bits. After step S135, control goes to step S136.

In step S136, the local access controller 45 inspects the access type obtained from the request management table 47. If the inspected access type is a store access, then control proceeds to step S137. If the inspected access type is a load access, then control goes to step S138.

In step S137, the local access controller 45 writes data (64 bits) obtained from the request management table 47 into corresponding entries in the cache memory 21 which are indicated by 17 bits, ranging from the 19th bit to the 3rd bit, of the address obtained from the request management table 47.

The local access controller 45 also updates the Prc bit and the Sys counter in the entry in the request management table 47 which is indicated by the mid of the received message. The values to which the Prc bit and the Sys counter are to be updated are determined from Table 9.

The local access controller 45 also updates the contents of the tag memory 22 at entries indicated by 13 bits, ranging from the 19th bit to the 7th bit, of the address obtained from the request management table 47.

The state of the block is determined according to Table 9 depending on the access type (here, a store access) and the type of the received message. For the tag address of the block, high-order 20 bits, ranging from the 39th bit to the 20th bit, of the address read from the request management table 47 are used.

The local access controller 45 further notifies the processor 40 of an access completion. At this time, the ID number (2 bits) obtained from the request management table 47 is outputted to the processor 40, indicating to the processor 40 which memory access is completed. After step S137, the processing with respect to the received message is finished.

In step S138, the local access controller 45 reads 64-bit data from the cache memory 21 at entries indicated by 17 bits, ranging from the 19th bit to the 3rd bit, of the address obtained from the request management table 47. The 64-bit data thus read and the ID number obtained from the request management table 47 are transmitted to the processor 40.

The local access controller 45 also updates the contents of the request management table 47 and the contents of the tag memory 22. The process for updating the contents of the request management table 47 and the contents of the tag memory 22 is the same as the process carried out in step S137. After step S138, the processing with respect to the received message is finished.

Operation of the home access controller 67 will be described below.

In the following description, as with the first embodiment, when the home access controller 67 accesses the main memory 30 or the directory memory 31, the function of the main memory access controller 28 or the directory memory access controller 29 is actually performed.

In the first embodiment, there are five processing types CA–CE for determining branches from step S143 (see FIG. 10). In the second embodiment, there are eight processing types CA–CH for determining branches from step S143 (see FIG. 15), the processing types CA–CH including the processing types CA–CE and additional processing types CF, CG, CH. As shown in Table 10 below, processing types upon reception of a BlkRdEx or Upgrade message and next states are different from those shown in Table 5 in the first embodiment.

Figure 15:
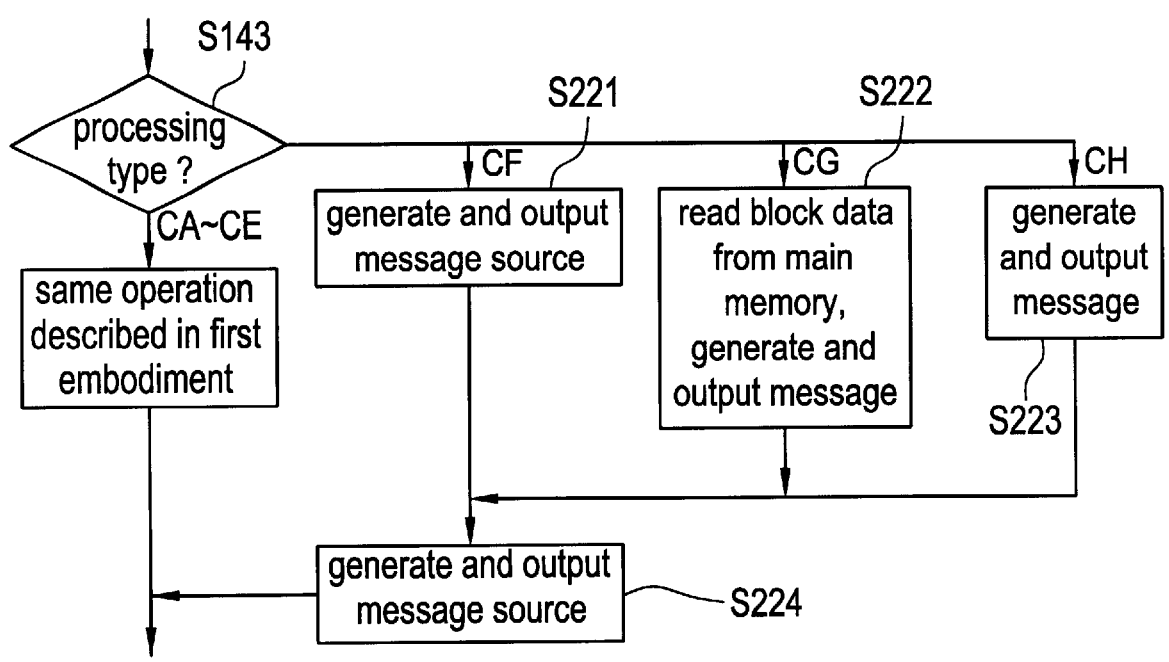
FIG. 15 is a flowchart of a processing operation which is carried out by a home access controller of the loosely coupled multiprocessor system according to the second embodiment of the present invention, showing a portion of the processing operation which is different from the processing operation carried out by the home access controller of the loosely coupled multiprocessor system according to the first embodiment of the present invention.

Table 10 represents the relationship between the five items of information used in the processing operation shown in FIG. 15, the states of blocks stored in the directory memory, manipulations of the holding node information, processing types, message types, and destination buffers. (Table 10)

As shown in FIG. 15, if the processing type determined in step S143 is CF, then control proceeds to step S221. If the processing type determined in step S143 is CG, then control goes to step S222. If the processing type determined in step S143 is CH, then control goes to step S223.

In step S221, as with step S144 (FIG. 10), the home access controller 67 generates and outputs a message source, and outputs the message source to the remote buffer 34. At this time, the type of message source generated by the home access controller 67 is limited to PrcDatEx or PrcAck. After step S221, control goes to step S224.

In step S222, as with step S145 (FIG. 10), the home access controller 67 reads block data from the main memory 30, generates a message with the read block data added thereto, and outputs the messages with the added block data to the reply buffer 42. At this time, the type of a message generated by the home access controller 67 is limited to PrcDatEx. After step S222, control goes to step S224.

In step S223, as with step S146 (FIG. 10), the home access controller 67 generates and outputs a message to the reply buffer 42. At this time, the type of a message generated by the home access controller 67 is limited to PrcAck. After step S223, control goes to step S224.

In step S224, as with step S144 (FIG. 10), the home access controller 67 generates message source, and outputs the message source to the remote buffer 34. At this time, the type of the message source generated by the home access controller 67 is limited to Inv. After step S224, control goes to step S148.

The home access controller 67 subsequently operates in the same manner as with the home access controller 27 in the first embodiment.

Details of operation of the loosely coupled multiprocessor system according to the second embodiment which are different from those of the first embodiment will be described below.

An operation in which a store access is performed with an ID number=1 to an address 0x0040030000 at the node $PE_1$ will be described below.

It is assumed that the processor 40 at the node $PE_1$ performs a store access with an ID number=1 to an address 0x0040030000.

The memory access performed by the processor 40 is outputted to the local buffer 38. In response to the memory access, the local buffer 38 outputs an address (40 bits) to the request management table 47, checks if there is a request to the same cache block or not, and checks if there is an empty entry or not.

The request management table 37 outputs an checked result as a pending signal. If the pending signal is "1", then it indicates that there is a request to the same cache block or there is not an empty entry. If the pending signal is "1", then the local buffer 38 does not output the memory access to the local access controller 45. Having waited until the pending signal becomes "0", the local buffer 38 outputs the memory access to the local access controller 45.

In response to the memory access (the access type is a store access, the address is 0x0040030000, and the ID number=1), the local access controller 45 operates as follows: In step S111, the local access controller 45 reads data from an address 0x0600 (13 bits, ranging from the 19th bit to the 7th bit, of the address 0x0040030000 obtained from the local buffer 38) in the tag memory 22. If the read state is I, then the processing type, the request message, and the next state are determined respectively as AA, BlkRdEx, and I from Table 1.

Since the processing type is AA, the local access controller 45 generates and outputs a message and registers the memory access in the request management table 47 in step S113. At this time, it is assumed that the 0th entry is indicated as an empty entry by the request management table 47. In the generated and outputted message, the destination node number is 0x001 (10 bits, ranging from the 39th bit to the 30th bit, of the address 0x0040030000), the message type is BlkRdEx, the address is 0x0040030000, the mid is "0" (the number of the empty entry outputted by the request management table 47), and the request originating node number is 0x001. Since both the destination node number and the node number of the node $PE_1$ are 0x001, the destination to which the message is to be outputted is the home access controller 67 at the node $PE_1$. The local access controller 45 writes data indicating that a Prc bit is "1", a Sys counter is "1", a check bit is "0", an access type is a store access, an address is 0x0040030000, an ID number is "1", and store data into the 0th entry in the request management table 47.

In step S118, the local access controller 45 updates the state of the data in the entry of the address 0x0600 in the tag memory 22 to I and the tag address thereof to 0x00400 (20 bits, ranging from the 39th bit to the 20th bit, of the address 0x0040030000). The local access controller 45 now finishes the processing of the load access.

In response to the BlkRdEx message (the destination node number is 0x0001, the message type is BlkRdEx, the address is 0x0040030000, the mid is "0", and the request originating node number is 0x001), the home access controller 67 operates as follows:

The home access controller 67 accesses an address 0x000600 (22 bits, ranging from the 28th bit to the 7th bit, of the address 0x0040030000 added to the message) in the directory memory 31, and reads data such as a state. It is assumed that the top bit, the state, and the holding node information of the read data are "0", C, 0x003, respectively. Because the type of the received message is BlkRdEx, the read state is C, the holding node information is 0x003, indicating uncached information, and the request originating node number is in accord with the node number, the processing type, the next state, the holding node manipulation, the type of a message to be outputted, and the destination are determined respectively as CG, UP, "count", PrcDatEx and Inv, and the reply buffer 42 and the remote buffer 44 (see Table 10). Furthermore, with the conflict queue being empty, since the home access controller 67 does not process a message read from the conflict queue and the processing type is not CD, the top bit remains to be the read value "0", and it is determined that the leading entry of the conflict queue will not be deleted in step S141 (see Table 6).

Based on the above information, the home access controller 67 updates the top bit, the state, and the holding node information of the data in the directory memory 31 respectively to "0", UP, and 0x0ff. Since the message is not a message with block data, the home access controller 67 does not write block data into the main memory 30, and does not delete the leading entry of the conflict queue.

Since the processing type is CG in step S143, the home access controller 67 reads 64 bits×16 entries=128 bytes of block data ranging from the address 0x00060000 to the address 0x0006000 in the main memory 30, adds the block data to a generated message, and outputs the generated message with the block data to the reply buffer 42. The generated message is a message where the destination node number is 0x001, the message type is PrcDatEx, the address is 0x0040030000, the mid is "0", the request originating node number is 0x001, and the block data is block data read in step S222.

After the message is generated and outputted, the home access controller 67 generates and outputs the message source for generating an Inv message, and outputs the message source to the remote buffer 44. In the Inv message source, the message type is Inv, the address is 0x0040030000, the mid is "0", the request originating node number is 0x001, and the holding node information is 0x003.

After having outputted the Inv message source to the remote buffer 44, the home access controller 67 decides whether there is a need to read a message from the conflict queue or not in step S148 according to Table 7.

Since the home access controller 67 does not process a message read from the conflict queue and the message type is BlkRdEx, the home access controller 67 does not read a message from the conflict queue in step S149. The home access controller 67 now finishes the processing of the BlkRdEx message.

The reply buffer 42 which has received the PrcDatEx message outputs its information to the local access controller 45.

In step S131, in response to the PrcDatEx message (the destination node number is 0x001, the message type is PrcDatEx, the address is 0x0040030000, the mid is "0", the request originating node number is 0x001, and the data is block data), the local access controller 45 reads information in the 0th (=mid) entry in the request management table 47, thus obtaining information representing a Sys counter of "1", a store access, an address of 0x0040030000, a check bit of "0", and an ID number of "1".

In step S211, the local access controller 45 determines that the message is not a Cmp message. In step S132, the local access controller 45 determines that the message is a message with block data. In step S135, the local access controller 45 writes the block data added to the message into the cache memory 21 at the address 0x06000 to the address 0x0600f.

In step S136, the local access controller 45 determines that the access type is a store access, and control goes to step S137.

In step S137, the local access controller 45 updates 64 bits of data at the address 0x06000 in the cache memory 21 to the store data obtained from the request management table 47. The local access controller 45 updates the Prc bit of the 0th(=mid) entry in the request management table 47 to "0".

The local access controller 45 also updates the data at the address 0x0600 in the tag memory 22 to data where the statue is D and the tag address is 0x00400 (20 bits, ranging from the 39th bit to the 20th bit, of the address 0x0040030008 obtained from the request management table 47). The local access controller 45 outputs the ID number obtained from the request management table 47 to the processor 40, indicating to the processor 40 the completion of the memory access with the ID number=1.

At this stage, for the processor 40, the store access carried out with the ID number=1 has been completed, making it possible to perform a memory access with the ID number=1.

The processing with respect to the Inv message source outputted to the remote buffer 44 is the same as with the first embodiment. The remote buffer 34 generates 255 messages where the destination node numbers range from 0x000 to 0x0ff except 0x001, the message type is Inv, the address is 0x0040030000, the mid is "0", and the request originating node number is 0x001, and outputs the generated messages through the interconnection network 10 to the local access controllers 45 at the respective destination nodes $PE_i$.

The local access controller 45 at each of the respective nodes $PE_i$ processes the Inv message and generates an Ack message. In the Ack message, the destination node number is 0x001, the message type is Ack, the address is 0x0040030000, the mid is "0", and the request originating node number is 0x001.

These Ack messages generated by the local access controllers 45 at the nodes $PE_i$ are sent through the interconnection network 10 to the home access controller 26 at the node $PE_1$. The home access controller 26 successively processes the received Ack messages. When the home access controller 26 receives the final Ack message, the home access controller 26 updates the top bit, the state, and the holding node information in the directory memory 31 respectively to "0", M, 0x001, generates a Cmp message, and outputs the generated Cmp message to the reply buffer 42.

The reply buffer 42 which has received the Cmp message outputs its information to the local access controller 45.

In step S131, in response to the Cmp message (the destination node number is 0x001, the message type is Cmp, the address is 0x0040030000, the mid is "0", and the request originating node number is 0x001), the local access controller 45 reads information in the 0th (=mid) entry in the request management table 47, thus obtaining information representing a Sys counter of "1", a store access, an address of 0x0040030000, a check bit of "0", and an ID number of "1".

In step S211, the local access controller 45 determines that the read message is a Cmp message, and updates the value of the Sys counter in the 0th (=mid) entry in the request management table 47 to a value "0" which is produced by decreasing the read value "1" by "1". The processing carried out by the local access controller 45 is now finished.

When the PrcDatEx message is received, the Prc bit is changed to "0", and when the Cmp message is received, the Sys counter is updated to "0". Only when both messages are received, the entry becomes an empty entry. At this time, the system completion system is "1" if all the other entries are empty entries.

Figure 16:
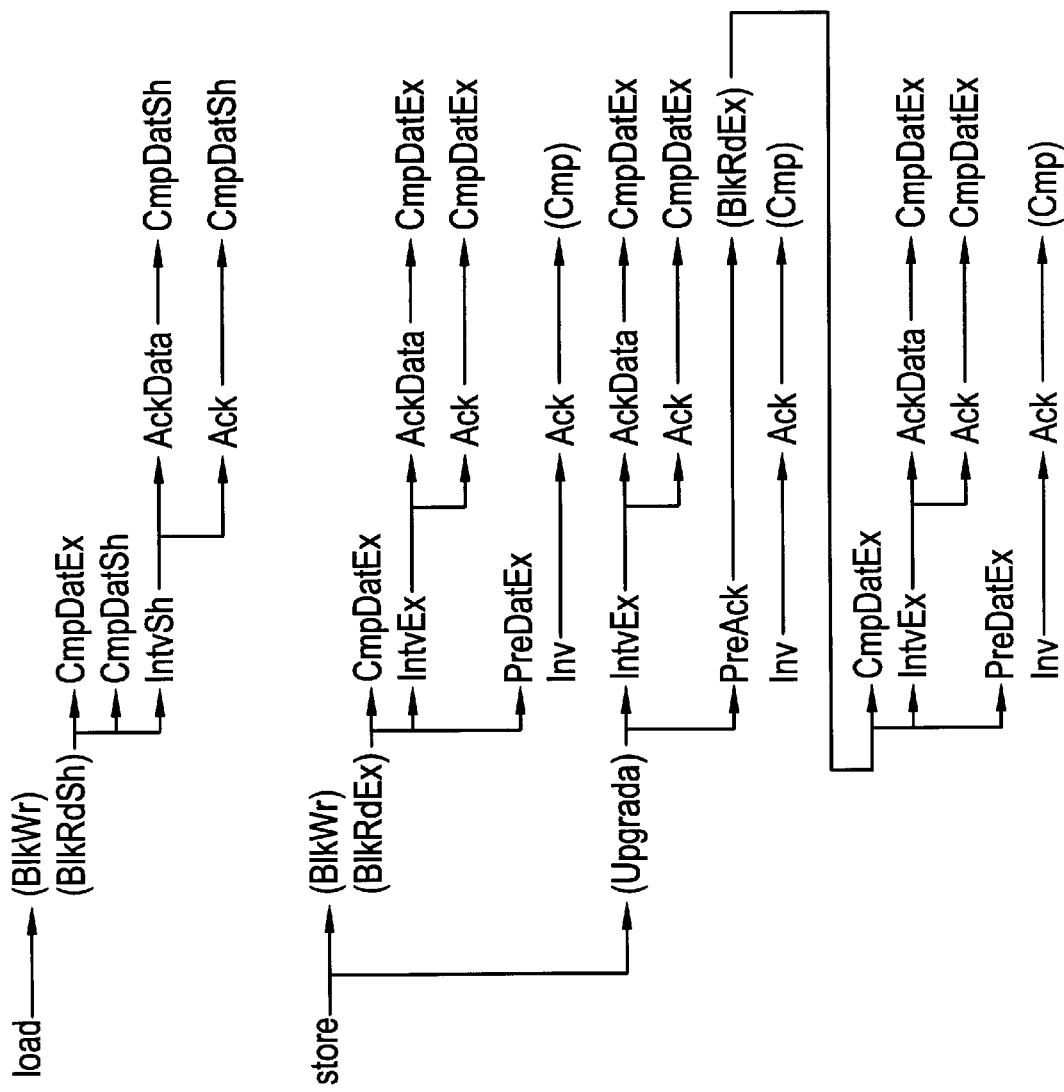
FIG. 16 is a diagram showing a sequence of messages exchanged between nodes, starting with a memory access performed by a processor in the loosely coupled multiprocessor system according to the second embodiment of the present invention.

FIG. 16 shows a sequence of messages exchanged between the nodes $PE_i$, starting with a memory access performed by the processor 40 in the loosely coupled multiprocessor system according to the second embodiment of the present invention.

In FIG. 16, the messages in parentheses are messages which may not necessarily be generated, and the messages not in parentheses are messages which are necessarily generated. Branched arrows indicate that either one of the messages pointed by those branched arrows is outputted.

As shown in FIG. 16, no loop exists in the sequence of messages exchanged between the nodes $PE_i$.

In the loosely coupled multiprocessor system according to the second embodiment, therefore, the processing that occurs after the processor 40 has performed a memory access until the result of the memory access is obtained will not enter an infinite loop. The loosely coupled multiprocessor system according to the second embodiment ensures that the processor 40 will obtain the result of a memory access within a finite period of time.

The relationship between message originating modules and message destination modules in the loosely coupled multiprocessor system according to the second embodiment is shown in Table 8 as with the first embodiment. Therefore, the loosely coupled multiprocessor system according to the second embodiment is effective to prevent the dependency between the message destination module and the message originating module from suffering a loop, thus avoiding deadlock.

3rd Embodiment

A loosely coupled multiprocessor system according to a third embodiment of the present invention is basically the same as the loosely coupled multiprocessor system according to the first embodiment of the present invention which is illustrated in FIG. 2, except for details described as follows:

The loosely coupled multiprocessor system according to the third embodiment differs from the loosely coupled multiprocessor system according to the first embodiment with respect to the types and structures of messages exchanged between the nodes $PE_i$ through the interconnection network 10 and the arrangement of the nodes $PE_i$ (i=0~1023).

Messages exchanged between the nodes $PE_i$ through the interconnection network 10 in the loosely coupled multiprocessor system according to the third embodiment will be described below.

In the third embodiment, the messages comprise 16 messages which include the 12 messages described in the first embodiment that are represented respectively by BlkRdSh, BlkRdEx, Upgrade, BlkWr, Ack, AckData, IntvSh, IntvEx, Inv, CmpDatSh, CmpDatEx, and Cmp, and four other messages represented respectively by AckX, InvX, CmpDatShR, and CmpDatDyR.

The four messages BlkRdSh, BlkRdEx, Upgrade, BlkWr are request messages transmitted from a node $PE_i$ to which a memory access is performed to a node $PE_j$ where data is held in the main memory 30. The four messages IntvSh, IntvEx, Inv, InvX are request messages transmitted from a node PEi data is held in the main memory 30 to a node $PE_j$ where a copy of the data is held in the cache memory 21.

The message AckX is a report message transmitted from a node $PE_i$ where a copy of data is held in the cache memory 21 to a node $PE_j$ where data is held in the main memory 30. The two messages Ack, AckData are a report message transmitted from a node $PE_i$ to which a memory access is performed to a node $PE_j$ where data is held in the main memory 30.

The two messages CmpDatSh, SmpDatEx are a memory access completion message transmitted from a node $PE_j$ where data is held in the main memory 30 to a node $PE_i$ to which a memory access is performed. The three messages Cmp, CmpDatShR, CmpDatDyR are a memory access completion message transmitted from a node $PE_j$ where a copy of data is held in the cache memory 21 to a node $PE_i$ to which a memory access is performed.

In the third embodiment, the messages are divided into three types, i.e., a basic message, a message with block data, and a message with the number of holding nodes. The eight messages BlkRdSh, BlkRdEx, Upgrade, Ack, IntvSh, IntvEx, InvX, AckX are a basic message. The six messages BlkWr, AckData, CmpDatSh, CmpDatEx, CmpDatShR, CmpDatDyR are a message with block data. The two messages Inv, Cmp are a message with the number of holding nodes.

As shown in FIG. 17a, the basic message comprises a total of 66 bits representing a destination node number (10 bits), a code indicative of a message type (4 bits because there are 16 message types), a request originating node number (10 bits), mid (2 bits), and an address (40 bits).

As shown in FIG. 17b, the message with block data comprises a total of 66 bits+128 bytes, with 66 bits representing a destination node number (10 bits), a code indicative of a message type (4 bits), a request originating node number (10 bits), a mid (2 bits), and an address (40 bits), and 128 bytes representing block-size data (128 bytes).

As shown in FIG. 17c, the message with the number of holding blocks comprises a total of 76 bits representing a destination node number (10 bits), a code indicative of a message type (4 bits), a request originating node number (10 bits), an mid (2 bits), an address (40 bits), and the number of holding nodes (10 bits).

An arrangement of each of the nodes $PE_i$ in the loosely coupled multiprocessor system according to the third embodiment will be described below.

Figure 18:
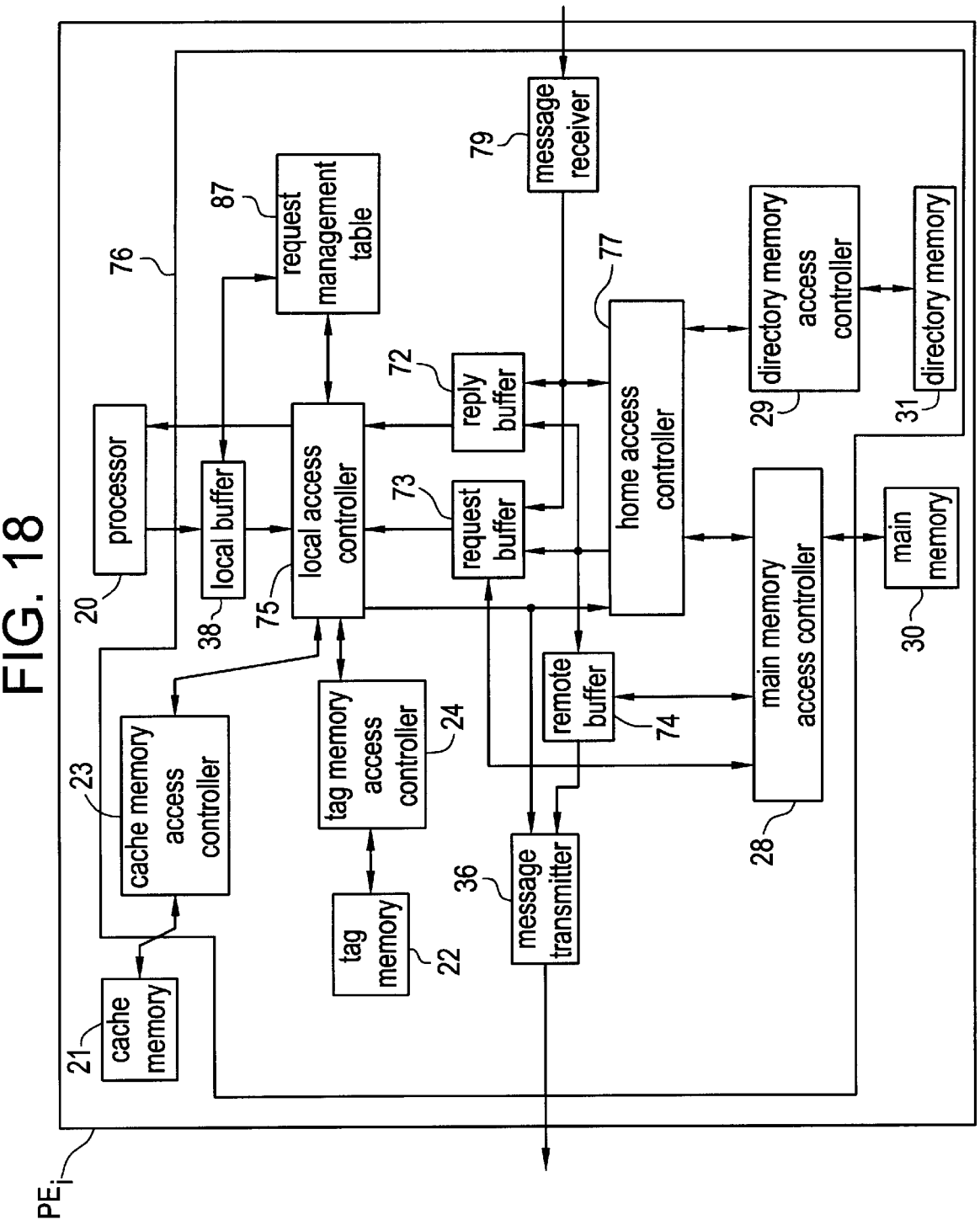
FIG. 18 is a block diagram of an arrangement of a node of the loosely coupled multiprocessor system according to the third embodiment of the present invention.

FIG. 18 shows in block form a functional arrangement of each of the nodes $PE_i$ according to the third embodiment. Each of the nodes $PE_i$ shown in FIG. 18 is different from each of the nodes $PE_i$ shown in FIG. 3 according to the first embodiment in that it has a coherency maintenance controller 76 instead of the coherency maintenance controller 16.

The coherency maintenance controller 76 differs from the coherency maintenance controller 16 according to the first embodiment in that it comprises a local access controller 75 instead of the local access controller 25, a reply buffer 72 instead of the reply buffer 32, a request buffer 73 instead of the request buffer 33, a message receiver 79 instead of the message receiver 39, a home access controller 77 instead of the home access controller 27, a request management table 87 instead of the request management table 37, and a remote buffer 74 instead of the remote buffer 34. Those parts of each of the nodes $PE_i$ shown in FIG. 18 which are different from those of each of the nodes $PE_i$ shown in FIG. 3 will be described below.

The request management table 87 is substantially the same as the request management table 37 according to the first embodiment. However, each entry comprises an effective bit(1 bit), a check bit(1 bit), an access type(1 bit), an address(40 bits), store data(64 bits), and additionally the number of received messages(10 bits). The number of received messages field is first set by the local access controller 75 and used by the message receiver 79 when the message receiver 79 receives the Cmp message.

The message receiver 79 is substantially the same as the message receiver 39 according to the first embodiment. However, when the message receiver 79 receives InvX, AckX, Cmp, CmpDatShR, CmpDatDyR messages, it functions as follows:

When the message receiver 79 receives an InvX message, the message receiver 79 outputs the received InvX message to the request buffer 33. When the message receiver 79 receives an AckX message, the message receiver 79 outputs the received AckX message to the home access controller 77. When the message receiver 79 receives a CmpDatShR or CmpDatDyR message, the message receiver 79 outputs the received CmpDatShR or CmpDatDyR message to the reply buffer 72.

When the message receiver 79 receives a Cmp message, the message receiver 79 reads the number of received messages in an entry indicated by the mid added to a message in the request management table 37. If the read value is "0", then the message receiver 79 establishes the number of holding nodes added to the message. If the read value is not "0", then the message receiver 79 establishes a value which is produced by decreasing the read value by "1" to the number of received messages field of the mid-th entry in the request management table 87. Only when the read value is "1", the message receiver 79 outputs the Cmp message to the reply buffer 72. Otherwise, the message receiver 79 does not output the Cmp message to the reply buffer 72, just discards the message and finishes the processing.

The reply buffer 72 receives a total of five types of messages including Cmp, CmpDatSh, CmpDatEx messages as with the first embodiment and also CmpDatShR, CmpDatDyR messages. The Cmp message is a message with the number of holding nodes. Each of the CmpDatSh, CmpDatEx, CmpDatShR, CmpDatDyR messages is a message with block data.

The reply buffer 72 is composed of 4 entries. Each of the entries of the reply buffer 72 is capable of holding a message with block data (66 bits+126 bytes) or a message with the number of holding nodes (76 bits).

The request buffer 73 receives four types of messages including IntvSh, IntvEx, Inv, InvX. The IntvSh, IntvEx, InvX messages are a basic message, and the Inv message is a message with the number of holding nodes. Each of the entries of the request buffer 73 and each of the entries of the request save queue in the main memory 30 have a size capable of receiving a message with the number of holding nodes.

The remote buffer 74 is essentially the same as the remote buffer according to the first embodiment, but differs therefrom with respect to an additional function to generate an InvX message and a process of generating an Inv message. A process of generating messages from an InvX message source at the remote buffer 74 according to the third embodiment is the same as the process of generating messages from an Inv message source at the remote buffer 34 according to the first embodiment. A process of generating message from an Inv message source at the remote buffer 74 according to the third embodiment will be described below.

In an Inv message source, any information which lacks is a destination node number and the number of holding nodes. In this case, a plurality of messages with different destination node numbers are generated as with the InvX message source. The destination node numbers are generated in the same manner as the InvX message source. The number of holding nodes is determined from the holding node information added to the message source. This process is the same as the "count" manipulation carried out by the home access controller 27 on the holding node information stored in the directory memory 31. The number of holding nodes is determined with low-order 8 bits of the received holding node information being of the Coarse Vector format.

The local access controller 75 and the home access controller 77 have substantially the same functions as the local access controller 25 and the home access controller 27 according to the first embodiment, but are partly different in function and operation therefrom. Those details of the local access controller 75 and the home access controller 77 which are different from the local access controller 25 and the home access controller 27 according to the first embodiment will be described in detail later on.

Operation of the local access controller 75 in the third embodiment will be described below.

In the following description, as with the first embodiment, when the local access controller 75 accesses the cache memory 21 or the tag memory 22, the function of the cache memory access controller 23 or the tag memory access controller 24 is actually performed The processing which is carried out by the local access controller 75 in response to a memory access outputted by the local buffer 38 is essentially the same as the processing in the first embodiment show in FIG. 7. In the third embodiment, however, when the local access controller 75 registers the memory access in the request management table 87 in step S113 and step S115, the number of received messages field is set to "0".

The processing which is carried out by the local access controller 75 in response to a coherency request outputted by the request buffer 33 is essentially the same as the processing in the first embodiment shown in FIG. 8. In the third embodiment, however, the processing types, the types of messages to be outputted, next states are shown in Table 11 below.

(Table 11)

In step S123 or step S124 shown in FIG. 8, the local access controller 75 generates a message whose destination node number is different. When the local access controller 75 generates a Cmp message, it is necessary to add the number of holding nodes to the generated Cmp message. The number of holding nodes added to the received message (necessarily an Inv message) is used as the number of holding nodes added to the generated Cmp message.

The destination node number of a generated message differs depending on the type of a message to be outputted. If the type of a message to be outputted is Cmp, CmpDatShR, or CmpDatDyR, then the request originating number of the received message is used as the destination node number. If the type of a message to be outputted is AckX, then high-order 10 bits, ranging from the 39th bit to the 30th bit, of the address of the received message are used as the destination node number.

A processing operation carried out by the local access processor 75 when it receives a message outputted by the reply buffer 72 will be described below with reference to FIG. 19 and Table 12.

Figure 19:
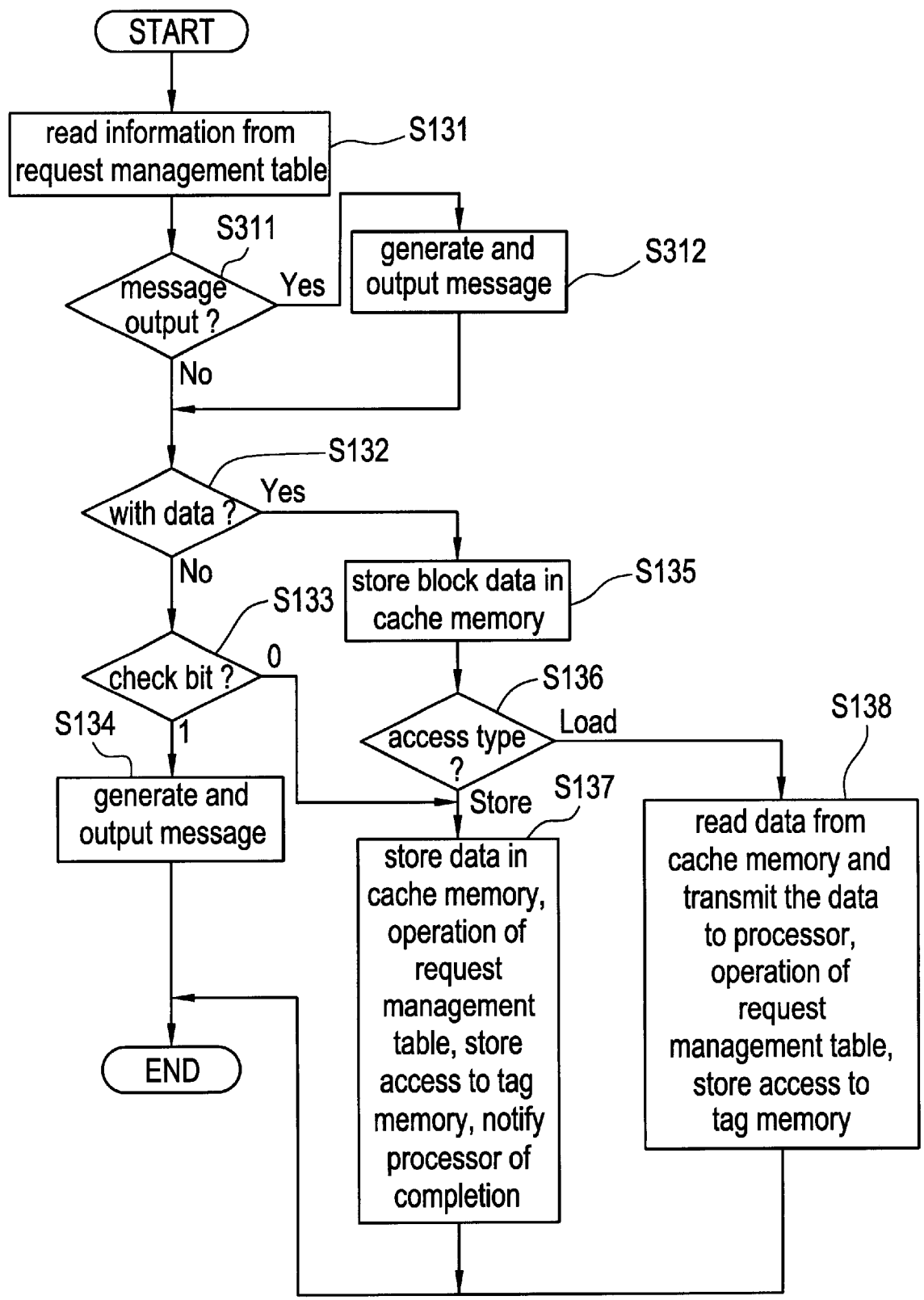
FIG. 19 is a flowchart of a processing operation which.is carried out by a local access controller of the loosely coupled multiprocessor system according to the third embodiment of the present invention when the local access controller has received a memory access outputted by a reply buffer.

Table 12 shows the relationship between access types, received message types, and next states in the processing operation shown in FIG. 19.

(Table 12)

In the third embodiment, the local access controller 75 decides whether a message needs to be outputted in step S311 after step S131. If a message needs to be outputted in step S311, then the local access controller 75 generates and outputs a message in step S312. Thereafter, control goes to step S132. If a message does not need to be outputted in step S311, then control goes to step S132.

Whether a message needs to be outputted or not in step S311 is determined depending on the type of the received message as shown in Table 12. If the type of the received message is CmpDatSh or CmpDatEx, then the local access controller 75 does not need to output a message. If the type of the received message is Cmp, CmpDatShR, or CmpDatDyR, then the local access controller 75 generates a message depending on the received message, and outputs the generated message.

High-order 10 bits, ranging from the 39th bit to the 30th bit, of the address of the received message are used as the destination node number of the message generated in step. S311, and a message type determined from Table 12 is used as the type of the message generated in step S311. Those added to the received message are used as the address, the mid, and the request originating number of the message generated in step S311.

If the generated message is a message with block data (which is limited to an AckData message here), then the local access controller 75 adds the block data added to the received message to a message to be outputted.

The local access controller 75 decides whether the generated message is to be outputted to the message transmitter 36 or the home access controller 77, based on the result of comparison between the destination node number and the node number of the node $PE_i$, as with step S113 (FIG. 7).

The local access controller 75 subsequently operates in the same manner as with the local access controller 25 in the first embodiment.

Operation of the home access controller 77 according to the third embodiment will be described below.

In the third embodiment, the home access controller 77 operates in substantially the same manner as with the first embodiment (FIG. 10), but operates differently when it receives an Ack message, an AckX message, or an AckData message.

Table 13 represents the relationship between the five items of information used in the processing operation of the home access controller 77 according to the third embodiment, the states of blocks stored in the directory memory, manipulations of the holding node information, processing types, message types, and destination buffers.

(Table 13)

In step S148 (FIG. 10), the home access controller 77 decides whether there is a need to read a message from the conflict queue according to Table 14 shown below. Table 14 represents the relationship between the five items of information used in the processing operation of the home access controller 77 according to the third embodiment and the determined reading of the queue.

(Table 14)

Details of operation of the loosely coupled multiprocessor system according to the third embodiment which are different from those of the first embodiment will be described below.

An operation in which a store access is performed with an ID number=2 to an address 0x0040030000 by the processor 20 at the node $PE_1$ will be described below.

The memory access performed by the processor 20 is outputted to the local buffer 38. In response to the memory access, the local buffer 38 outputs an address (40 bits) to the request management table 37, and checks if there is a request to the same cache block or not. If there is not a request to the same cache block, then the local buffer 38 outputs the memory access to the local access controller 75.

In step S111, in response to the memory access (the access type is a store access, the address is 0x0040030000, and the ID number=2), the local access controller 55 reads data from an address 0x0600 (13 bits, ranging from the 19th bit to the 7th bit, of the address 0x0040030000 obtained from the local buffer 38) in the tag memory 22. If the read state is S and the tag address is 0x00400, then the processing type, the requested message, and the next state are determined respectively as AA, Upgrade, and S from Table 1.

In step S111, the processing type is determined as AA. In step S113, the local access controller 75 generates and outputs a message and registers it in the request management table 37 in step S113. In the generated and outputted message, the destination node number is 0x001 (10 bits, ranging from the 39th bit to the 30th bit, of the address 0x0040030000), the message type is Upgrade, the address is 0x0040030000, the mid is "2", and the request originating node number is 0x001. Since both the destination node number and the node number of the node $PE_1$ are 0x001, the destination to which the message is to be outputted is the home access controller 77 at the node $PE_1$. The local access controller 75 writes data indicating that an effective bit is "1", a check bit is "0", an access type is a load access, an address is 0x0040030000, the number of received messages is "0", and store data into the 2nd (=ID number) entry in the request management table 87.

In step S118, the local access controller 75 updates the state of the data in the entry of the address 0x600 in the tag memory 22 to C and the tag address thereof to 0x00400 (20 bits, ranging from the 39th bit to the 20th bit, of the address 0x0040030000).

In response to the Upgrade message (the destination node number is 0x001, the message type is Upgrade, the address is 0x0040030000, the mid is "2", and the request originating node number is 0x001), the home access controller 77 operates as follows:

In step S141, the home access controller 77 accesses an address 0x000600 (22 bits, ranging from the 28th bit to the 7th bit, of the address 0x0040030000 added to the message) in the directory memory 31, and reads data such as a state. It is assumed that the top bit, the state, and the holding node information of the read data are "0", C, 0x0ef, respectively. Because the type of the received message is Upgrade and the read state is C, the processing type, the next state, and the holding node manipulation are determined respectively as CA, UP, "count" (see Table 4). Furthermore, since the home access controller 77 does not process a message read from the conflict queue, the queue is empty, and the processing type is not CD, the top bit remains to be the read value "0", and it is determined that the leading entry of the conflict queue will not be deleted (see Table 6).

In step S142, based on the above information, the home access controller 77 updates the top bit, the state, and the holding node information of the data at the address 0x000600 in the directory memory 31 respectively to "0", UP, and 0x37f. Since the message is not a message with block data, the home access controller 77 does not write block data into the main memory 30, and does not delete the leading entry of the conflict queue.

In step S143, the processing type is determined as CA. In step S144, the home access controller 77 generates and outputs the Inv message source, and outputs the message source to the remote buffer 74. In the message source, the message type is Inv, the address is 0x0040030000, the mid is "2", the request originating number is 0x001, and the holding node information is 0x07f.

In step S148, after the message is generated and outputted, the home access controller 77 checks if there is a need to read a message from the conflict queue according to Table 14. Since the home access controller 77 does not process a message read from the conflict queue and the message type is Upgrade, the home access controller 77 does not read a message from the conflict queue in step S149. The home access controller 77 now finishes the processing of the Upgrade message.

In response to the Inv message source (the message type is Inv, the address is 0x0040030000, the mid is "1", the request originating number is 0x001, and the holding node information is 0x07f), the remote buffer 74 successively generates 896 messages where the message type is Inv, the address is 0x0040030008, the mid is "2", the request originating node number is 0x001, the number of holding nodes is 0x37f, and the destination node numbers range from 0x000 to 0x37f except 0x001, and outputs the generated messages to the message transmitter 36.

These Inv messages are outputted through the message transmitter 36 at the node $PE_1$, the interconnection network 10, the message receivers 79 and the request buffers 33 at the nodes $PE_0$–$PE_{895}$ (except the node $PE_1$) to the local access controllers 75 thereof.

The local access controller 75 at each of the nodes $PE_i$ (i=0, 2, 3, . . . , 895) which have received the Inv messages operates as follows:

In step S121, the local access controller 25 which has received the Inv message (the destination node number is the number of the node which has received the message, the message type is Inv, the address is 0x0040030000, the mid is "2", the request originating node number is 0x001, and the number of holding nodes is 0x37f) reads data from an address 0x0600 in the tag memory 22. Depending on whether the read tag address is in accord with 0x00400 and what is the state, the processing type, the type of a message to be outputted, and the next state of the tag memory 22 are determined (see Table 11).

In step S122, the processing type is necessarily determined as BA. In step S123, the local access controller 75 generates a Cmp message. In the Cmp message, the destination node number is 0x001, the message type is Cmp, the address is 0x0040030000, the mid is "2", the request originating node number is 0x001, and the number of holding nodes is 0x37f. The destination to which the message is to be outputted is determined depending on the result of comparison between the destination node number 0x001 and the node number. In this case, the destination is the message transmitter 36.

In step S125, after the message is generated and outputted, the local access controller 75 updates the tag memory 22 at the entry which is the entry at the address 0x0600 from which the data has previously been read. The state is updated to a next state shown in Table 11, and the value previously read from the tag memory 22 is written as the tag address.

The local access controller 75 outputs the address (0x040030000) of the received message into the request management table 87. The request management table 87 checks if the address of each entry and the address outputted by the local access controller 75 are in accord with each other with respect to the bits ranging from the 39th bit to the 7th bit. The request management table 87 updates the check bit of those entries whose bits are in accord with those of the address outputted by the local access controller 75, to "1". The local access controller 75 now finishes the processing of the Inv message.

Cmp messages (the destination node is 0x001, the message type is Cmp, the address is 0x040030000, the mid is "2", the request originating node number is 0x001, and the number of holding nodes is 0x37f) are transmitted from the node $PE_0$, the nodes $PE_2$–$PE_{895}$ through the interconnection network 10 to the node $PE_1$. A total of 895 Cmp messages that are identical to each other are transmitted.

The message receiver 79 at the node $PE_1$ which has received the messages operates as follows: The message receiver 79 reads the number of received messages from the entry in the request management table 87 which is indicated by the mid=2 added to the message. For the first Cmp message, the number of received messages is "0". The number of received messages at the entry in the request management table 87 which is indicated by the mid=2 is updated to a value 0x37e produced by decreasing the number of holding nodes 0x37f added to the message by "1". This Cmp message is not outputted to any module, and will be discarded when the above processing is over.

When the message receiver 79 receives the next Cmp message, the message receiver 79 reads the number of received messages from the entry in the request management table 87 which is indicated by the mid=2 added to the message. Since the number of received messages has previously been updated to 0x37e and is not "0", it is updated to a value 0x37d produced by decreasing the number of holding nodes 0x37e by "1". This Cmp message is not outputted to any module, and will be discarded when the above processing is over.

The message receiver 79 successively receives Cmp messages as the number of received messages in the 2nd entry in the request management table 87 is decreased by "1" each time the message receiver 79 receives a Cmp message. When the message receiver 79 receives the final Cmp message, it operates as follows:

The message receiver 79 reads the number of received messages in the entry in the request management table 87 which is indicated by the mid=2 added to the message. Since the read number of received messages has been updated to 0x001, and is not "0", the message receiver 79 updates the number of received messages in the entry in the request management table 87 which is indicated by the mid=2, to a value 0x000 produced by decreasing the value 0x001 by "1". Because the read number of received messages is 0x001, the message receiver 79 outputs the received Cmp message to the reply buffer 72.

The reply buffer 72 which has received the Cmp message outputs its information to the local access controller 75.

In step S131, in response to the Cmp message (the destination node number is 0x001, the message type is Cmp, the address is 0x0040030000, the mid is "2", and the request originating node number is 0x001), the local access controller 75 reads information in the 2nd (=mid) entry in the request management table 87, thus obtaining information representing a check bit of "0", a store access, an address of 0x0040030000, and stored data.

In step S311, the local access controller 75 checks if a message needs to be outputted. Since the type of the received message is Cmp, the local access controller 75 generates and outputs an Ack message. In the Ack message, the destination node number is 0x001 (10 bits, ranging from the 39th bit to the 30th bit, of the address 0x0040030000), the message type is Ack, the address is 0x0040030000, the ID number is "2", and the request originating number is 0x001. As the destination node number and the node number are in accord with each other, the destination to which the message is to be outputted is the home access controller 77.

After the message has been generated and outputted, it is determined that the received message is not a message with data in step S132, and also that the check bit is "0" in step S133. The local access controller 75 updates 64 bit data at the address 0x06000 in the cache memory 21 to the store data obtained from the request management table 87. The local access controller 75 writes data where the effective bit is "0" into the 2nd (=mid) entry in the request management table 87, deleting the entry. The local access controller 75 updates the state and tag address of the data at the address 0x0600 in the tag memory 22 respectively to D and 0x00400 (20 bits, ranging from the 39th bit to the 20th bit, of the address 0x0040030000 obtained from the request management table 87. In step S137, the local access controller 75 outputs the ID number to the processor 20, indicating that the memory access with the mid=2 is completed. The local access controller 75 now finishes the processing of the Cmp message.

In response to the Ack message (the destination node number is 0x001, the message type is Ack, the address is 0x0040030000, the mid is "2", and the request originating node number is 0x001), the home access controller 77 operates as follows:

In step S141, the home access controller 77 accesses an address 0x000600 (22 bits, ranging from the 28th bit to the 7th bit, of the address 0x0040030000 added to the message) in the directory memory 31, and reads data such as a state. It is assumed that the top bit, the state, and the holding node information of the read data are "0", UP, 0x37f, respectively. Because the type of the received message is Ack and the read state is UP, the processing type, the next state, the holding node manipulation, and a message to be outputted are determined respectively as CE, M, "set", nil (see Table 13). Furthermore, since the home access controller 77 does not process a message read from the conflict queue, the queue is empty, and the processing type is not CD, the top bit remains to be the read value "0", and it is determined that the leading entry of the conflict queue will not be deleted (see Table 6).

In step S142, based on the above information, the home access controller 77 updates the top bit, the state, and the holding node information of the data at the address 0x000600 in the directory memory 31 respectively to "0", M, and 0x001. Since the message is not a message with block data, the home access controller 77 does not write block data into the main memory 30, and does not delete the leading entry of the conflict queue.

In step S143, the processing type is determined as CE. In step S148, the home access controller 77 checks if there is a need to read information from the conflict queue according to Table 14. Since the home access controller 77 does not process a message read from the conflict queue, the message type is Ack, and the top bit read in step S141 is "0", the home access controller 77 does not read a message from the conflict queue in step S149. The home access controller 77 now finishes the processing of the Ack message.

Figure 20:
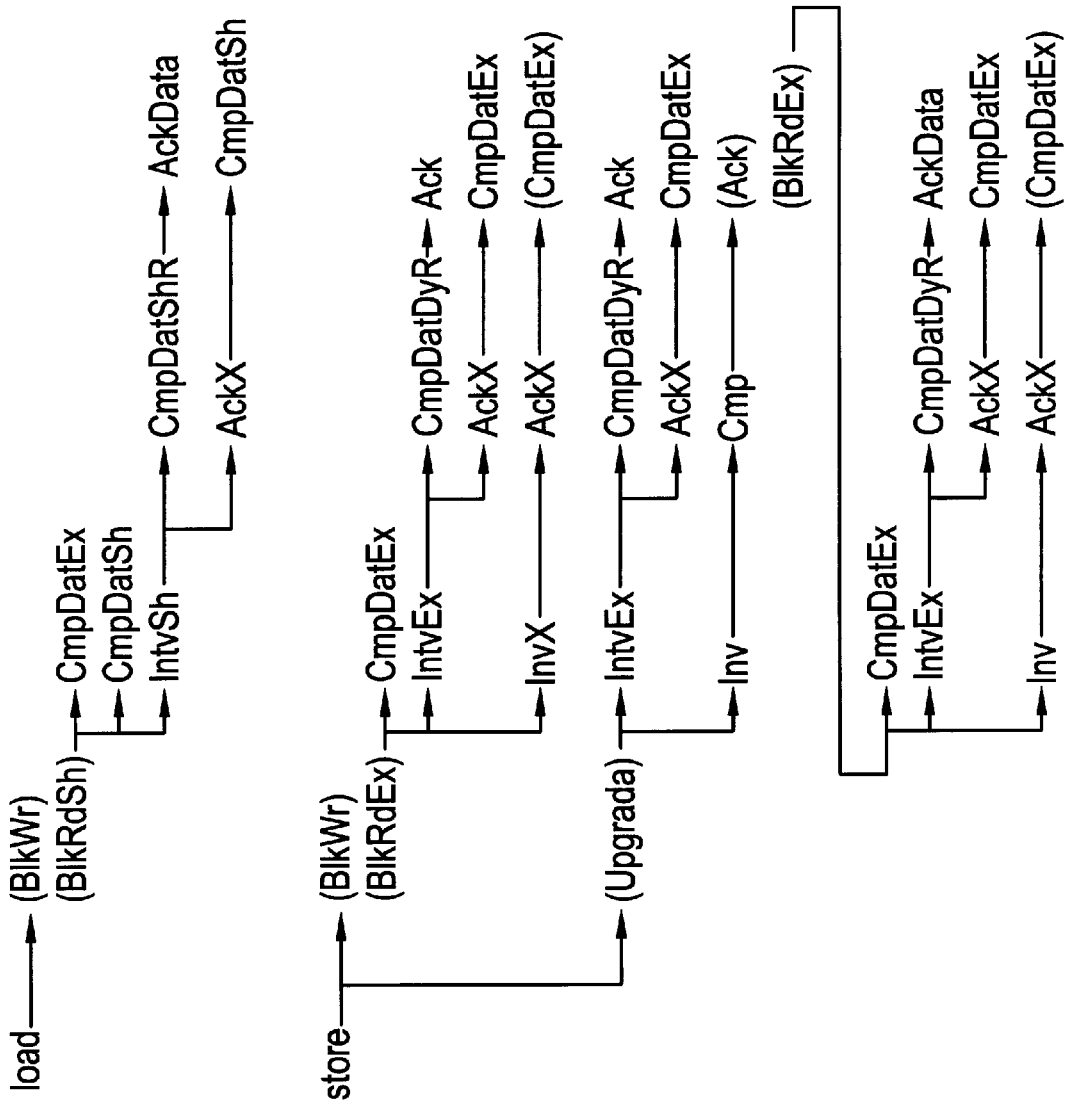
FIG. 20 is a diagram showing a sequence of messages exchanged between nodes, starting with a memory access performed by a processor in the loosely coupled multiprocessor system according to the third embodiment of the present invention.

FIG. 20 shows a sequence of messages exchanged between the nodes $PE_i$, starting with a memory access performed by the processor 20 in the loosely coupled multiprocessor system according to the third embodiment of the present invention.

In FIG. 20, the messages in parentheses are messages which may not necessarily be generated, and the messages not in parentheses are messages which are necessarily generated. Branched arrows indicate that either one of the messages pointed by those branched arrows is outputted.

As shown in FIG. 20, no loop exists in the sequence of messages exchanged between the nodes $PE_i$.

In the loosely coupled multiprocessor system according to the third embodiment, therefore, the processing that occurs after the processor 20 has performed a memory access until the result of the memory access is obtained will not enter an infinite loop. The loosely coupled multiprocessor system according to the third embodiment ensures that the processor 40 will obtain the result of a memory access within a finite period of time.

The relationship between message originating modules and message destination modules in the loosely coupled multiprocessor system according to the third embodiment is shown in Table 8 as with the first embodiment. Therefore, the loosely coupled multiprocessor system according to the third embodiment is effective to prevent the dependency between the message destination module and the message originating module from suffering a loop, thus avoiding deadlock.

Modifications of the Embodiments

The present invention is not limited to the details described above in the first through third embodiments, but various modifications may be made therein.

Modifications of the first through third embodiments will be described below.

Each entry in the reply buffers 32, 42, 72 according to the first through third embodiments does not need to hold all message, but may only hold information used at least when the local access controllers 25, 45, 75 process a message received from the reply buffers 32, 42, 72.

Each of the 4 entries in the reply buffers 32, 72 according to the first and third embodiments may hold only a message type (4 bits), mid (2 bits), and block data (128 bytes).

Each of the 4 entries for holding a message with block data in the reply buffer 42 according to the second embodiment may hold only a message type (4 bits), mid (3 bits), and block data (128 bytes). Each of the 16 entries for holding a Cmp message may hold only a message type (4 bits) and mid (3 bits).

Each of the entries in the request buffers 33, 43, 73, according to the first through third embodiments and each of the entries in the request save queue in the main memory 30 which is managed by the request buffers 33, 43, 73 do not need to hold all message, but may hold only information used at least when the local access controllers 25, 45, 75 process a message received from the request buffers 33, 43, 73.

Each of the entries in the request buffer 33 and each of the entries in the request save queue according to the first embodiment may hold only a message type (4 bits), an address (40 bits), mid (2 bits), and a request originating node number (10 bits).

Each of the entries in the request buffer 43 and each of the entries in the request save queue according to the second embodiment may hold only a message type (4 bits), an address (40 bits), mid (3 bits), and a request originating node number (10 bits).

Each of the entries in the request buffer 73 and each of the entries in the request save queue according to the third embodiment may hold only a message type (4 bits), an address (40 bits), mid (2 bits), a request originating node number (10 bits), and the number of holding nodes (10 bits).

Each of the entries in the conflict queue in the main memory 30 which is managed by the home access controllers 27, 47, 77 according to the first through third embodiments do not need to hold all message, but may hold only information used at least when the home access controllers 27, 47, 77 process a message.

Each of the entries in the conflict queue according to the first and third embodiments may hold only a message type (4 bits), an address (40 bits), mid (2 bits), and a request originating node number (10 bits).

Each of the entries in the conflict queue according to the second embodiment may hold only a message type (4 bits), an address (40 bits), mid (3 bits), and a request originating node number (10 bits).

In each of the first through third embodiments, it is possible to construct a multiprocessor system which is devoid of the directory memory 31 and the directory memory access controller 29. In this modification, information stored in the directory memory 31 may be stored in a certain area (directory area) in the main memory 30. An access performed to the directory memory by the home access controllers 27, 47, 77 though the directory memory access controller 29 may be performed by accessing the directory area in the main memory 30 through the main memory access controller 28.

In each of the first through third embodiments, when the home access controllers 27, 47, 77 receive and process an Upgrade message and write it into the conflict queue in the main memory 30, the home access controllers 27, 47, 77 may change the message type and write the changed message type. The message type may be changed from Upgrade to BlkRdEx.

The numbers of the entries in the reply buffers 32, 42, 72, the request buffers 33, 43, 73, and the remote buffers 34, 44, 74 are not limited to the numbers which are described above.

Messages employed in the first through third embodiments may be changed in type and structure insofar as they can accurately transmit processing requests and replies between the nodes $PE_i$. Requests, such as access requests, within the same node may transmitted in the form of certain signals via signal lines in the node, rather than in the form of messages.

In the first through third embodiments, the functions of the cache memory access controller 23, the tag memory access controller 24, the local access controllers 25, 45, 75, the home access controllers 27, 47, 77, the main memory access controller 28, and the directory memory access controller 29 in the coherency maintenance controllers 16, 66, 76 may be performed by:

1) the processor 20 which executes a processing program stored in the main memory 30 or a program stored in an instruction cache;

2) a dedicated processor, separate from the processor 20 and the main memory 30 (or an instruction cache), which executes a processing program stored in a dedicated memory; or 3) a dedicated hardware arrangement constructed according to the logic to perform the functions of the modules.

Each of the multiprocessor systems according to the first through third embodiments is composed of 1024 nodes $PE_0$–$PE_{1023}$ which are interconnected by the single interconnection network 10. However, the multiprocessor system may have an arbitrary number of nodes and may be of a redundant arrangement including a plurality of interconnection networks. Such a plurality of interconnection networks may be used as a precaution against system faults.

While preferred embodiments of the present invention have been described using specific terms, such description is for illustrative purposes only, and it is to be understood that changes and variations may be made without departing from the spirit or scope of the following claims.

TABLE 1

| Access type | Addresses in accord? | State | Processing type | Message type | Next state |
|---|---|---|---|---|---|
| Load | No | I/S/E | AA | BlkRdSh | I |
| | | D | AB | BlkRdSh | I |
| | Yes | I | AA | BlkRdSh | I |
| | | S/E/D | AC | — | Previous state |
| Store | No | I/S/E | AA | BlkRdEx | I |
| | | D | AB | BlkRdEx | I |
| | Yes | I | AA | BlkRdEx | I |
| | | S | AA | Upgrade | S |
| | | E/D | AD | — | D |

TABLE 2

| Message type | Addresses in accord? | State | Processing type | Message type | Next state |
|---|---|---|---|---|---|
| IntvSh | No | I/S/E/D | BA | Ack | Previous state |
| | Yes | I | BA | Ack | I |

TABLE 2-continued

| Message type | Addresses in accord? | State | Processing type | Message type | Next state |
|---|---|---|---|---|---|
|  |  | S/E | BA | Ack | S |
|  |  | D | BB | AckData | S |
| IntvEx | No | I/S/E/D | BA | Ack | Previous state |
|  | Yes | I/S/E | BA | Ack | I |
|  |  | D | BB | AckData | I |
| Inv | No | I/S/E/D | BA | Ack | Previous state |
|  | Yes | I/S/E/D | BA | Ack | I |

TABLE 3

| Message type | Access type | Next state |
|---|---|---|
| CmpDatSh | Load | S |
| CmpDatEx | Load | E |
|  | Store | D |
| Cmp | Store | D |

TABLE 4

| Message type | State | uncached? | Request node = node in question | Holding node = node in question | Processing type | Next state | Holding node manipulation | Message type | Destination |
|---|---|---|---|---|---|---|---|---|---|
| BlkRdSh | C/M | Yes | Yes | — | CB | M | set | CmpDatEx | reply remote |
|  |  |  | No |  | CA |  |  |  |  |
|  | C | No | Yes | — | CB | C | add | CmpDatEx | reply remote |
|  |  |  | No |  | CA |  |  |  |  |
|  | M | No | — | Yes | CC | RSP | none | IntvSh | request remote |
|  |  |  |  | No | CA |  |  |  |  |
|  | RSP/REP/UP | — | — | — | CD | Previous state | none |  |  |
| BlkRdEx | C/M | Yes | Yes | — | CB | M | set | CmpDatEx | reply remote |
|  |  |  | No |  | CA |  |  |  |  |
|  | C | No | — | — | CA | REP | count | Inv | remote |
|  | M | No | — | Yes | CC | REP | count | IntvEx | request remote |
|  |  |  |  | No | CA |  |  |  |  |
|  | RSP/REP/UP | — | — | — | CD | Previous state | none |  |  |
| Upgrade | C | — | — | — | CA | UP | count | Inv | remote |
|  | M | — | — | Yes | CC | REP | count | IntvEx | request remote |
|  |  |  |  | No | CA |  |  |  |  |
|  | RSP/REP/UP | — | — | — | CD | Previous state | none |  |  |

TABLE 5

| Message type | State | uncached? | Request node = node in question | Holding node = node in question | Processing type | Next state | Holding node manipulation | Message type | Destination |
|---|---|---|---|---|---|---|---|---|---|
| BlkWr | M | — | — | — | CE | C | clean |  |  |
|  | RSP/REP | — | — | — | CE | Previous state | none |  |  |
| Ack | RSP | — | Yes | — | CB | C | add | CmpDatSh | reply remote |
|  |  |  | No |  | CA |  |  |  |  |
|  | REP/UP | No | — | — | CE | Previous | dec |  |  |

TABLE 5-continued

| Message type | State | uncached ? | Request node = node in question | Holding node = node in question | Processing type | Next state | Holding node manipulation | Message type | Destination |
|---|---|---|---|---|---|---|---|---|---|
| | REP | Yes | Yes | — | CB | state M | set | CmpDatEx | reply |
| | | No | | | CA | | | | remote |
| | UP | Yes | Yes | — | CB | M | set | Cmp | reply |
| | | No | | | CA | | | | remote |
| AckData | RSP | — | Yes | — | CB | M | add | CmpDatSh | reply |
| | | | No | | CA | | | | remote |
| | RSP | — | Yes | — | CB | C | set | CmpDatEx | reply |
| | | | No | | CA | | | | remote |

TABLE 6

| Message read from queue in step S149? | Queue empty? | Processing type = CD? | Next top bit | To be deleted from leading entry? |
|---|---|---|---|---|
| Yes | — | Yes | 1 | No |
| | | No | 0 | Yes |
| No | Yes | Yes | 1 | No |
| | | No | Previous top bit | No |
| | No | — | Previous top bit | No |

TABLE 7

| Message read from queue in step S149? | Message type | Queue empty? | Processing type CD or CE? | Top bit | To be read from queue? |
|---|---|---|---|---|---|
| Yes | — | Yes | — | — | No |
| | | No | Yes | — | No |
| | | | No | — | Yes |
| No | Ack/ AckData | — | Yes | — | No |
| | | | No | 0 | No |
| | | | | 1 | Yes |
| | Other | — | — | — | No |

TABLE 8

| Originating module | Destination module |
|---|---|
| Local access controller | Home access controller |
| | Message transmitter |
| Home access controller | Reply buffer |
| | Request buffer |
| | Remote buffer |
| Reply buffer | Local access controller |
| Request buffer | Local access controller |
| Remote buffer | Message transmitter |
| Message transmitter | Interconnection network |
| Message receiver | Home access controller |
| | Reply buffer |
| | Request buffer |
| Interconnection network | Message receiver |

TABLE 9

| Message type | Access type | Check bit | Next state | Table manipulation Prc | Sys |
|---|---|---|---|---|---|
| CmpDatSh | Load | — | S | 0 | 0 |
| CmpDatEx | Load | — | E | 0 | 0 |
| | Store | — | D | 0 | 0 |
| Cmp | — | — | | | dec |
| PrcDatEx | Store | | D | 0 | |
| PrcAck | Store | 0 | D | 0 | |
| | | 1 | | | inc |

TABLE 10

| Message type | State | uncached ? | Request node = node in question | Holding node = node in question | Processing type | Next state | Holding node manipulation | Message type | Destination |
|---|---|---|---|---|---|---|---|---|---|
| BlkRdEx | C | No | Yes | — | CG | UP | count | PrcDatEx Inv | reply remote |
| | | | No | | CF | | | PrcDatEx Inv | remote remote |
| Upgrade | C | — | Yes | — | CH | UP | count | PrcAck Inv | reply remote |
| | | | No | | CF | | | PrcAck Inv | remote remote |

TABLE 11

| Message type | Addresses in accord? | State | Processing type | Message type | Next state |
|---|---|---|---|---|---|
| IntvSh | No | I/S/E/D | BA | AckX | Previous state |
| | Yes | I | BA | AckX | I |
| | | S/E/D | BB | CmpDatShR | S |
| IntvEx | No | I/S/E/D | BA | AckX | Previous state |
| | Yes | I | BA | Ack | I |
| | | S/E/D | BB | CmpDatDyR | I |
| Inv | No | I/S/E/D | BA | Cmp | Previous state |
| | Yes | I/S/E/D | BA | Cmp | I |
| InvX | No | I/S/E/D | BA | AckX | Previous state |
| | Yes | I/S/E/D | BA | AckX | I |

TABLE 12

| Message type | Access type | Next state | Message type |
|---|---|---|---|
| CmpDatSh | Load | S | |
| CmpDatEx | Load | E | |
| | Store | D | |
| Cmp | Store | D | Ack |
| CmpDatShR | Load | S | AckData |
| CmpDatDyR | Store | D | Ack |

TABLE 13

| Message type | State | uncached? | Request node = node in question | Holding node = node in question | Processing type | Next state | Holding node manipulation | Message type | Destination |
|---|---|---|---|---|---|---|---|---|---|
| Ack | REP/UP | — | — | — | CE | M | set | | |
| AckX | RSP | — | Yes | — | CB | C | add | CmpDatSh | reply remote |
| | | | No | — | CA | | | | |
| | REP | Yes | Yes | — | CB | M | set | CmpDatEx | reply remote |
| | | | No | — | CA | | | | |
| | | No | — | — | CE | Previous state | none | | |
| AckData | RSP | — | — | — | CE | C | add | | |

TABLE 14

| Message read from queue in step S149? | Message type | Queue empty? | Processing type CD or CE? | Top bit | To be read from queue? |
|---|---|---|---|---|---|
| Yes | — | Yes | — | — | No |
| | | No | Yes | — | No |
| | | | No | — | Yes |
| No | AckX | — | Yes | — | No |
| | | | No | 0 | No |
| | | | | 1 | Yes |
| | Ack/AckData | — | — | 0 | No |
| | | | | 1 | Yes |
| | Other | — | — | — | No |

What is claimed is:

1. A multiprocessor system having a plurality of nodes interconnected by an interconnection network, each of said nodes comprising:

a main memory for storing data;

a cache memory for storing part of the data stored in the main memory in either one of the nodes, said cache memory being accessible faster than said main memory;

cache state storage means for storing a state of the data stored in said cache memory;

main memory state storage means for storing information of nodes having cache memories which store data corresponding to the data stored in said main memory, and a state of coherency of the data stored in said main memory;

a processor for issuing access requests to access data;

first coherency controlling means for sending the access request from said processor to a node having said main memory which stores data corresponding to said access request according to an access request from said processor and the state of the data stored in said cache state storage means;

second coherency controlling means for making coherency requests to cause nodes represented by the information stored in said main memory state storage means to effect a process to maintain coherency of the data according to an access request from said first coherency controlling means in either one of said nodes and the state of the data stored in said main memory state storage means;

third coherency controlling means for effecting a process to maintain coherency of the data in said cache memory and sending a first reply with respect to a completion of the process to maintain coherency to a node having said main memory whose stored data is subjected to the process to maintain coherency according to a coherency request from said second coherency controlling means in either one of said nodes and the state of the data stored in said cache state storage means;

fourth coherency controlling means for effecting a process to maintain coherency of the data in said main memory and sending a second reply with respect to the completion of the process to maintain coherency to the node having said processor which has made said access request according to the first reply sent from said third coherency controlling means in either one of said nodes and the state of the data stored in said main memory state storage means of said node; and fifth coherency controlling means for effecting a process to maintain coherency of the data in said cache memory and sending a third reply with respect to a completion of the process to maintain coherency to said processor according to a second reply sent from said fourth coherency controlling means in either one of said nodes and the state of the data stored in said cache state storage means.

2. A multiprocessor system according to claim 1, wherein:

each of said nodes further comprises first arbitrating means for arbitrating among an access request from said processor, a coherency request and a second reply from either one of said nodes and for enabling said first, third and fifth coherency controlling means according to contents thereof; and said first, third and fifth coherency controlling means and said first arbitrating means constitute local access controlling means.

3. A multiprocessor system according to claim 1, wherein:

each of said nodes further comprises second arbitrating means for arbitrating between an access request from first coherency controlling means in either one of said nodes and a first reply from either one of said nodes and for enabling said second and fourth coherency controlling means according to contents thereof; and said second and fourth coherency controlling means and second arbitrating means constitute home access controlling means.

4. A multiprocessor system according to claim 1, wherein:

the state of coherency of the data stored in said main memory state storage means includes a state representing that the process to maintain coherency is being effected;

said second coherency controlling means in each of said nodes further comprising:

first main memory state updating means for updating the state of the data to the state representing that the process to maintain coherency is being effected according to an access request and the state of the data; and access request saving means for saving an access request according to the said access request and that the state of the data is representing the process to maintain coherency is being effected;

and said fourth coherency controlling means in each of said nodes further comprising:

second main memory state updating means for updating the state of the data to a state which is not the state representing that the process to maintain coherency is being effected according to a first reply and the state of the data; and access request returning means for returning an access request saved by said access request saving means and enabling said second coherency controlling means to process the returned access request if said second main memory state updating means has updated the state of the data to the state which is not the state representing that the process to maintain coherency is being effected.

5. A multiprocessor system according to claim 1, wherein:

each of said nodes further comprises:

access request holding means for holding an access request sent from said processor if said first coherency controlling means sends an access request to said second coherency controlling means according to said access request sent from said processor; and conflict request storage means for storing a request conflict according to a coherency request and an access request held by said access request holding means, when said third coherency controlling means has effected a process to maintain coherency of the data according to said coherency request;

and said fifth coherency controlling means further comprises access request re-processing means for enabling said first coherency controlling means to re-process the access request held by said access request holding means according to said second reply, the state of the data, and the request conflict stored in said conflict request storage means, when said fifth coherency controlling means has effected a process to maintain coherency of the data according to said second reply.

6. A multiprocessor system according to claim 1, wherein:

said first coherency controlling means has means for sending a access request through said interconnection network to a node having said main memory which stores data corresponding to said access request if a node having said first coherency controlling means and the node having said main memory are different from each other;

said second coherency controlling means has means for sending a coherency request through said interconnection network to a node having said cache memory whose stored data is subjected to the process to maintain coherency if said node having said second coherency controlling means and the node having said cache memory are different from each other, or if there are a plurality of cache memories whose stored data is subjected to the process to maintain coherency;

said third coherency controlling means has means for sending a first reply through said interconnection network to a node having said main memory whose stored data is subjected to the process to maintain coherency if a node having said third coherency controlling means and the node having said main memory are different from each other; and said fourth coherency controlling means has means for sending a second reply through said interconnection network to a node having the processor which has issued an access request if a node having said fourth coherency controlling means and the node having the processor are different from each other.

7. A multiprocessor system according to claim 1, wherein each of said nodes further comprises:

reply accumulating means for accumulating second replies sent from said fourth coherency controlling means in either one of said nodes to said fifth coherency controlling means;

coherency request accumulating means for accumulating coherency requests sent from said second coherency controlling means in either one of said nodes to said third coherency controlling means; and third accumulating means for accumulating either coherency requests or second replies sent from said second or fourth coherency controlling means through said interconnection network to another one of said nodes.

8. A multiprocessor system according to claim 7, wherein each of said nodes further comprises:

coherency request saving means for saving a coherency request if said coherency request accumulating means fails to accumulate the coherency request sent from said second coherency controlling means in either one of said nodes to said third coherency controlling means;

coherency request returning means for returning a coherency request if said coherency request accumulating means is capable of accumulating the coherency request saved by said coherency request saving means;

third saving means for saving coherency requests or second replies if said third accumulating means fail to hold the coherency requests or the second replies sent from said second or fourth coherency controlling means through said interconnection network to another one of said nodes; and third returning means for returning coherency requests or second replies to said third accumulating means if said third accumulating means is capable of accumulating the coherency requests or the second replies which have been saved by said third saving means.

9. A multiprocessor system having a plurality of nodes interconnected by an interconnection network, each of said nodes comprising:

a main memory for storing data;

a cache memory for storing part of the data stored in the main memory in either one of the nodes, said cache memory being accessible faster than said main memory;

cache state storage means for storing a state of the data stored in said cache memory;

main memory state storage means for storing information of nodes having cache memories which store data corresponding to the data stored in said main memory, and a state of coherency of the data stored in said main memory;

a processor for issuing access requests to access data;

first coherency controlling means for sending the access request from said processor to a node having said main memory which stores data corresponding to said access request according to an access request from said processor and the state of the data stored in said cache state storage means;

second coherency controlling means for making coherency requests to cause nodes represented by the information stored in said main memory state storage means to effect a process to maintain coherency of the data according to an access from said first coherency controlling means in either one of said nodes and the state of the data stored in said main memory state storage means;

third coherency controlling means for effecting a process to maintain coherency of the data in said cache memory and sending a first reply with respect to a completion of the process to maintain coherency to a node having said processor which has made said access request according to the coherency request sent from said second coherency controlling means in either one of said nodes and the state of the data stored in said cache state storage means;

fourth coherency controlling means for effecting a process to maintain coherency of the data in said cache memory and sending a second reply with respect to the completion of the process to maintain coherency to the node having said main memory whose stored data is subjected to the process to maintain coherency according to the first reply sent from said third coherency controlling means in either one of said nodes and the state of the data stored in said cache state storage means of said node; and fifth coherency controlling means for effecting a process to maintain coherency of the data in said main memory according to a second reply sent from said fourth coherency controlling means in either one of said nodes and the state of the data stored in said main memory state storage means.

10. A multiprocessor system according to claim 9, wherein:

each of said nodes further comprises first arbitrating means for arbitrating among an access request from said processor, a coherency request and a second reply from either one of said nodes and for enabling said first, third and fifth coherency controlling means according to contents thereof; and said first, third and fourth coherency controlling means and said first arbitrating means constitute local access controlling means.

11. A multiprocessor system according to claim 9, wherein:

each of said nodes further comprises second arbitrating means for arbitrating between an access request from first coherency controlling means in either one of said nodes and a first reply from either one of said nodes and for enabling said second and fifth coherency controlling means according to contents thereof; and said second and fifth coherency controlling means and second arbitrating means constitute home access controlling means.

12. A multiprocessor system according to claim 9, wherein:

the state of coherency of the data stored in said main memory state storage means includes a state representing that the process to maintain coherency is being effected;

said second coherency controlling means in each of said nodes further comprising:

first main memory state updating means for updating the state of the data to the state representing that the process to maintain coherency is being effected according to an access request and the state of the data; and access request saving means for saving an access request according to the said access request and that the state of the data is representing the process to maintain coherency is being effected;

and said fifth coherency controlling means in each of said nodes further comprising:

second main memory state updating means for updating the state of the data to a state which is not the state representing that the process to maintain coherency is being effected according to a second reply and the state of the data; and access request returning means for returning an access request saved by said access request saving means and enabling said second coherency controlling means to process the returned access request if said second main memory state updating means has updated the state of the data to the state which is not the state representing that the process to maintain coherency is being effected.

13. A multiprocessor system according to claim 9, wherein:

each of said nodes further comprises:

access request holding means for holding an access request sent from said processor if said first coherency controlling means sends an access request to said second coherency controlling means according to said access request sent from said processor; and conflict request storage means for storing a request conflict according to a coherency request and an access request held by said access request holding means, when said third coherency controlling means has effected a process to maintain coherency of the data according to said coherency request;

and said fourth coherency controlling means further comprises access request re-processing means for enabling said first coherency controlling means to re-process the access request held by said access request holding means according to said first reply, the state of the data, and the request conflict stored in said conflict request storage means, when said fourth coherency controlling means has effected a process to maintain coherency of the data according to said first reply.

14. A multiprocessor system according to claim 9, wherein said first coherency controlling means had means for sending an access request through said interconnection network to a node having said main memory which stores data corresponding to said access request of a node having said first coherency controlling means and the node having said main memory are different from each other;

said second coherency controlling means has means for sending a coherency request through said interconnection network to a node having said cache memory whose stored data is subjected to the process to maintain coherency if said node having said second coherency controlling means and the node having said cache memory are different from each other, or if there are a plurality of cache memories whose stored data is subjected to the process to maintain coherency;

said third coherency controlling means has means for sending a first reply through said interconnection network to a node having said processor which has issued an access request if a node having said third coherency controlling means and the node having said processor are different from each other; and said fourth coherency controlling means has means for sending a second reply through said interconnection network to a node having the processor which has issued an access request if a node having said fourth coherency controlling means and the node having the processor are different form each other.

15. A multiprocessor system according to claim 9, wherein each of said nodes further comprises:

reply accumulating means for accumulating first replies sent from said third coherency controlling means in either one of said nodes to said fourth coherency controlling means;

coherency request accumulating means for accumulating coherency requests sent from said second coherency controlling means in either one of said nodes to said third coherency controlling means; and third accumulating means for accumulating coherency requests sent from said second coherency controlling means through said interconnection network to another one of said nodes.

16. A multiprocessor system according to claim 15, wherein each of said nodes further comprises:

coherency request saving means for saving a coherency request if said coherency request accumulating means fails to accumulate the coherency request sent from said second coherency controlling means in either one of said nodes to said third coherency controlling means;

coherency request returning means for returning a coherency request if said coherency request accumulating means is capable of accumulating the coherency request saved by said coherency request saving means;

third saving means for saving coherency requests if said third accumulating means fail to hold the coherency requests sent from said second coherency controlling means through said interconnection network to another one of said nodes; and third returning means for returning coherency requests to said third accumulating means if said third accumulating means is capable of accumulating the coherency requests which have been saved by said third saving means.

* * * * *